United States Patent [19]

Machino et al.

[11] Patent Number: 5,593,293
[45] Date of Patent: Jan. 14, 1997

[54] HAND MECHANISM FOR ROBOT

[75] Inventors: Masaki Machino, Ogawa-machi; Sumiyoshi Ito, Ushiku; Shojiro Danmoto, Edosaki-machi; Fumio Kanno, Ami-machi; Takao Komiya, Ushiku, all of Japan

[73] Assignee: Canon Kabushiki Kaisha, Tokyo, Japan

[21] Appl. No.: 936,642

[22] Filed: Aug. 28, 1992

[30] Foreign Application Priority Data

| Aug. 30, 1991 | [JP] | Japan | 3-219822 |
| Aug. 30, 1991 | [JP] | Japan | 3-219823 |
| Aug. 30, 1991 | [JP] | Japan | 3-219824 |
| Aug. 30, 1991 | [JP] | Japan | 3-219825 |
| Aug. 30, 1991 | [JP] | Japan | 3-219826 |
| Aug. 30, 1991 | [JP] | Japan | 3-219827 |
| Aug. 30, 1991 | [JP] | Japan | 3-219828 |
| Jan. 10, 1992 | [JP] | Japan | 4-002638 |

[51] Int. Cl.$^6$ .................................. B25J 17/02
[52] U.S. Cl. .................. 414/729; 901/29; 901/45; 74/490.06
[58] Field of Search ................ 414/729, 735; 901/49, 29, 28, 45; 294/119.1, 81.62, 86.4; 74/479 BW, 479 BJ, 490.05, 490.06

[56] References Cited

U.S. PATENT DOCUMENTS

| 4,482,289 | 11/1984 | Inaba et al. | 414/729 X |
| 4,557,661 | 12/1985 | Fischer et al. | 901/49 X |
| 4,655,674 | 4/1987 | Kohler et al. | 901/49 X |
| 4,759,686 | 7/1988 | Kirst | 901/49 X |
| 4,806,069 | 2/1989 | Tellden | 901/29 X |
| 4,896,431 | 1/1990 | Danmoto et al. | 33/644 |
| 4,952,117 | 8/1990 | Nerger | 901/49 X |

FOREIGN PATENT DOCUMENTS

| 208693 | 4/1984 | Germany . |
| 53-3141 | 2/1978 | Japan . |
| 2-311291 | 12/1990 | Japan . |
| 2-311292 | 12/1990 | Japan . |
| 4-13583 | 1/1992 | Japan . |
| 763082 | 9/1980 | U.S.S.R. . |
| 766853 | 10/1980 | U.S.S.R. . |
| 1646847 | 5/1991 | U.S.S.R. . |
| WO9006546 | 6/1990 | WIPO . |

*Primary Examiner*—Donald W. Underwood
*Attorney, Agent, or Firm*—Fitzpatrick, Cella, Harper & Scinto

[57] ABSTRACT

A hand mechanism for a robot is attached to the distal end of an arm portion of a robot and has independent modules for executing predetermined elementary motions, which modules can be combined with each other in selected arbitrary combinations to attain desired elementary motions. The hand mechanism includes a holder module which includes a fixing member fixed to the arm portion, an attaching plate to be attached to other modules and a coupling mechanism for coupling the fixing member and the attaching plate. The coupling mechanism includes angle an adjustment pin for adjusting the attaching angle of the attaching plate about the arm portion, and a shear pin bolt for releasing a coupling state between the fixing member and the attaching plate upon application of a shock to the hand mechanism.

9 Claims, 68 Drawing Sheets

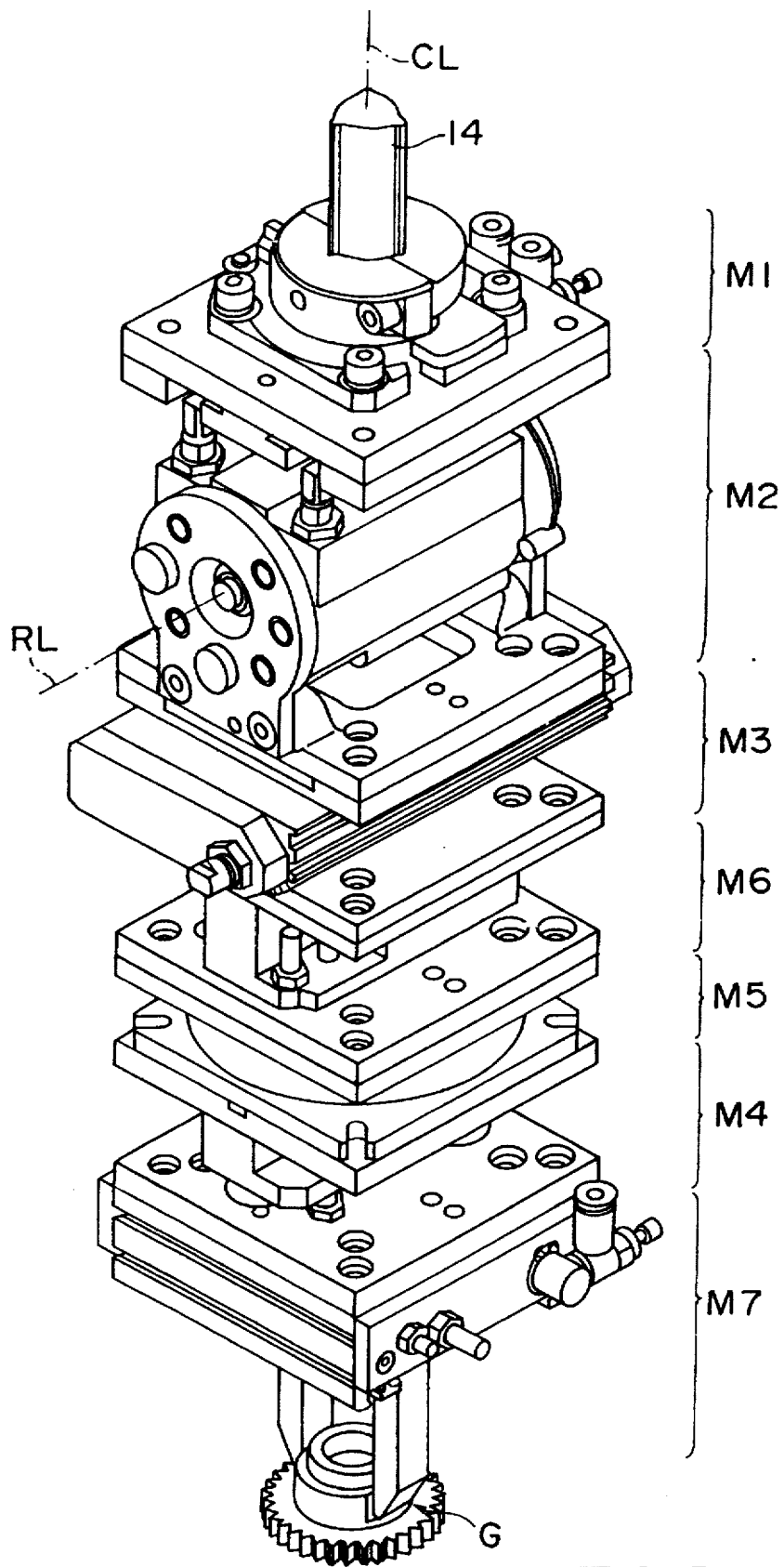
F I G. 2

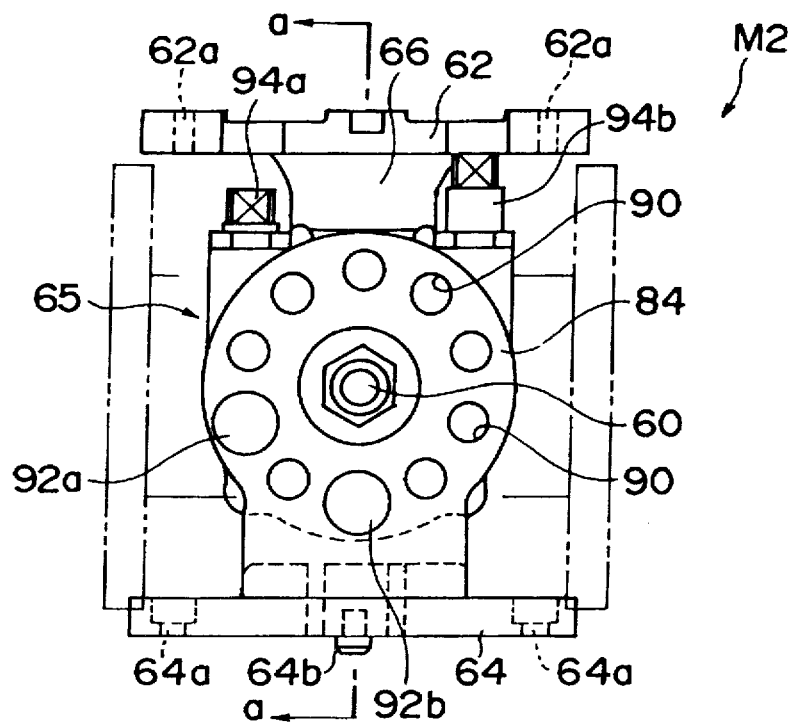
F I G. 16
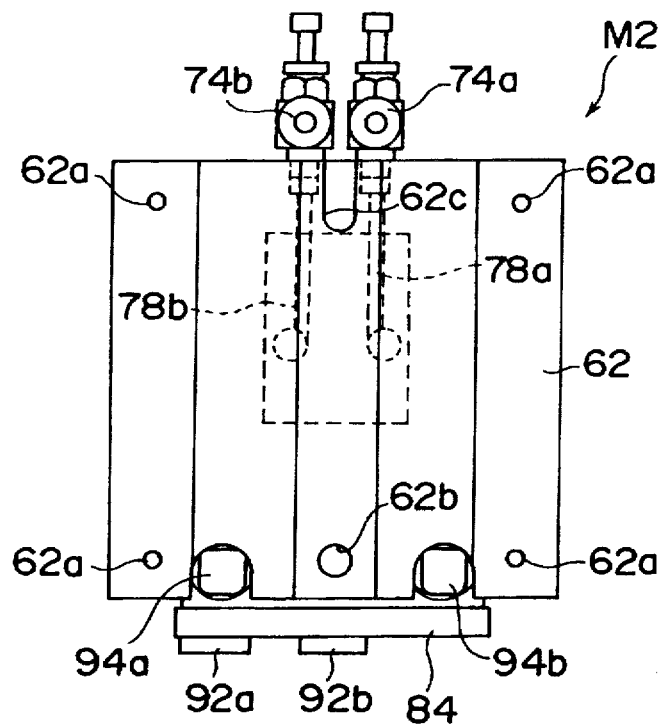
F I G. 17

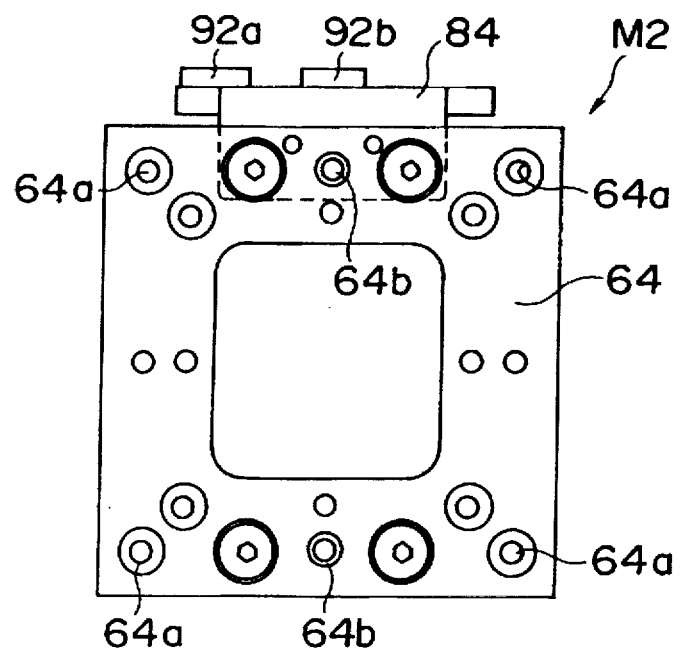
F I G. 18
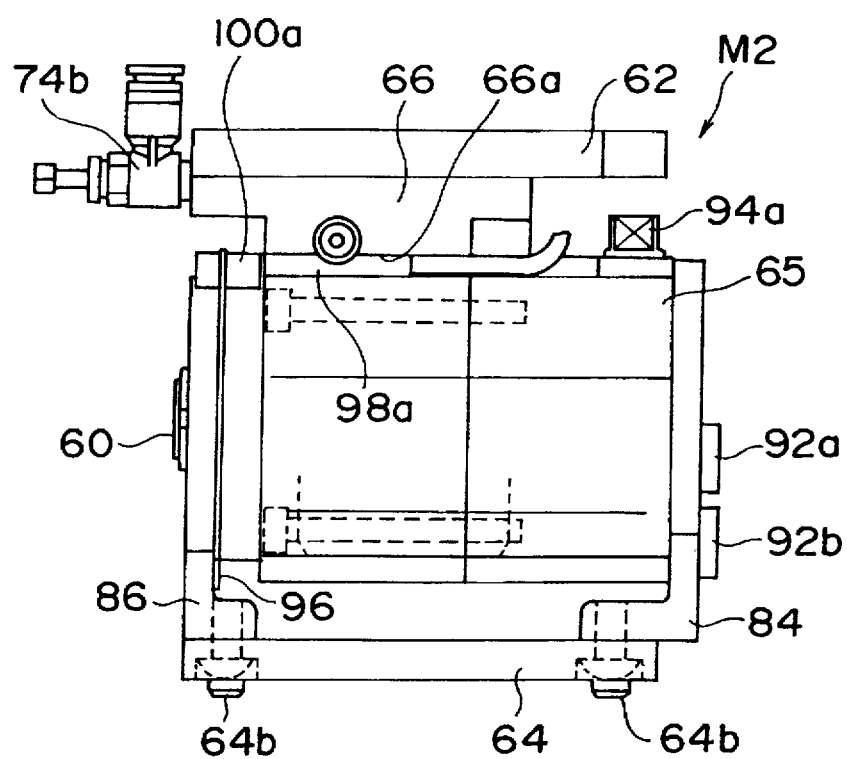
F I G. 19

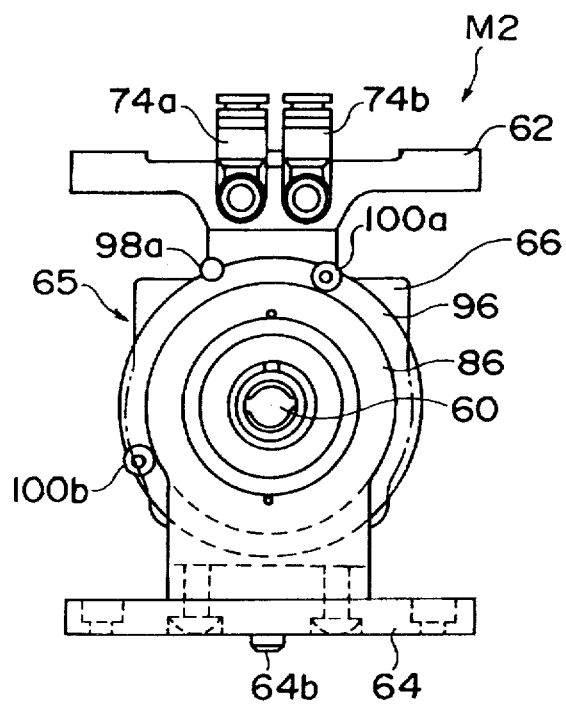
F I G. 20
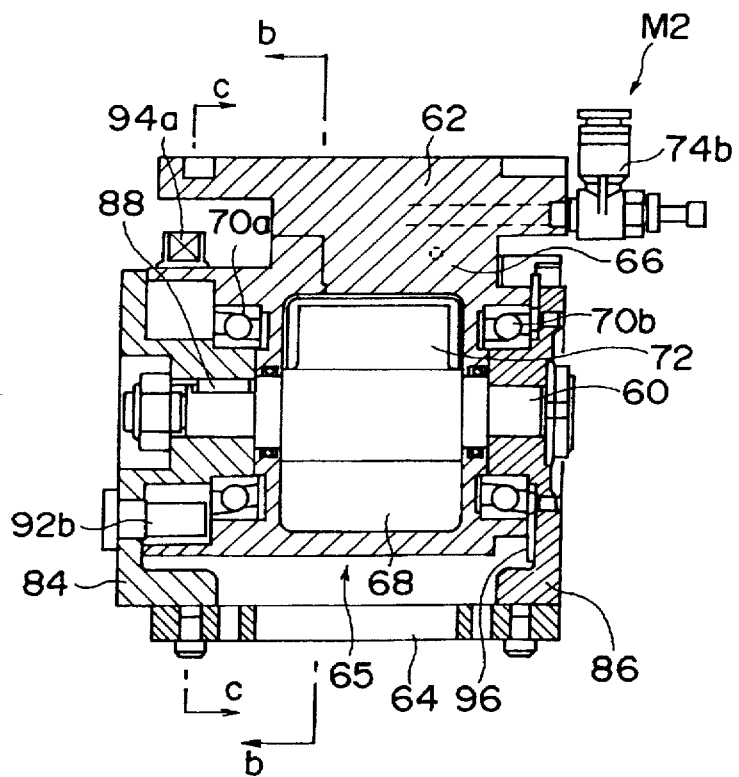
F I G. 21

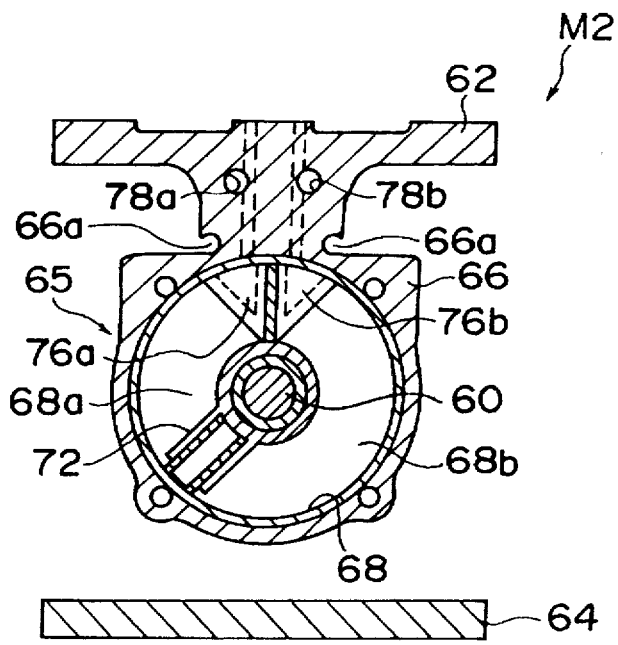
F I G. 22
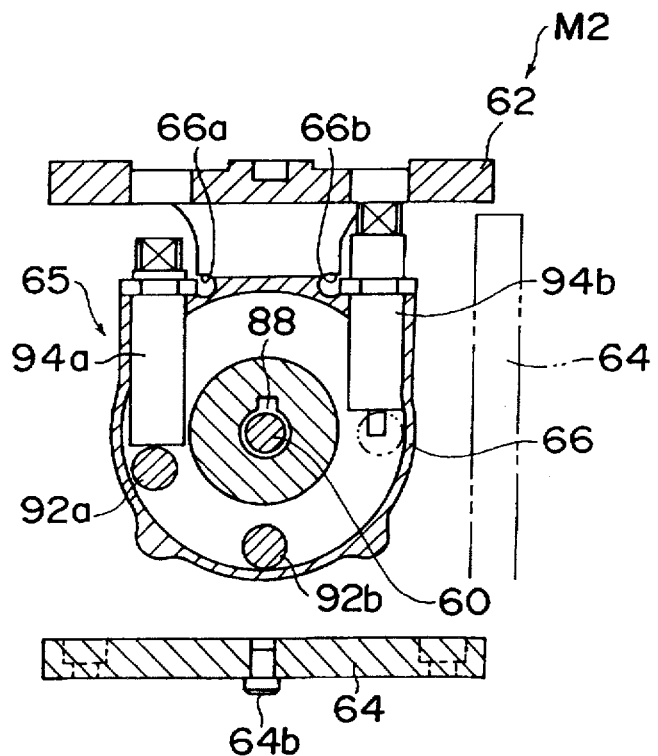
F I G. 23

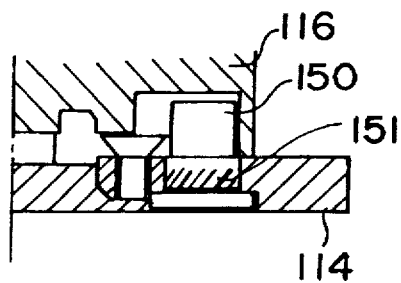
F I G. 36
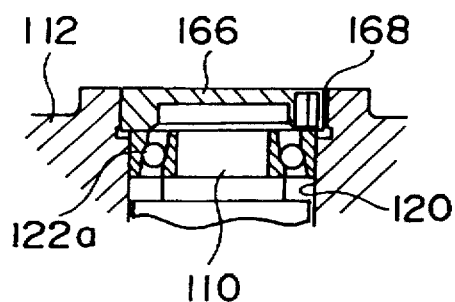
F I G. 37
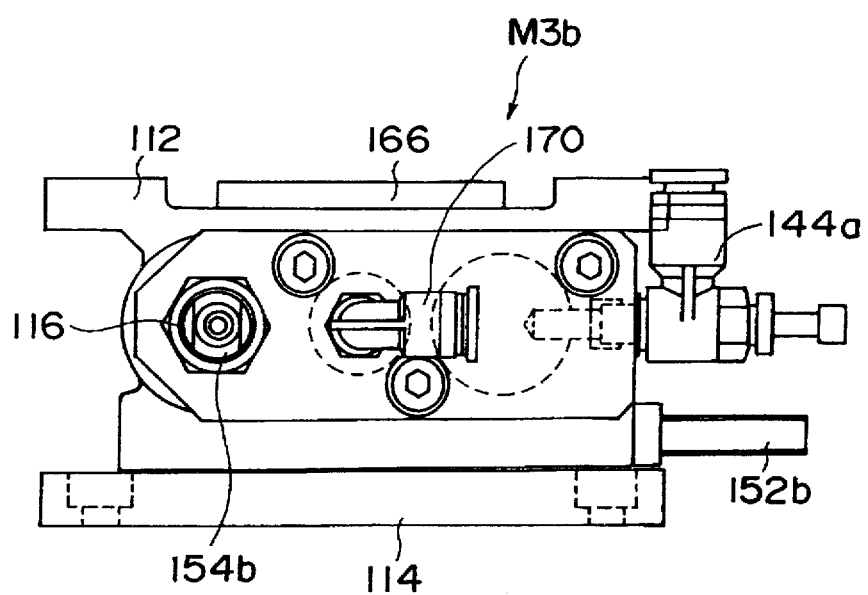
F I G. 38

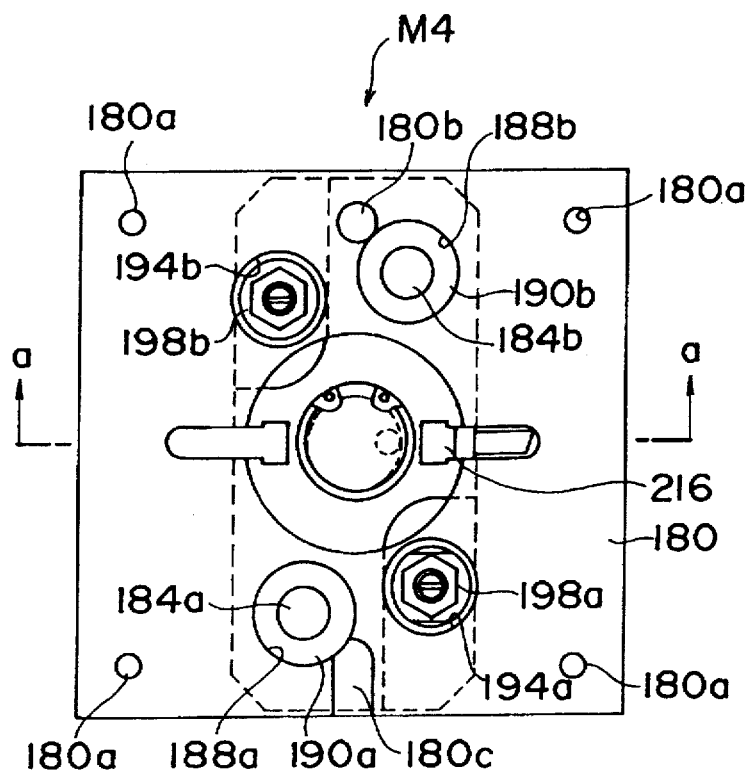
F I G. 42
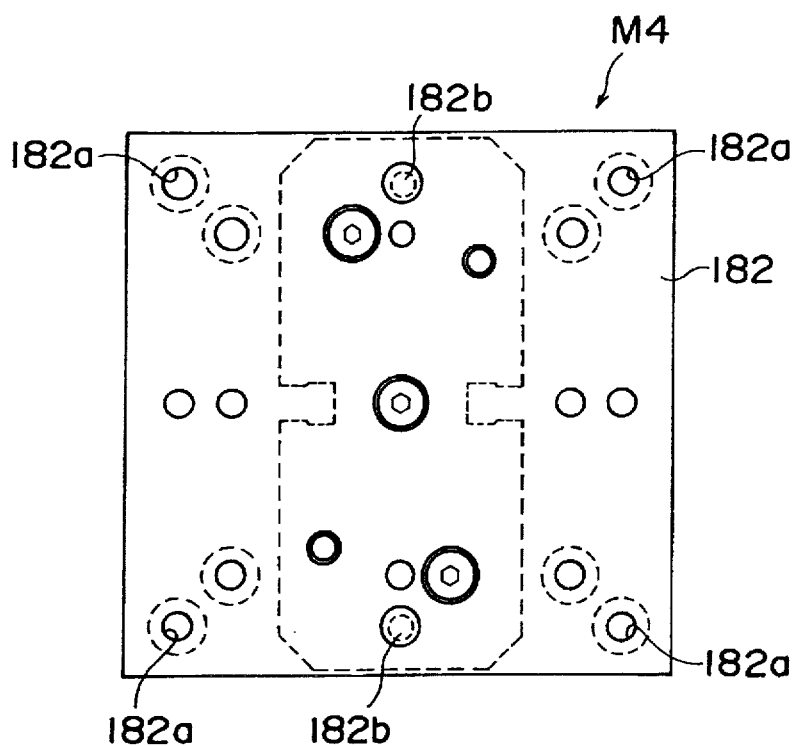
F I G. 43

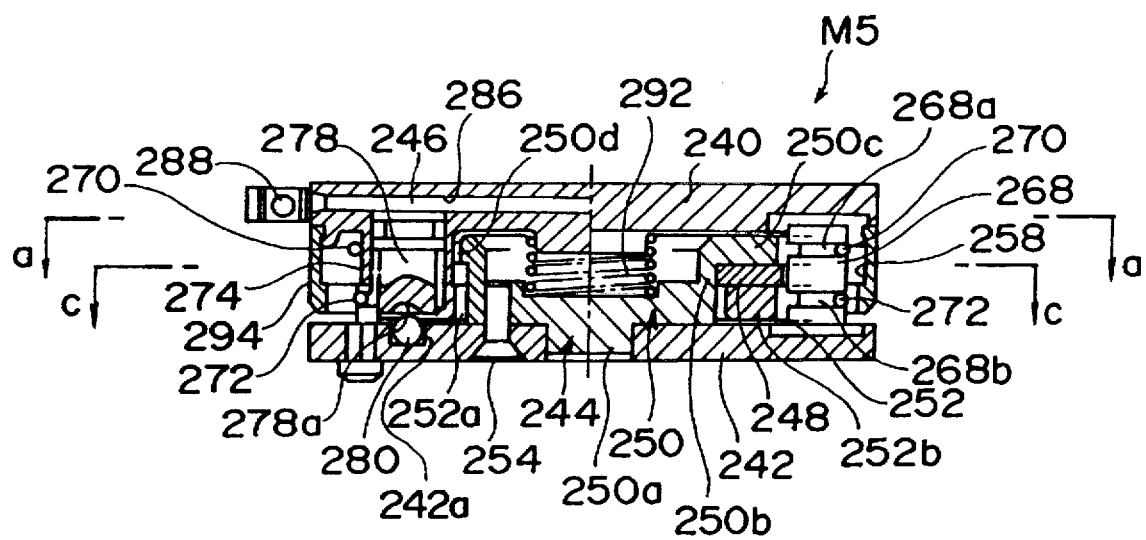
F I G. 57
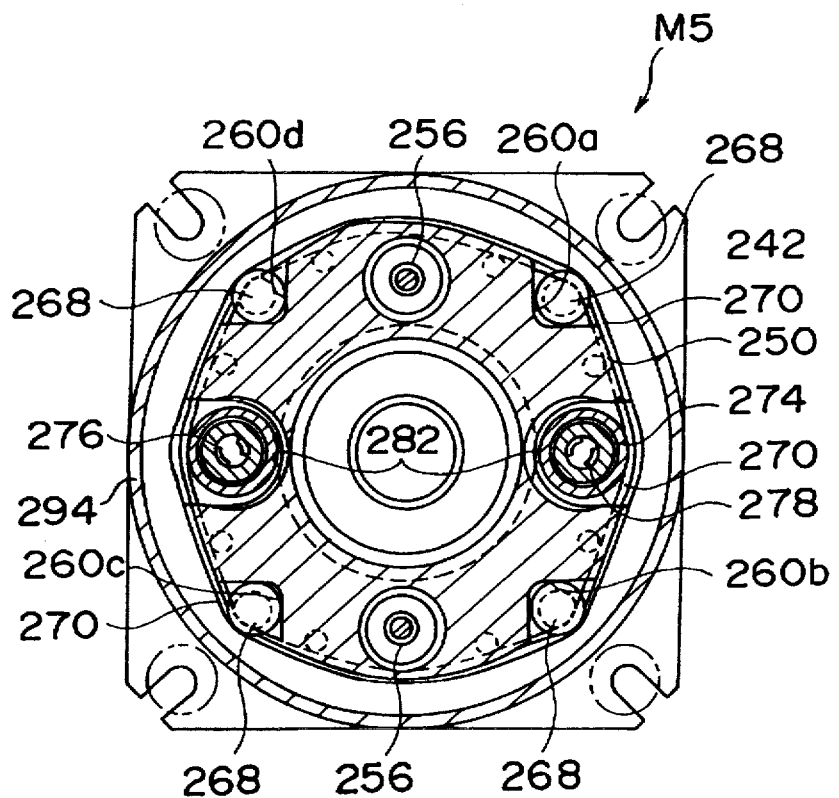
F I G. 58

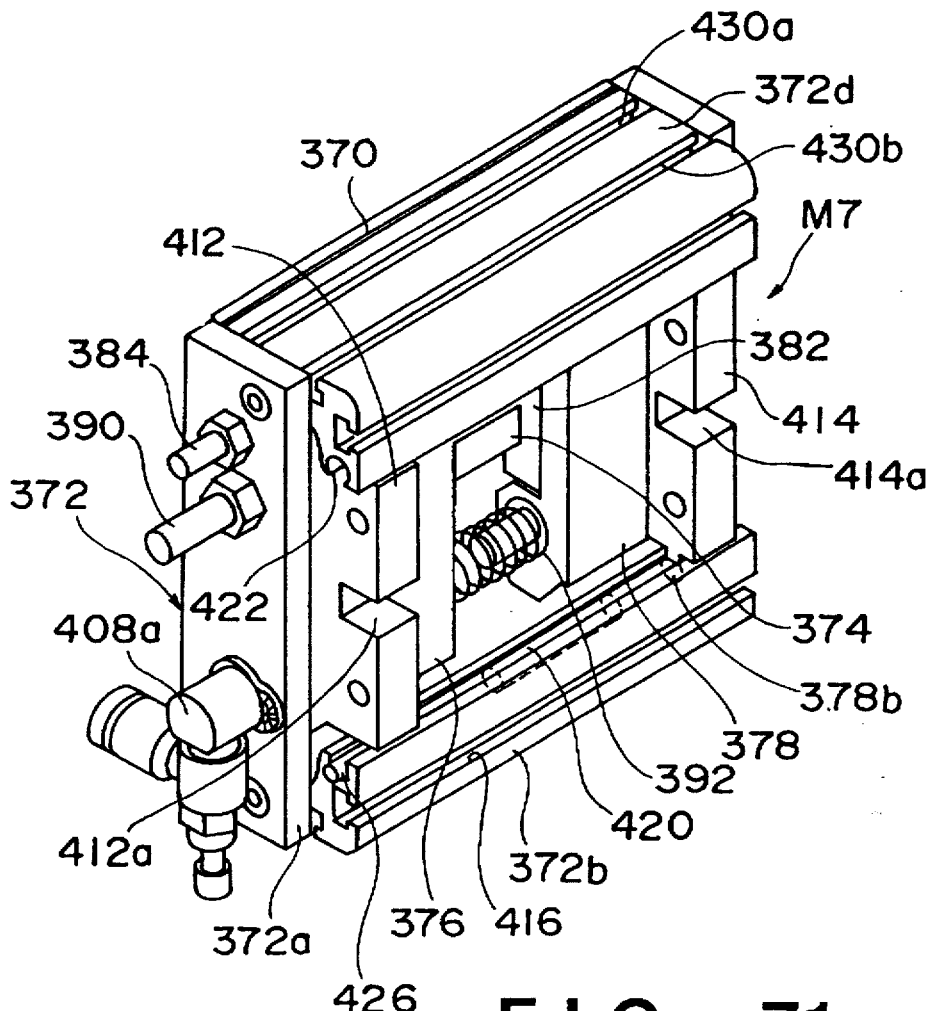
F I G. 71
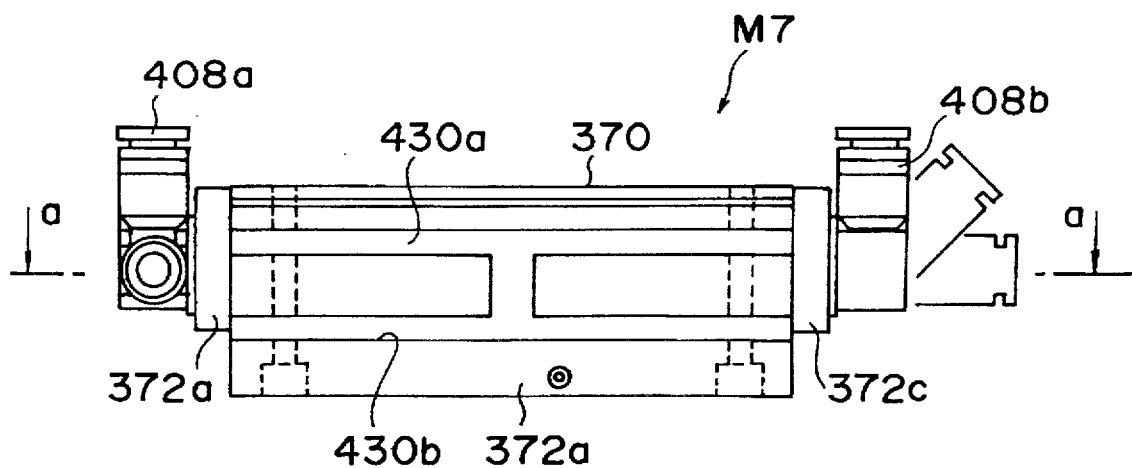
F I G. 72

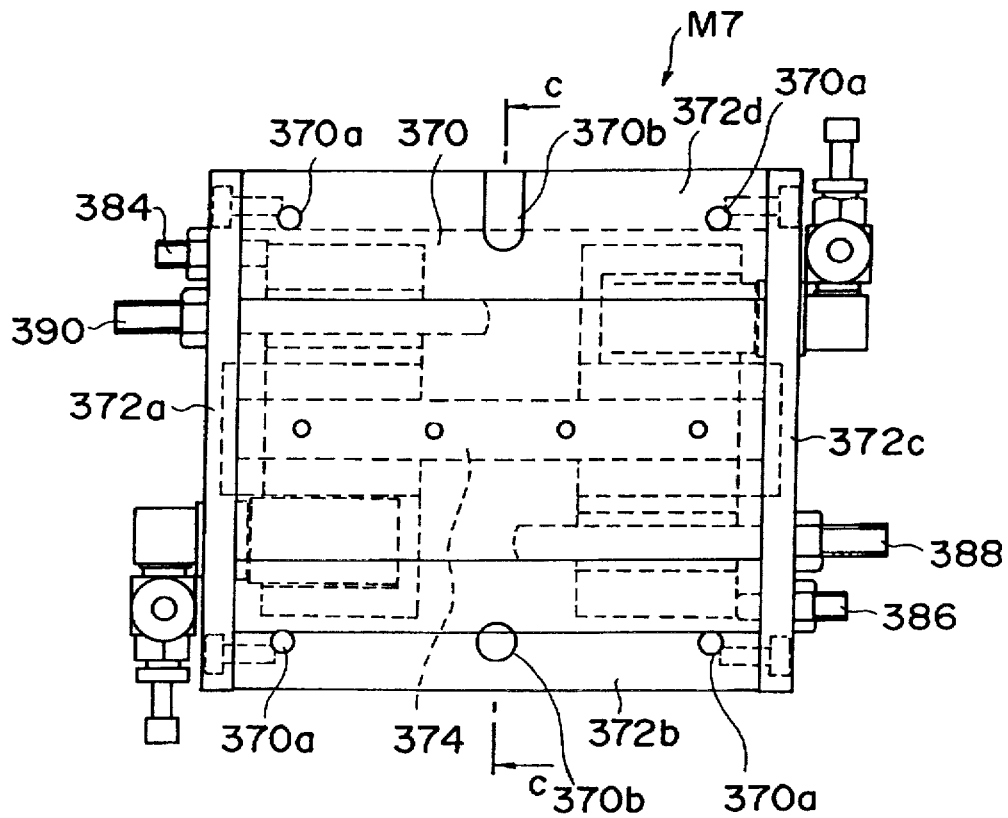
F I G. 73
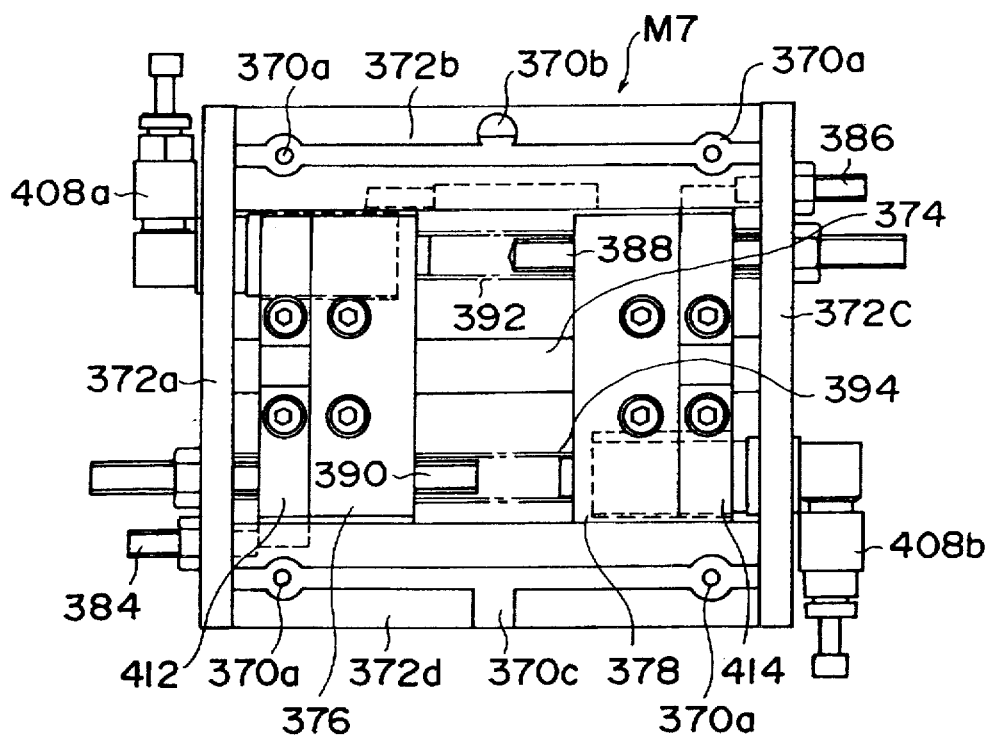
F I G. 74

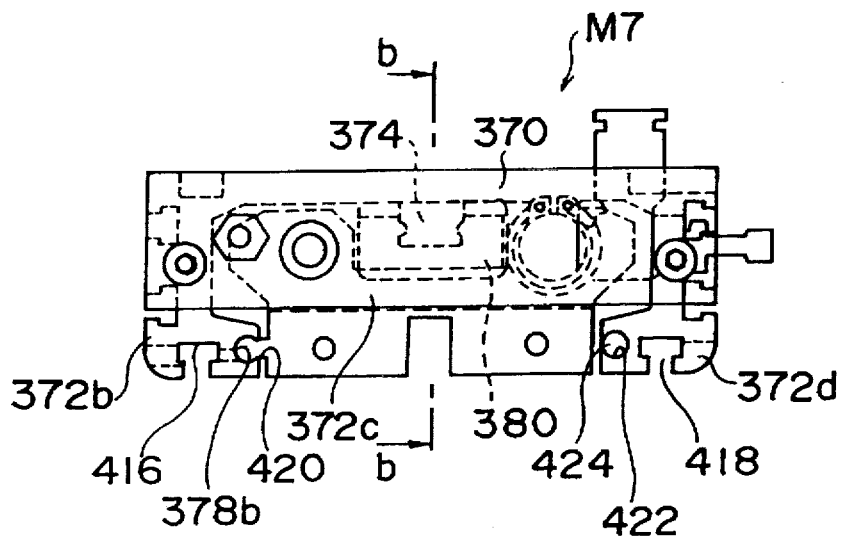
F I G. 75
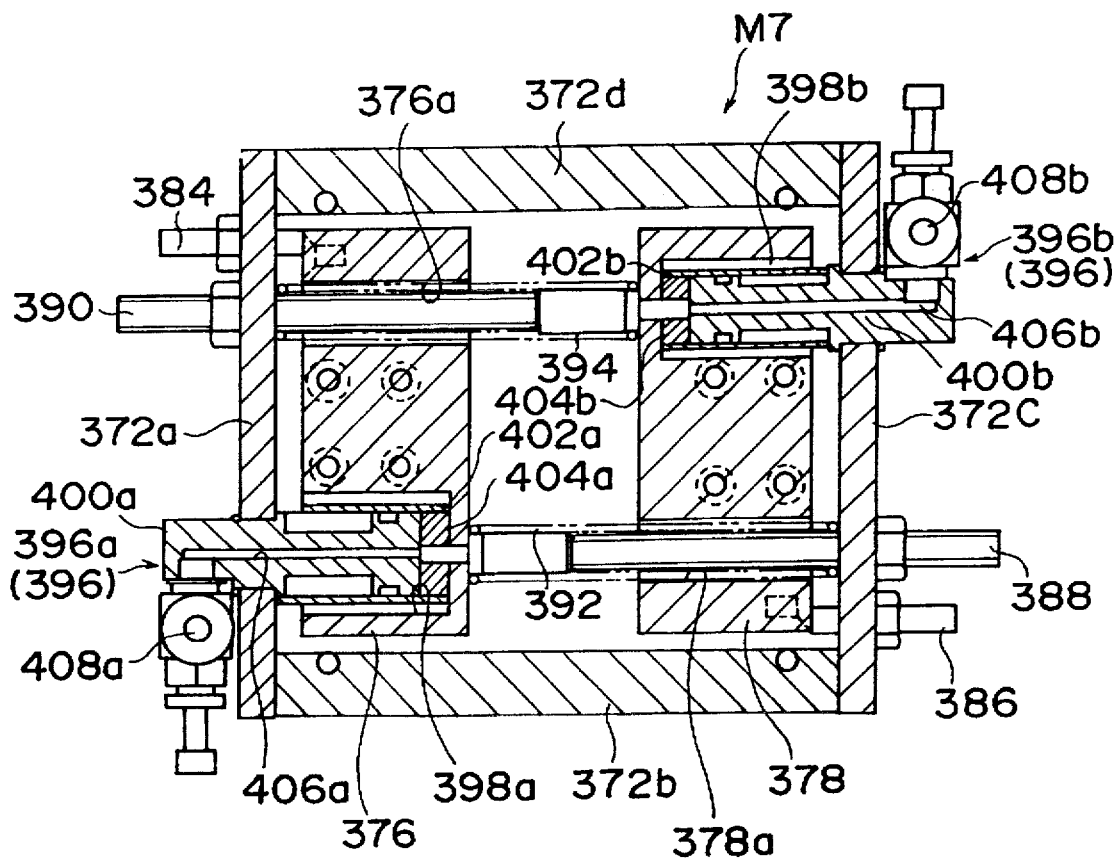
F I G. 76

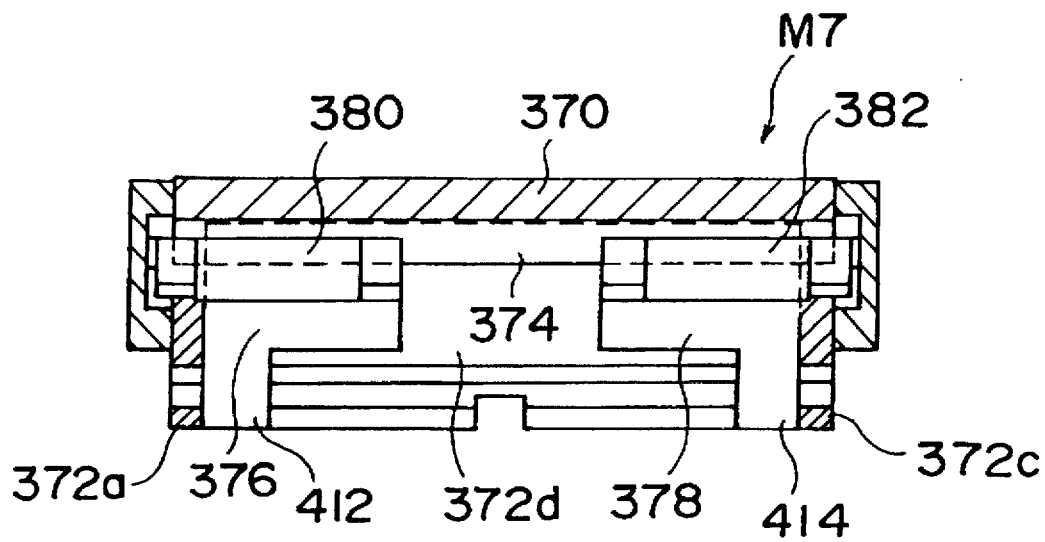
F I G. 77
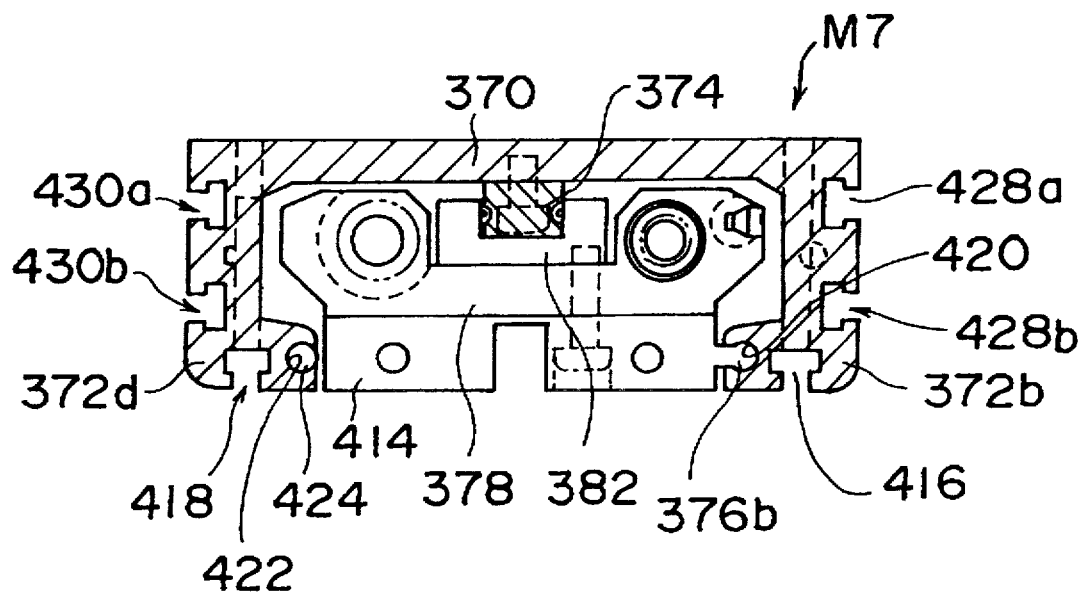
F I G. 78

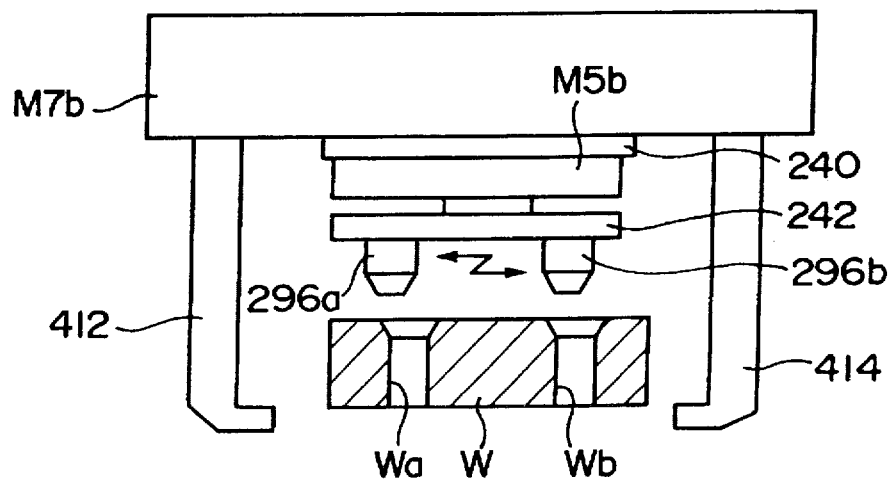
F I G. 86
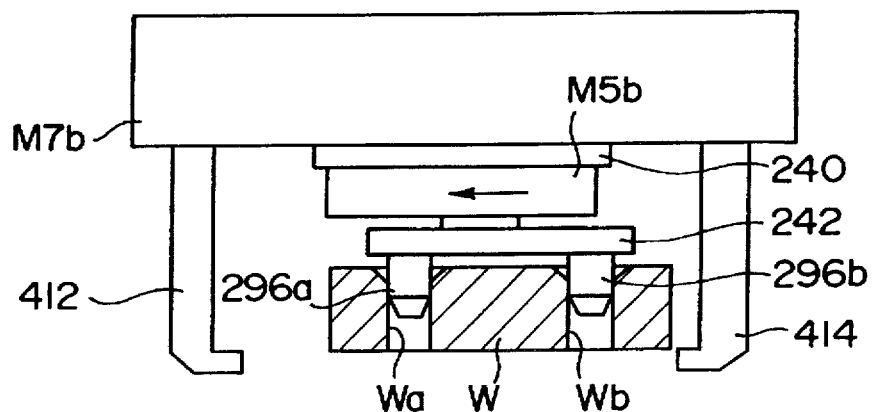
F I G. 87
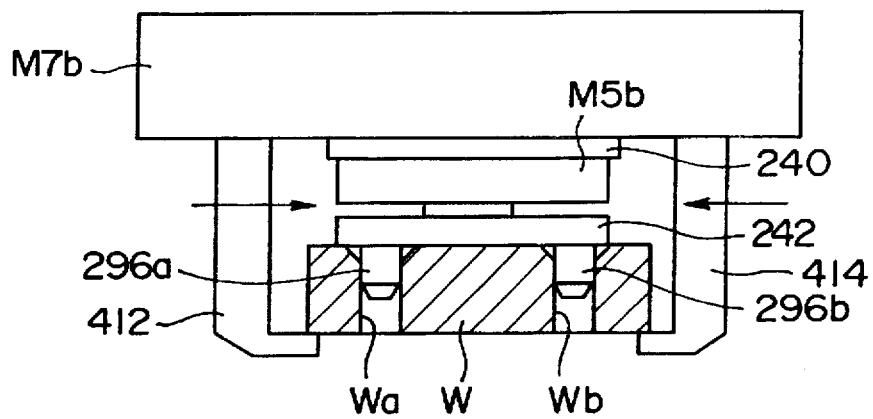
F I G. 88

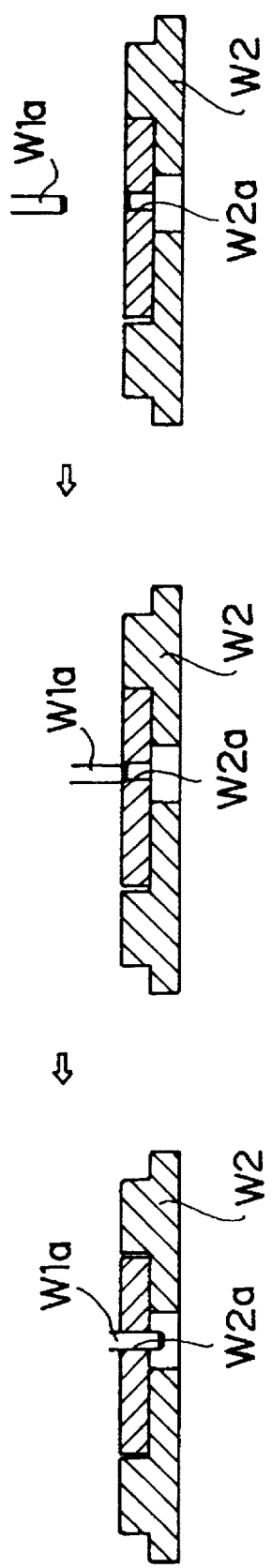

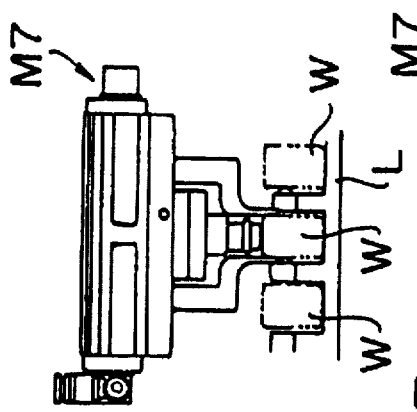
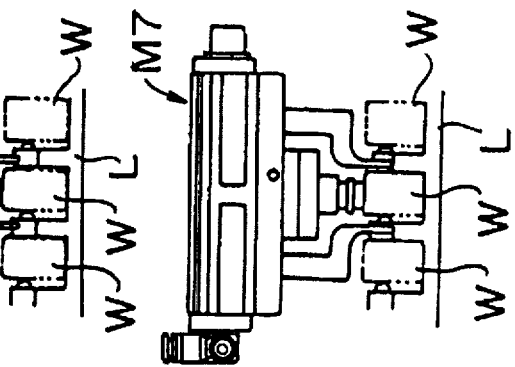
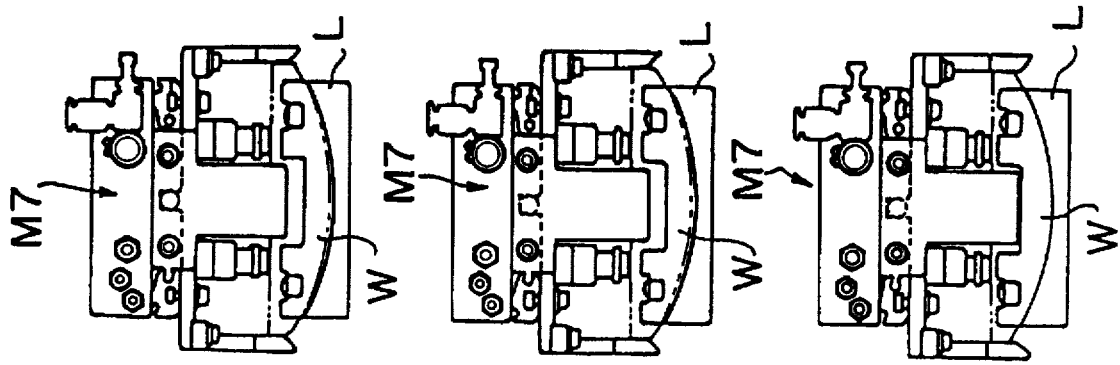
FIG. 103A FIG. 103B FIG. 103C FIG. 103D FIG. 103E FIG. 103F

HAND MECHANISM FOR ROBOT

BACKGROUND OF THE INVENTION

The present invention relates to a hand mechanism for a robot, which is attached to the distal end of an arm unit of a robot, comprising independent modules for executing predetermined elementary motions, which modules can be combined with each other, and appropriately combines arbitrary ones of these modules to realize desired elementary motions.

Conventionally, a hand mechanism for a robot, which is interposed between a finger unit and an arm unit of a robot, and causes the finger unit to perform a predetermined posture conversion operation, normally employs an arrangement for causing the finger unit to perform the posture conversion operation in an arbitrary combination state of elementary motions, i.e., a reverse operation, a shift operation, a turn operation, a cushion operation, and a compliance operation.

However, in such a conventional hand mechanism, one hand mechanism employs an arrangement for causing the finger unit to perform a specific posture conversion operation. When the finger unit is required to perform another posture conversion operation, the hand mechanism must be designed in correspondence with the required operation, and must be entirely replaced.

More specifically, assume that a pin is to be inserted in a hole. In this case, although the arrangement of the finger unit remains the same, the arrangement of the hand mechanism must be uniquely designed and manufactured depending on whether this hole is formed in a horizontal surface or an inclined surface.

in this manner, the conventional hand mechanism must be re-designed in correspondence with a change in posture conversion operation of the finger unit, and must be manufactured to have an arrangement unique to the posture conversion operation. For this reason, in order to change the posture conversion operation, a problem of, e.g., long re-design time is pointed out, and a problem of cost is also posed since a common hand mechanism cannot be used for the respective posture conversion operations.

As techniques for solving these problems, Japanese Patent Application Nos. 1-131402 and 1-131403 as the prior applications by the present applicant are known. A hand mechanism disclosed in these prior applications has the following characteristic feature. That is, the hand mechanism is interposed between a finger unit and an arm unit of a robot, and causes the finger unit to perform a predetermined posture conversion operation. The hand mechanism comprises independent modules for executing elementary motions such as a reverse operation, a shift operation, a turn operation, a cushion operation, and a compliance operation, which modules can be combined with each other, and combines arbitrary ones of these modules to cause the finger unit to perform a predetermined posture conversion operation.

In the hand mechanism according to the prior applications, attaching holes separated at a predetermined pitch are formed in the attaching surfaces of each module, the hand unit, and the finger unit, and a position regulation means for attaching the modules in a predetermined attaching state is arranged.

Since the hand mechanism for a robot with the above-mentioned arrangement comprises the independent modules for executing elementary motions such as a reverse operation, a shift operation, a turn operation, a cushion operation, and a compliance operation, which modules can be combined with each other, modules corresponding to elementary motions necessary for a posture conversion operation of the finger unit need only be combined to achieve a predetermined posture conversion operation of the finger unit without redesigning the hand mechanism.

In the hand mechanism according to the prior applications with the above-mentioned arrangement, since a plurality of modules are combined, the dimensional errors, weights, and heights of the modules are accumulated. As a result, when the modules are combined to satisfy a predetermined function, the weight, height, attaching precision, or the like exceeds an allowance, and the hand mechanism cannot often be practically used.

For this reason, in the hand mechanism constituted by combining a plurality of modules, each module is required to have a lightweight, high-precision, and compact structure.

In the hand mechanism according to the prior applications with the above-mentioned arrangement, since a plurality of modules are combined, if the modules are not precisely aligned, the axis of a work undesirably varies upon a rotating operation such as a turn operation or a reverse operation, and the work cannot be placed at an accurate position, thus disabling an assembling operation in practice.

SUMMARY OF THE INVENTION

The present invention has been made in consideration of the above situation, and has as its principal object to provide a hand mechanism for a robot, which comprises a holder module that can attain a lightweight, high-precision, and compact structure.

It is another object of the present invention to provide a hand mechanism for a robot, which can realize an accurate positioning operation of a work, and can reliably execute a work assembling operation.

In order to solve the above-mentioned problems, and to achieve the above objects, according to the first aspect of the present invention, a hand mechanism for a robot is characterized by the following arrangement.

More specifically, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a holder module, which comprises a fixing member fixed to the arm portion, an attaching plate to be attached to another module, and coupling means for coupling the fixing member and the attaching plate. The coupling means comprises angle adjustment means for adjusting an attaching angle of the attaching plate about the arm portion, and a release mechanism for releasing a coupling state between the fixing member and the attaching plate upon application of a shock to the hand mechanism.

According to the second aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a reverse module, which comprises an upper attaching plate, rotation driving means formed integrally with the upper attaching plate, and having an output shaft which is rotated about an axis perpendicular to a central axis thereof, and a lower attaching plate which is fixed to the output shaft of the rotation driving means, and is reversed with respect to the upper attaching plate.

According to the third aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a turn module, which comprises an upper attaching plate, rotation driving means formed integrally with the upper attaching plate, and having an output shaft rotated about a central axis thereof, and a lower attaching plate turned with respect to the upper attaching plate.

According to the fourth aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a cushion module, which comprises an upper attaching plate, a lower attaching plate which extends parallel to the upper attaching plate, and is movable along a central axis thereof, elastic support means for shock-absorbing movement of the lower attaching plate toward the upper attaching plate, and shock-absorbing force adjustment means for adjusting a shock-absorbing force of the elastic support means.

According to the fifth aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a compliance module, which comprises an upper attaching plate, a lower attaching plate attached to oppose the upper attaching plate to be separated therefrom at an interval, and compliance means for elastically maintaining alignment between central axes of the upper and lower attaching plates. The compliance means comprises a first alignment member fixed to the lower attaching plate, and having an outer peripheral portion extending to a lower surface of an outer peripheral portion of the upper attaching plate, a second alignment member fixed to the upper attaching plate, and having an outer peripheral portion extending between the outer peripheral portions of the first alignment member and the lower attaching plate, a bearing, interposed between the first and second alignment members, for permitting relative movement thereof in a plane perpendicular to central axes of the first and second alignment member, and biasing means for biasing the first and second alignment members, so that the central axes thereof are aligned with each other.

According to the sixth aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a shift module, which comprises an upper attaching plate, a lower attaching plate which extends parallel to the upper attaching plate, and is movable along a central axis thereof, movement driving means, integrally attached to the upper attaching plate, for moving the lower attaching plate toward or away from the upper attaching plate, and an intermediate member, interposed between the upper and lower attaching plates, for telescopically moving the upper and lower attaching plates.

According to the seventh aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a clamp module, which comprises an attaching plate, at least a pair of slide members, which are provided to the upper attaching plate to be able to clamp a work, movement driving means for reciprocally slidably moving the slide members between clamp and unclamp positions, and a groove formed in an outer side surface of the attaching plate to have a T-shaped section.

According to the eighth aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a turn module, which comprises an upper attaching plate, rotation driving means formed integrally with the upper attaching plate, and having an output shaft rotated about a central axis thereof, and a lower attaching plate, which is coupled to the output shaft of the rotation driving means to rotate therewith and is turned with respect to the upper attaching plate, a finger module, attached to the lower attaching plate, for clamping a work, and first positioning means for positioning the turn module and the finger module at a predetermined position.

According to the ninth aspect of the present invention, a hand mechanism for a robot is characterized by the following arrangement.

That is, a hand mechanism for a robot, which is attached to a distal end of an arm portion of a robot, comprises independent modules for executing predetermined elementary motions, which modules can be combined with each other, and combines arbitrary ones of the modules to attain desired elementary motions. The hand mechanism comprises a reverse module, which comprises an upper attaching plate, rotation driving means formed integrally with the upper attaching plate, and having an output shaft which is rotated about a reverse axis perpendicular to a central axis thereof, and a lower attaching plate which is fixed to the output shaft of the rotation driving means, and is reversed with respect to the upper attaching plate, a finger module, attached to the lower attaching plate, for clamping a work along one direction, and fifth positioning means for positioning the reverse module and the finger module at a predetermined position.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a perspective view showing the arrangement of the embodiment of the hand mechanism according to the present invention;

FIG. 16 is a front view showing the front shape of the reverse module shown in FIG. 14;

FIG. 17 is a plan view showing the upper shape of the reverse module shown in FIG. 14;

FIG. 18 is a lower view showing the lower shape of the reverse module shown in FIG. 14;

FIG. 19 is a left side view showing the left side shape of the reverse module shown in FIG. 14;

FIG. 20 is a rear view showing the rear shape of the reverse module shown in FIG. 14;

FIG. 21 is a sectional view taken along a line a—a of the reverse module shown in FIG. 16;

FIG. 22 is a sectional view taken along a line b—b of the reverse module shown in FIG. 21;

FIG. 23 is a sectional view taken along a line c—c of the reverse module shown in FIG. 21;

FIG. 36 is a sectional view taken along a line e—e of the turn module shown in FIG. 30;

FIG. 37 is a sectional view taken along a line f—f of the turn module shown in FIG. 29;

FIG. 38 is a front view showing the arrangement of another embodiment of the turn module shown in FIGS. 26 to 37;

FIG. 42 is a plan view showing the upper shape of the cushion module shown in FIG. 40;

FIG. 43 is a lower view showing the lower shape of the cushion module shown in FIG. 40;

FIG. 57 is a sectional view taken along a line d—d of the cushion module shown in FIG. 55;

FIG. 58 is a sectional view taken along a line a—a of the cushion module shown in FIG. 57;

FIG. 71 is a perspective view showing the details of the arrangement of the first embodiment of a clamp module equipped on the hand mechanism shown in FIG. 1;

FIG. 72 is a front view showing the front shape of the clamp module shown in FIG. 71;

FIG. 73 is a plan view showing the upper shape of the clamp module shown in FIG. 71;

FIG. 74 is a lower view showing the lower shape of the clamp module shown in FIG. 71;

FIG. 75 is a right side view showing the right side shape of the clamp module shown in FIG. 71;

FIG. 76 is a sectional view taken along a line a—a of the clamp module shown in FIG. 72;

FIG. 77 is a sectional view taken along a line b—b of the clamp module shown in FIG. 75;

FIG. 78 is a sectional view taken along a line c—c of the clamp module shown in FIG. 73;

FIG. 86 is a front view showing a state wherein a compliance module is attached to the center of the lower surface of an attaching plate of the clamp module of the second embodiment shown in FIG. 83;

FIG. 87 is a front view showing a state wherein a positioning pin is inserted in a deviated work in the state shown in FIG. 86;

FIG. 88 is a front view showing a state wherein a lock mechanism of the compliance module performs a lock operation from the state shown in FIG. 87 so as to align the center of the work with the center of the clamp module;

FIGS. 101A to 101C are front sectional views sequentially showing assembling operations for clamping the first work shown in FIG. 100 by vacuum suction, and inserting it in a second work;

FIGS. 103A–103F are front views sequentially showing operations for accurately positioning and holding the cylindrical lens clamped, as shown in FIGS. 102A to 102C, on a lens holding member.

DETAILED DESCRIPTION OF THE PREFERRED EMBODIMENTS

The arrangement of an embodiment of a hand mechanism for a robot according to the present invention will be described in detail hereinafter with reference to the accompanying drawings.

Schematic Arrangement of Hand Mechanism

Figure 3:
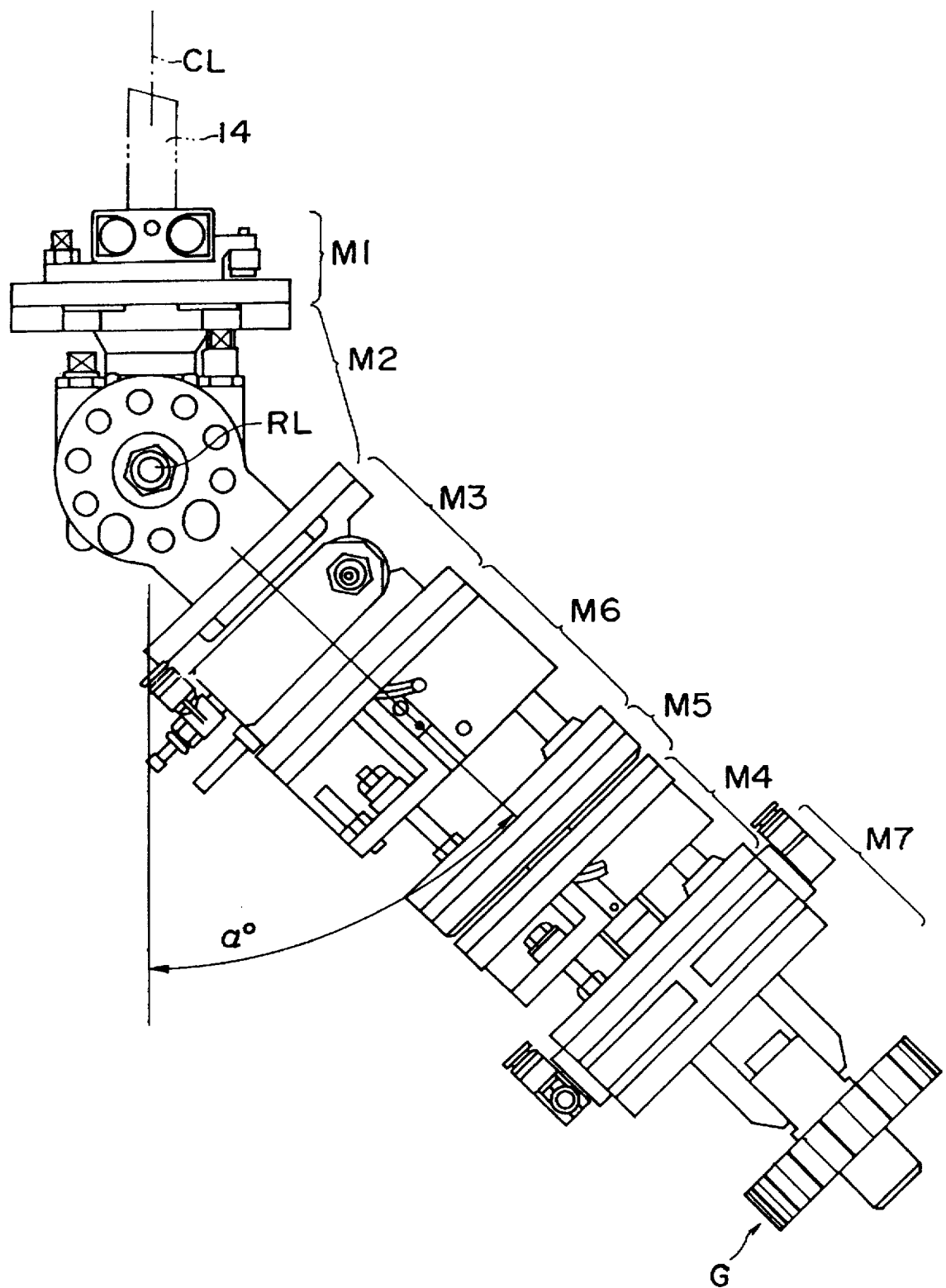
FIG. 3 is a front view showing a state wherein the hand mechanism shown in FIG. 1 is reversed through an angle α, and is turned through 90°.
Figure 4:
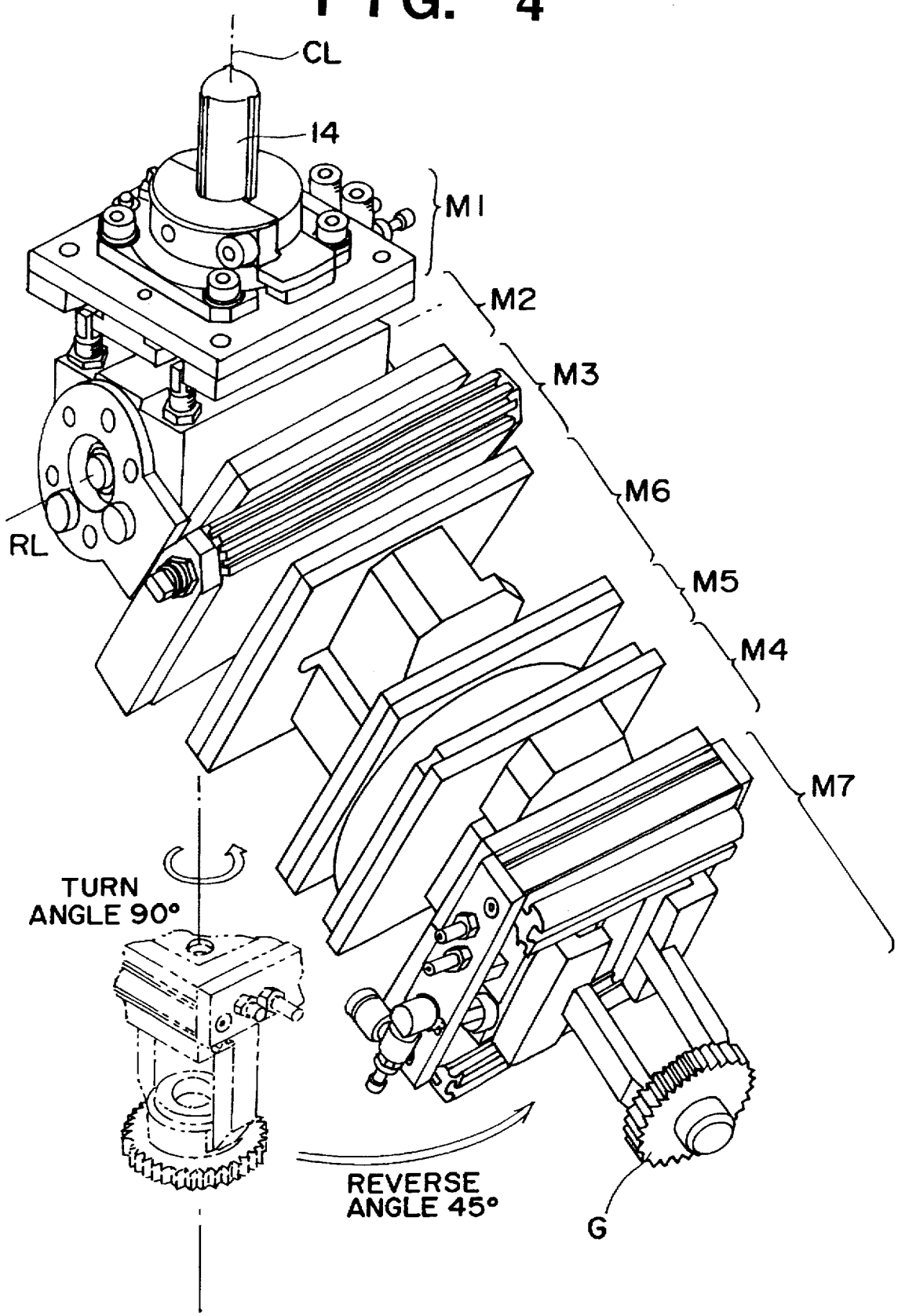
FIG. 4 is a front view showing a state wherein the hand mechanism shown in FIG. 2 is reversed through an angle α, and is turned through 90°.
Figure 5:
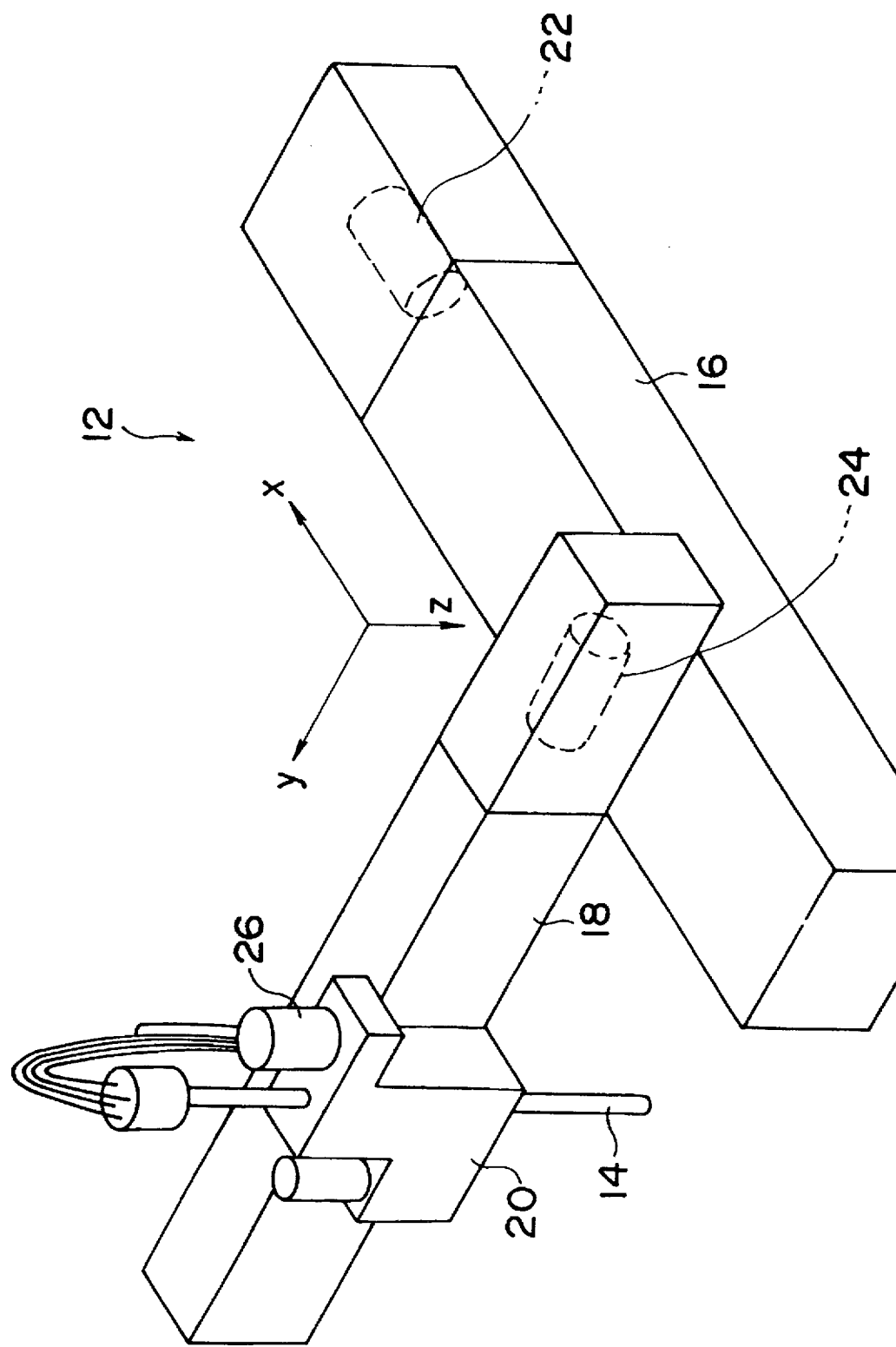
FIG. 5 is a schematic perspective view of the arrangement of a robot adopting the robot mechanism according to the present invention.

As shown in FIGS. 1 to 4, a hand mechanism 10 of this embodiment is attached to the distal end of a z-axis arm 14 as an arm unit of a robot 12 (FIG. 5). The hand mechanism 10 comprises independent modules for executing predetermined elementary motions, which modules can be combined with each other. The hand mechanism 10 attains predetermined elementary motions by properly combining arbitrary ones of these modules. More specifically, the hand mechanism 10 comprises a holder module M1, attached to the lower end of the z-axis arm 14, for allowing attachment of various modules to be described below to the z-axis arm 14, a reverse module M2 for executing a reverse operation, a turn module M3 for executing a turn operation, a cushion module M4 for executing a cushion operation, a compliance module M5 for executing a compliance operation, a shift module M6 for executing a shift operation, and a clamp module M7 for executing a clamp operation of an article in an arbitrary combination. In the arrangement of the embodiment shown in FIGS. 1 to 4, the hand mechanism 10 comprises the seven different modules M1 to M7 from the z-axis arm 14 of the robot 12 to which the hand mechanism 10 is attached toward the distal end in the above-mentioned order.

As shown in FIGS. 3 and 4, the reverse operation of the above-mentioned reverse module M2 means a rotating operation about a rotational axis RL set to be perpendicular to its own central axis CL. The turn operation of the turn module M3 means a rotating operation about an axis along its own central axis CL. The shift operation of the shift module M6 means a moving operation along its own central axis CL. The clamp operation of the clamp module M7 means a grabbing operation for grabbing an article from both sides. As will be described in detail later, these operations function as so-called active modules driven by driving mechanisms equipped in the corresponding modules M2, M3, M6, and M7. The cushion operation of the cushion module M4 means an absorbing operation of an abnormal force acting along its own central axis. The compliance operation of the compliance module M5 means an absorbing operation of a shift in position and a shift in angle in a direction perpendicular to its own central axis. These operations function as so-called passive modules having no driving sources in the corresponding modules M4 and M5, and operated by other modules.

As for the optimal order of these seven modules M1 to M7, as will be described in detail later, the holder module M1 is always directly attached to the lower end of the z-axis arm 14, and the clamp module M7 is attached to the most distal end portion. As a combination of the smallest number of modules, a combination of two modules, i.e., the holder module M1 and the clamp module M7, is present. The presence/absence and order of the reverse module M2, the turn module M3, the cushion module M4, the compliance module M5, and the shift module M6 can be arbitrarily set from the viewpoint of how to attain the posture conversion operation of the clamp module M7.

Figure 6:
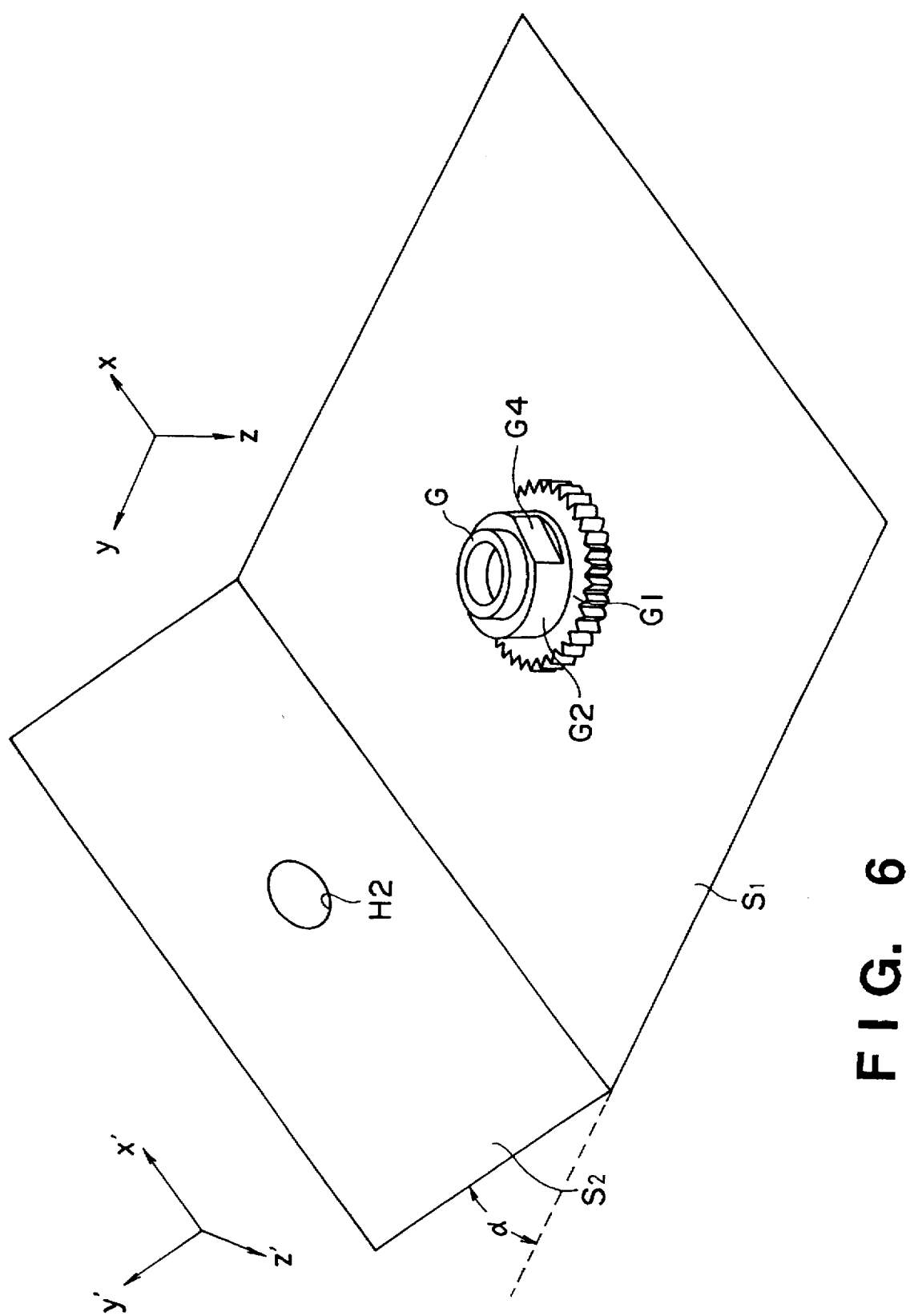
FIG. 6 is a perspective view for explaining an operation for transferring an article clamped by the hand mechanism shown in FIG. 1.
Figure 7:
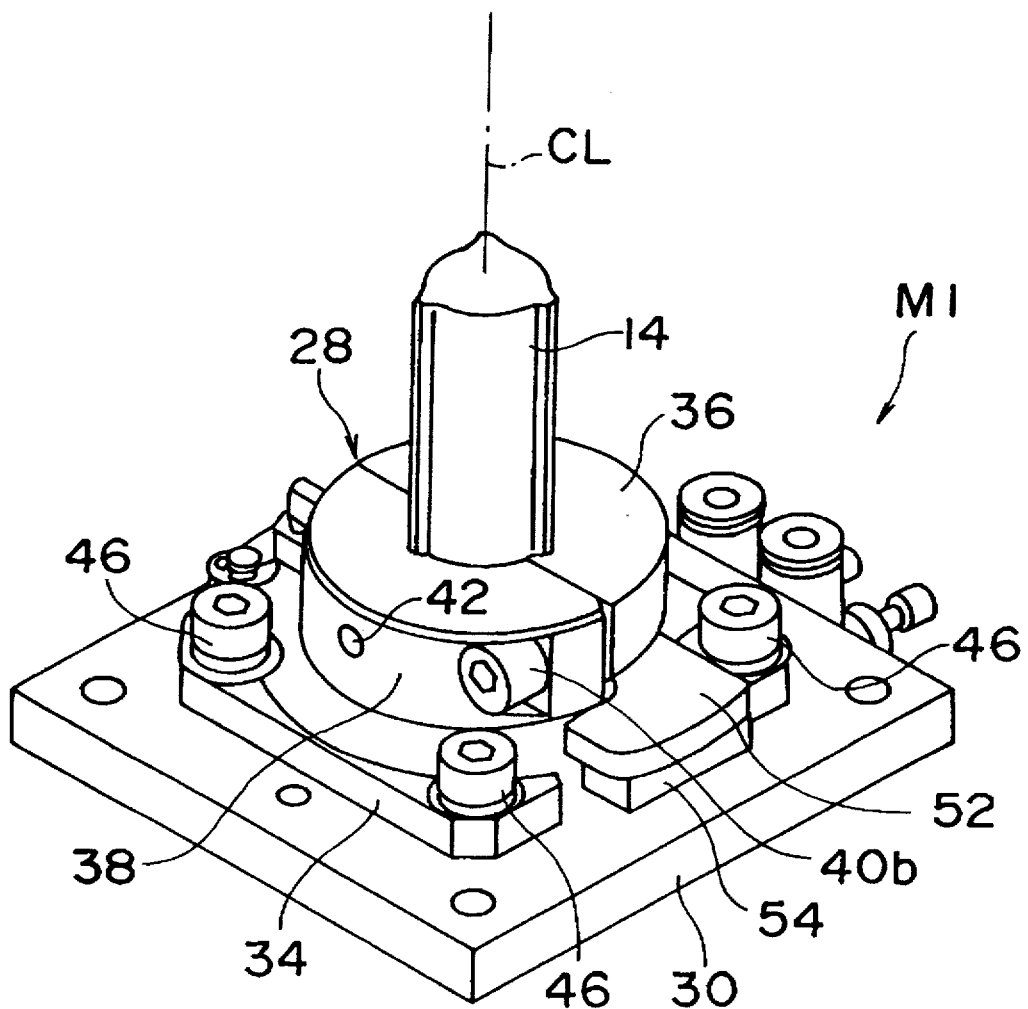
FIG. 7 is a perspective view showing the details of the arrangement of a holder module equipped on the hand mechanism shown in FIG. 1.
Figure 8:
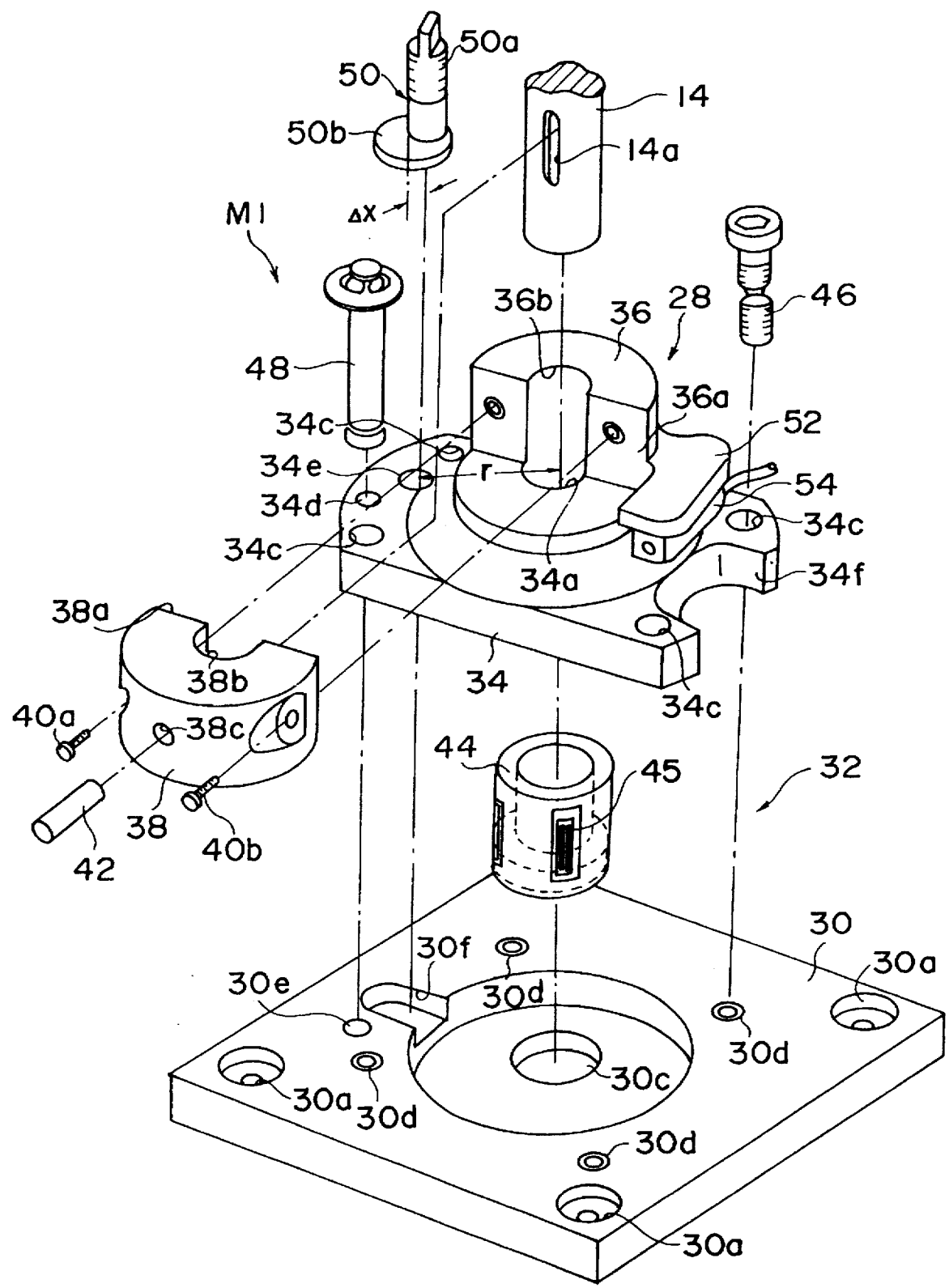
FIG. 8 is an exploded perspective view showing the details of the arrangement of the holder module shown in FIG. 7.

When all these seven modules M1 to M7 are combined, as will be described in detail later, the operation mode of the hand mechanism 10 based on the above-mentioned order of the modules is set to execute the following operations. As shown in FIG. 6, a gear member G placed on a horizontal surface portion $S_1$ in a state wherein its central axis stands upright is grabbed by the clamp module M7 attached to the distal end of the hand mechanism 10. The grabbed gear member G is rotated (reversed) by a predetermined angle α (45° in this embodiment) from the central axis CL of the z-axis arm 14, and is then rotated (turned) by a predetermined angle θ (e.g., 90° in this embodiment) about its own central axis, so that the gear member G is aligned with a hole H2 formed on an inclined surface portion $S_2$ inclined at the angle with respect to the horizontal surface portion $S_1$. Thereafter, the gear member G is inserted in this hole H2.

Figure 1:
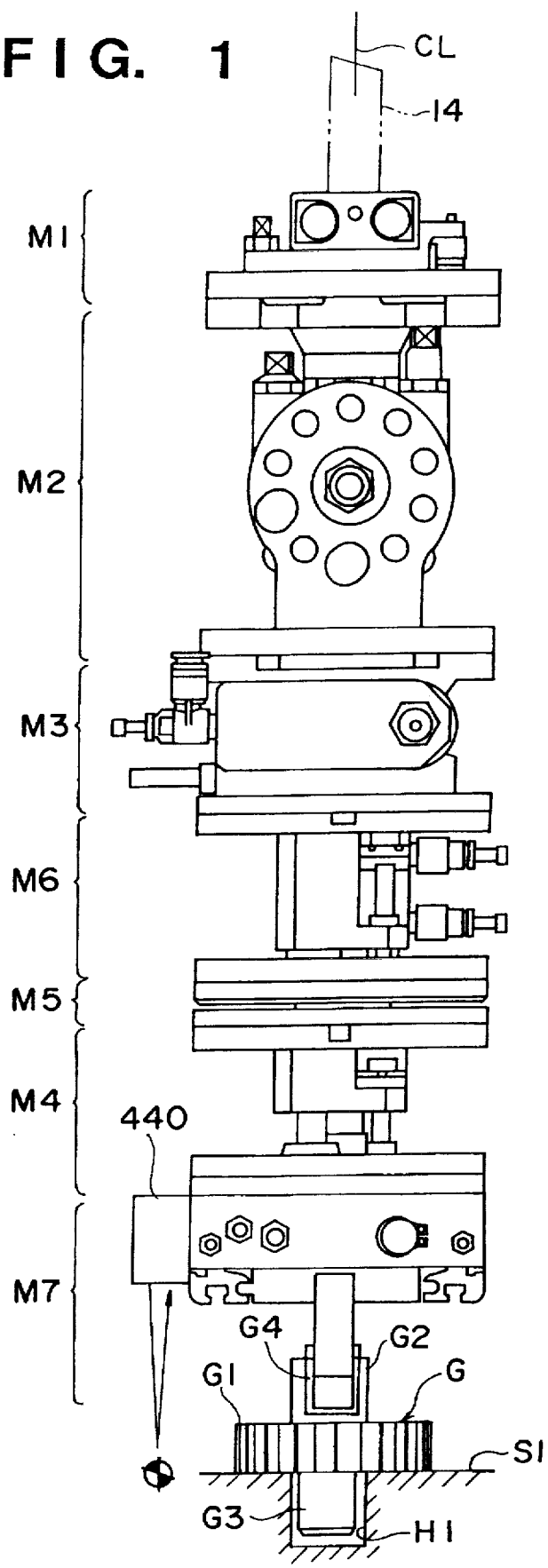
FIG. 1 ms a front view showing an arrangement of an embodiment of a hand mechanism according to the present invention.

As shown in FIG. 6, the gear member G as an article to be grabbed by the hand mechanism 10 is mainly constituted by a gear main body G1, a first shaft portion G2 coaxially and integrally formed on the upper surface (FIG. 6) of the gear main body G1, and a second shaft portion G3 coaxially and integrally formed on the lower surface (FIG. 6) of the gear main body G1, as shown in FIG. 1. Note that a pair of flat portions G4 are formed on opposing portions of the circumferential surface of the first shaft portion G2, as is apparent from FIG. 6, so that the clamp operation of the clamp module M7 can be reliably performed. Before the grabbing operation of the hand mechanism 10, as shown in FIG. 1, the gear member G is placed on the horizontal surface portion $S_1$ in a state wherein its second shaft portion G3 is inserted in a first hole H1 formed in the horizontal surface portion $S_1$. After the grabbing operation of the hand mechanism 10, the gear member G is moved to be placed on the inclined surface portion $S_2$ in such a manner that the second shaft portion G3 is inserted in the second hole H2 formed in the inclined surface portion $S_2$.

Schematic Arrangement of Robot

The robot 12 adopting this hand mechanism 10 is constituted by an x-axis arm 16, a y-axis arm 18 extending perpendicularly to the x-axis arm 16, and attached to the x-axis arm 16 to be movable along the x-axis, a y-axis moving block 20 attached to the y-axis arm 18 to be movable along the y-axis, and the z-axis arm 14 attached to the y-axis moving block 20 to extend therethrough in the vertical direction, and supported to be vertically movable, as shown in FIG. 5. The hand mechanism 10 is attached to the lower end of the z-axis arm 14. More specifically, the modules to be described below are attached to the lower end of the z-axis arm through the above-mentioned holder module M1.

The y-axis arm 16, the y-axis moving block 20, and the z-axis arm 14 are respectively driven by three driving motors 22, 24, and 26 provided thereto.

Description of Modules

The arrangements of the modules M1 to M7 will be described hereinafter.

Description of Holder Module M1

The holder module M1 for attaching various modules of the hand mechanism 10 to the z-axis arm of the robot 12 is arranged, as shown in FIGS. 7 to 13. More specifically, as shown mainly in FIGS. 7 and 8, the holder module M1 is mainly constituted by a fixing member 28 fixed to the lower end of the z-axis arm 14, an attaching plate 30 to the lower surface of which an arbitrary module is attached, and a coupling mechanism 32 for coupling the fixing member 28 and the attaching plate 30. An axially elongated groove 14a having a predetermined depth is formed in the outer circumferential surface of the lower end of the z-axis arm 14 so as to inhibit pivotal motion of the holder module M1 attached to the z-axis arm 14 about the central axis.

More specifically, the fixing member 28 is constituted by a main body 34 which is placed on the upper surface of the attaching plate 30, and through which a through hole 34a for receiving the z-axis arm 14 is formed to extend along the central axis, a semi-columnar receiving portion 36 which integrally stands upright from the outer peripheral portion of the main body 34 corresponding to the semi-circular portion of the through hole 34a, and is formed with a groove 36b having a semi-circular section and communicating with the semi-circular portion of the through hole 34a in one flat side surface 36a, and a semi-columnar pressing portion 38 which is arranged separately from the receiving portion 36, has one flat side surface 38a contacting the side surface of the receiving portion 36, and is formed with a groove 38b having a semi-circular section, and communicating with the remaining semi-circular portion of the through hole 34a in the side surface. More specifically, when the pressing portion 38 is coupled to the receiving portion 36, so that their side surfaces contact each other, a through hole (36b, 38b) for receiving the z-axis arm 14 is formed to extend along the central axis of this coupled body.

In a state wherein the z-axis arm 14 is inserted in the through hole defined by the grooves 36b and 38b each having the semi-circular section, the side surface 36a of the receiving portion 36 is separated from the side surface 38a of the pressing portion 38. The receiving portion 36 and the pressing portion 38 are fastened through a pair of bolts 40a and 40b, so that their side surfaces 36a and 38a are close to each other. In this manner, when the receiving portion 36 and the pressing portion 38 are fastened, the z-axis arm 14 is fixed therebetween.

Note that a radial insertion hole 38c for receiving a pin 42 is formed in the pressing member 38. When the distal end of the pin 42 is fitted in the above-mentioned elongated groove 14a, relative rotation between the z-axis arm 14 and the fixing member 28 is inhibited, and a fixing state therebetween can be reliably attained.

Figure 9:
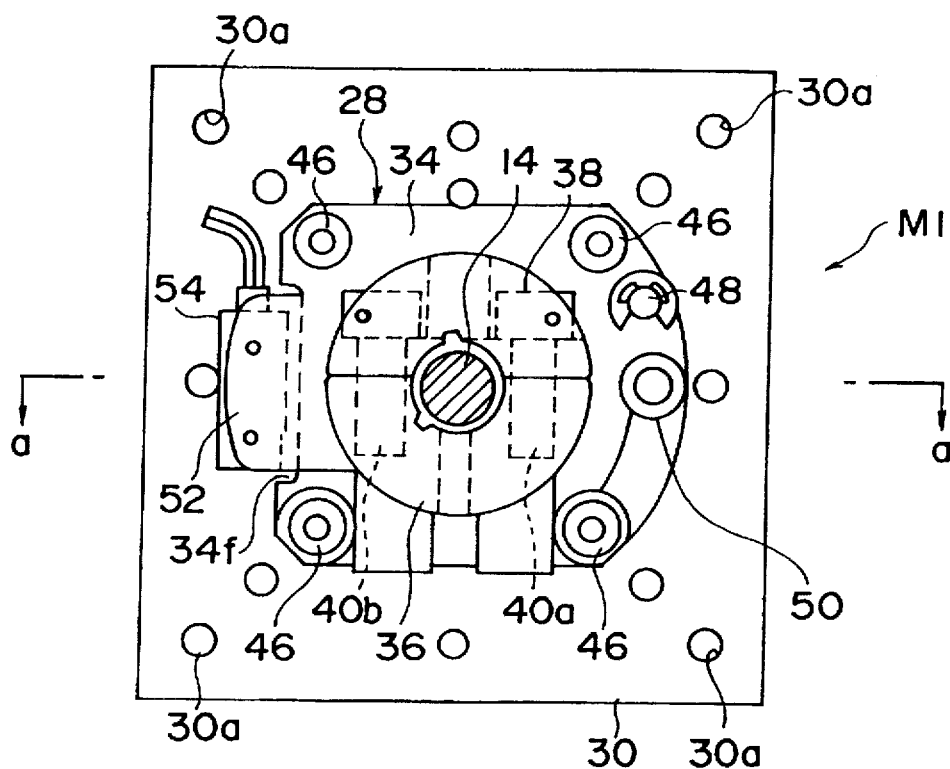
FIG. 9 is a plan view showing the arrangement of the holder module shown in FIG. 7.
Figure 10:
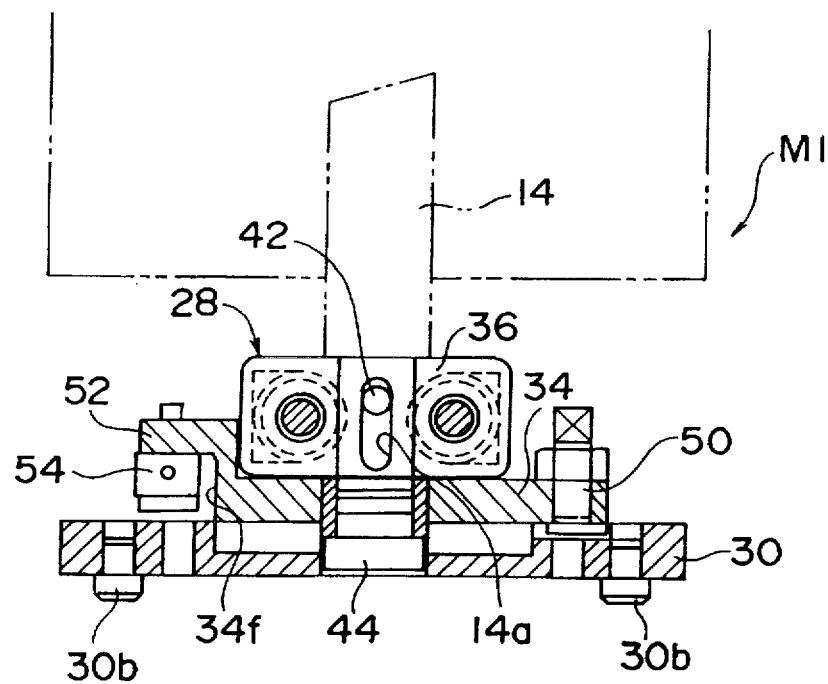
FIG. 10 is a longitudinal sectional view taken along a line a—a of the holder module shown in FIG. 9.
Figure 11:
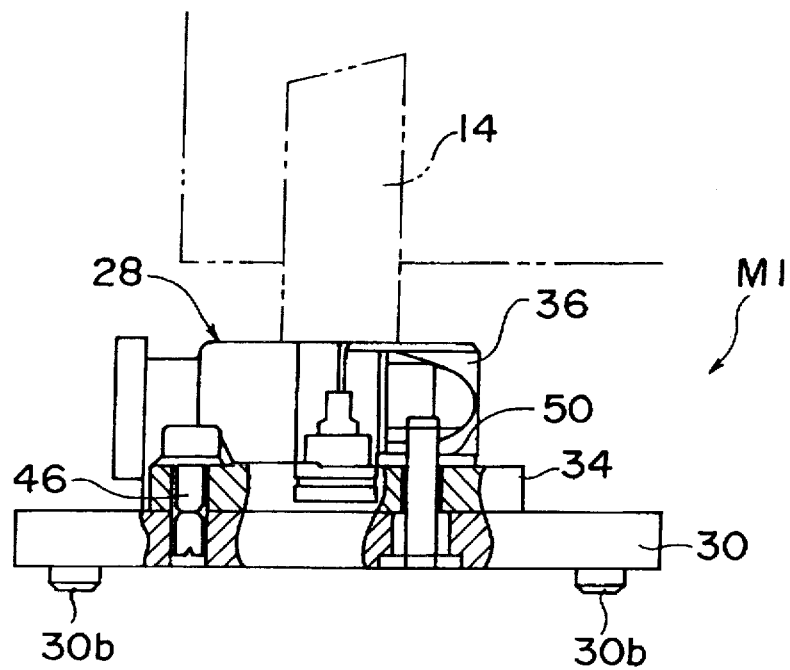
FIG. 11 is a right side view showing the right side shape of the holder module shown in FIG. 9.
Figure 12:
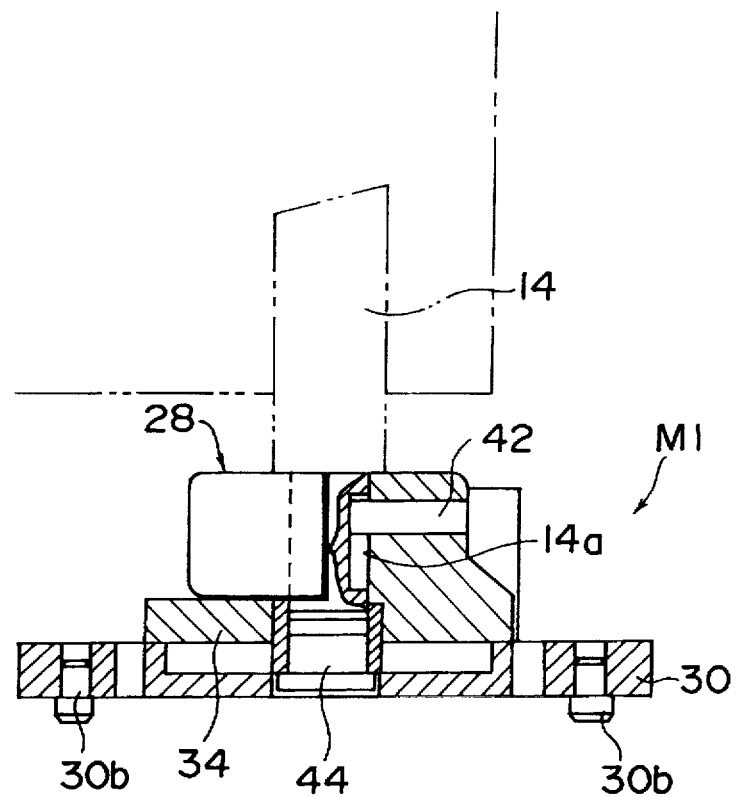
FIG. 12 is a left side view showing the left side shape of the holder module shown in FIG. 9.
Figure 13:
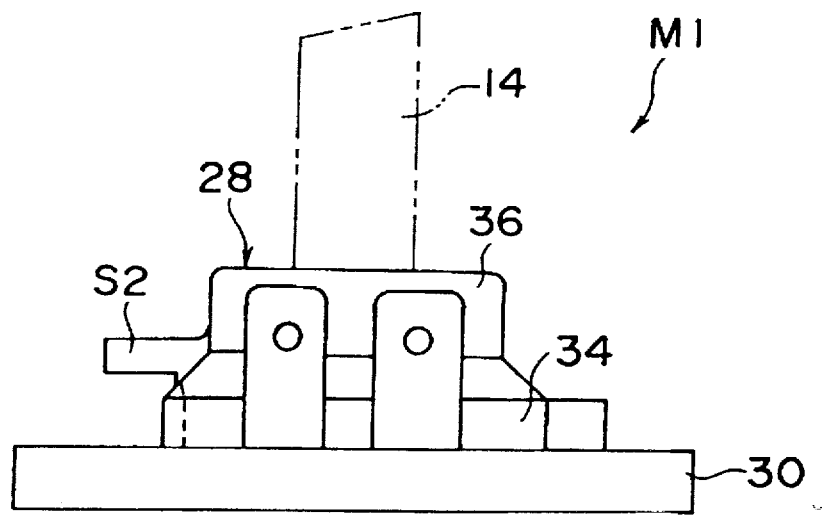
FIG. 13 is a front view showing the front shape of the holder module shown in FIG. 9.

As shown in FIG. 9, attachment through holes 30a for attaching various modules of the hand mechanism 10 are formed at the four corners of the attaching plate 30 to extend therethrough in the vertical direction. The diameter and arrangement pitch of each of these through holes 30a are respectively set to be a predetermined value $d_1$ and a predetermined distance $D_1$. A pair of positioning pins 30b having a predetermined diameter $d_2$ project downward from the lower surface of the attaching plate 30 to be separated at a predetermined distance $D_2$ so as to accurately regulate the attaching positions of the modules M2 to M7 to be attached to the attaching plate 30.

The coupling mechanism 32 for coupling the attaching plate 30 and the fixing member 28 comprises a center ring 44 for matching the central axis of the z-axis arm 14 and that of the attaching plate 30 with each other. The center ring 44 is formed to have a sleeve shape. In a state wherein the lower end of the z-axis arm 14 is fitted in the upper end opening of the center ring 44, and the lower end of the center ring 44 is fitted in a positioning hole 30c formed in the central portion of the attaching plate 30, the central axis of the z-axis arm 14 can be aligned with that of the attaching plate 30.

The center ring 44 is formed to cause a predetermined deformation upon application of a shearing force along a direction perpendicular to its central axis (i.e., a direction in which the fixing member 28 and the attaching plate 30 are shifted from each other to have their attaching surfaces as a boundary), so that it can serve as a hysteresis member. A strain sensor 45 is attached to the outer circumferential surface of the center ring 44 so as to be able to detect the magnitude of the shearing force acting on the center ring 44. The strain sensor 45 is connected to a controller (not shown), and always outputs the detection result thereto. The controller generates an alarm on the basis of the detection result output from the strain sensor 45 when the detected strain amount exceeds an allowable value.

More specifically, when the hand mechanism 10 lightly contacts an unexpected obstacle, and receives a shock while the robot 12, which comprises at least one module attached to the holder module M1, is executing a predetermined assembling operation, an error (a shift amount between the central axes of the z-axis arm 14 and the attaching plate 30) generated by this contact is suppressed to be small, and no problem is posed even when the assembling operation is continued thereafter. However, when such a light contact is repeated, errors generated by such contacts are accumulated, and an accurate assembling operation may be disabled. For this reason, the controller always monitors the detection result output from the strain sensor 45. When the accumulated value and/or each detection value exceeds a predetermined allowable value, the controller generates an alarm so as to re-align the central axes of the z-axis arm 14 and the attaching plate 30 in the holder module M1.

In this embodiment, a shock acting on the hand mechanism 10 is detected by using the strain sensor 45. However, the present invention is not limited to this arrangement. For example, an arrangement without the strain sensor 45 may be adopted. More specifically, when the strain sensor 45 is not arranged, the shock acting on the hand mechanism 10 remains as a permanent deformation of the center ring 44 serving as the hysteresis ring. For this reason, when the hand mechanism 10 is overhauled thoroughly in, e.g., a periodic inspection, the center ring 44 is detached, and the presence/absence of deformation is inspected to check if a shock acted on the hand mechanism 10. If it is determined that a shock acted on the hand mechanism 10, a necessary inspection is requested.

First attaching holes 34c are formed at the four corners of the main body 34 of the fixing member 28 to extend therethrough in the direction of thickness, and screw holes 30d are formed in the attaching plate 30 in correspondence with these first attaching holes 34c. The above-mentioned coupling mechanism 32 comprises shear pin bolts 46, which are inserted through the attaching holes 34c, so that their distal ends are threadably engaged with the corresponding screw holes 30d. The shear pin bolts 46 are used for attaching the fixing member 28 and the attaching plate 30 with a predetermined attaching strength. Each shear pin bolt 46 has a notch as a weak portion at substantially the central portion in its longitudinal direction. Due to the presence of this notch, when a shock beyond the above-mentioned attaching strength acts on the hand mechanism 10, each shear pin bolt 46 is broken at the corresponding notch, and is divided into upper and lower halves.

More specifically, since this holder module M1 has the predetermined attaching strength, no problem is posed upon execution of a normal assembling operation. However, if the hand mechanism 10 collides against a stationary member during an assembling operation, and receives a strong shock, the shear pin bolts 46 are broken to release coupling between the z-axis arm 14 and the attaching plate 30. Thus, the robot 12 can be prevented from being broken by the shock transmitted to the robot 12.

A second attaching hole is formed in a portion of the main body 34 to extend therethrough in the direction of thickness, and an attaching hole 30e is formed in the attaching plate 30 to extend therethrough in the direction of thickness in correspondence with the second attaching hole 34d. A drop prevention pin 48 is attached to the above-mentioned coupling mechanism 32 to extend through these attaching holes 34d and 30e. The drop prevention pin 48 is formed to have a length larger than the total of the thickness of the main body 34 of the fixing member 28, and the thickness of the attaching plate 30. The upper end of the pin 48 can be locked with the upper surface of the main body 34 of the fixing member 28, and the lower end thereof can be locked with the lower surface of the attaching plate 30. Note that the diameter of the drop prevention pin 48 is set to be smaller than the diameters of the attaching holes 34d and 30e, so that the presence of the drop prevention pin 48 does not disturb an angle adjustment operation by means of an eccentric pin 50 (to be described later) for adjusting an angle.

In this manner, as described above, when a strong shock acts on the hand mechanism 10, the shear pin bolts 46 are broken, and the coupling state between the fixing member 28 and the attaching plate 30 is released, the attaching plate 30 is suspended from the fixing member 28 by the drop prevention pin 48. As a result, even when the coupling state between the fixing member 28 and the attaching plate 30 is released, various modules M2 to M7 attached to the lower surface of the attaching plate 30 can be reliably prevented from dropping onto a floor surface and being damaged.

A third attaching hole 34e is formed in a portion of the main body 34 of the fixing member 28 to extend in the direction of thickness, and a radially elongated groove 30f is formed in the upper surface of the attaching plate 30 in correspondence with the third attaching hole 34e. The above-mentioned coupling mechanism 32 comprises the eccentric pin 50 for adjusting an attaching angle. The pin 50 extends through the third attaching hole 34e, and its lower end is fitted in the elongated groove 30f. The eccentric pin 50 is constituted by a pin main body 50a extending through the third attaching hole 34e, and an eccentric disk 50b, which is integrally attached to the lower end of the pin main body 50a in an eccentric state by an eccentric amount $\Delta x$, and is fitted in the above-mentioned elongated groove 30f. The diameter of the eccentric disk 50b is set to substantially match with the width of the elongated groove 30f. The third attaching hole 34e is formed at a position deviated from the central position of the fixing member 28 by a radius r.

With this arrangement, when this eccentric pin 50 is pivoted about its own central axis in the third attaching hole 34e, the attaching angle of the attaching plate 30 with respect to the z-axis arm 14 can be adjusted within a range of a maximum of $\tan^{-1}(\Delta x/r)$.

An almost horizontal attaching piece 52 is integrally formed aside the receiving portion 36 of the above-mentioned fixing member 28. A first sensor 54 for detecting if the attaching plate 30 is attached to the fixing member 28 in a normal state is attached to the lower surface of the attaching piece 52. A recess portion 34f is formed in a portion of the main body 34 located immediately below the first sensor 54 so as not to disturb the detection operation of the first sensor 54. The first sensor 54 can directly detect the upper surface of the attaching plate 30 through the recess portion 34f.

In this embodiment, the first sensor 54 comprises a proximity sensor. When the upper surface of the attaching plate 30 is separated from the first sensor 54 at a predetermined distance, the sensor 54 does not generate any detection signal. As described above, when the shear pin bolts 46 are broken to release the coupling state between the fixing member 28 and the attaching plate 30, and the attaching plate 30 is suspended from the fixing member 28 by the drop prevention pin 48, the upper surface of the attaching plate 30 is separated from the first sensor 54 beyond the predetermined distance. As a result, the first sensor 54 outputs a predetermined first detection signal to the controller, thereby informing that the attaching state of the attaching plate 30 to the fixing member 28 is released.

Description of Reverse Module M2

The reverse module M2 for executing the above-mentioned reverse operation is arranged, as shown in FIGS. 14 to 23, as one embodiment. As mainly shown in FIGS. 14 and 15, the reverse module M2 comprises a pair of upper and lower attaching plates 62 and 64, which are attached to be relatively pivotal about a pivot shaft 60 set to be perpendicular to the central axis of the reverse module M2 (i.e., the central axis CL of the z-axis arm 14). A vane type pneumatic rotation driving mechanism 65 for reversing the lower attaching plate 64 with respect to the upper attaching plate 62 is integrally attached to the lower surface of the upper attaching plate 62. More specifically, the rotation driving mechanism 65 comprises a main body block 66, which integrally projects downward from the lower surface of the upper attaching plate 62. A vane chamber 68 having a circular section is formed in the main body block 66. The central axis of the vane chamber 68 is set to coincide with the central axis of the above-mentioned pivot shaft 60.

Figure 14:
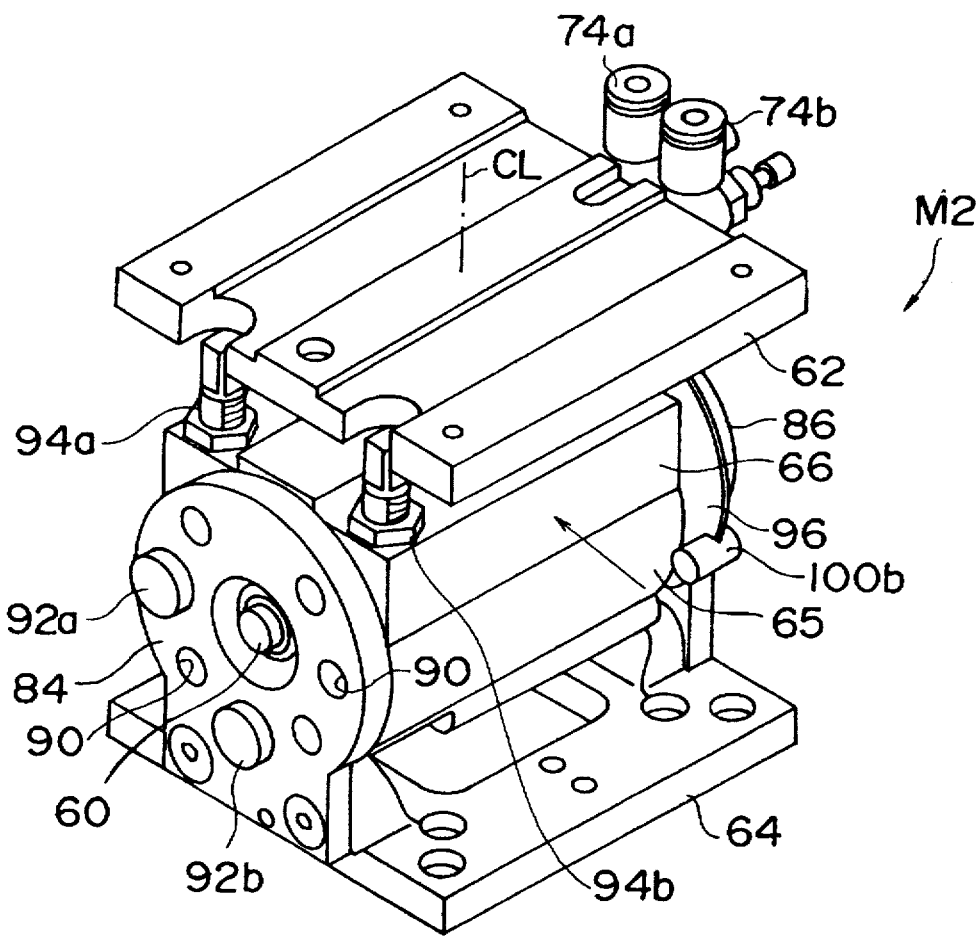
FIG. 14 is a perspective view showing the details of the arrangement of an embodiment of a reverse module equipped on the hand mechanism shown in FIG. 1.
Figure 15:
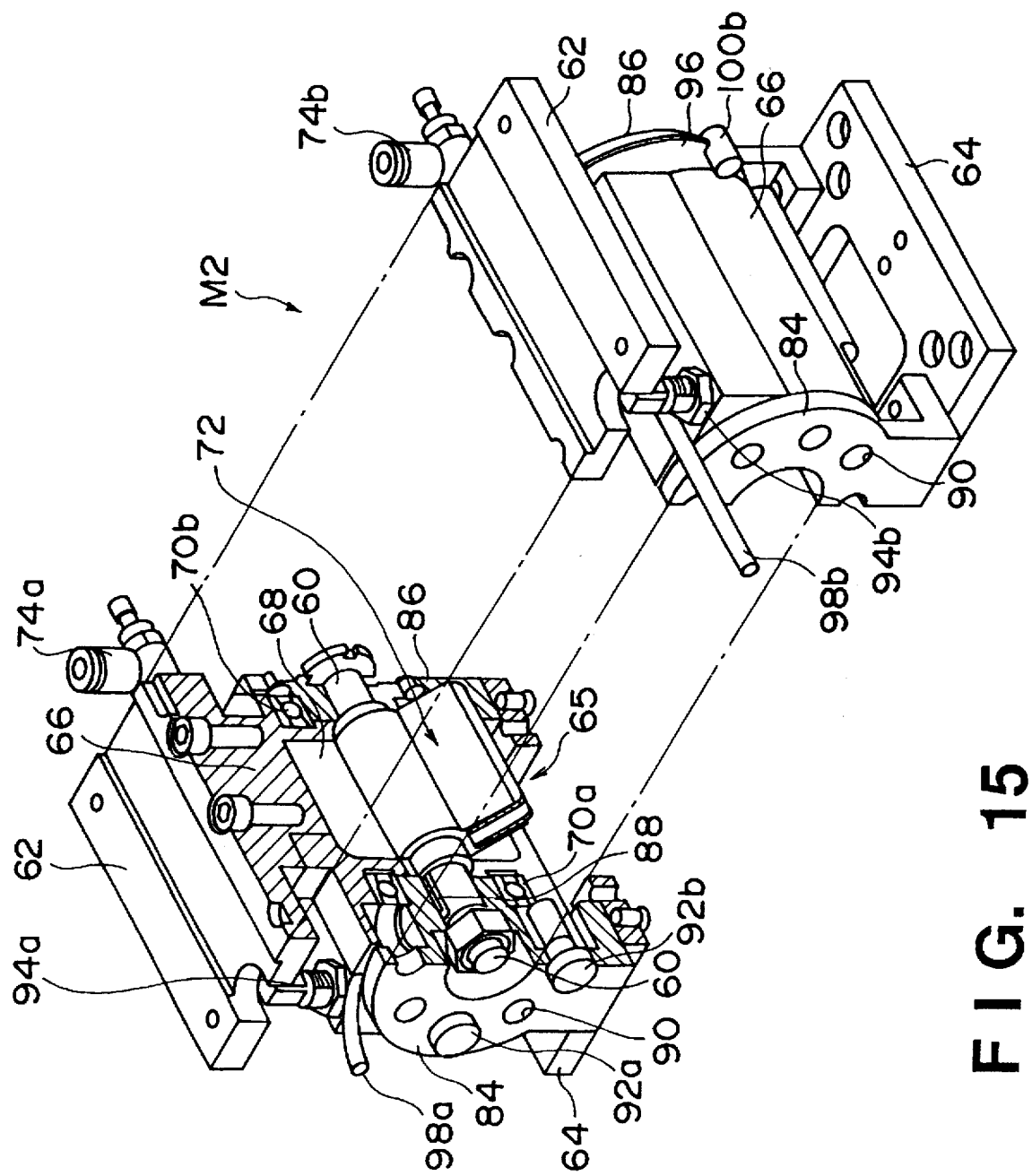
FIG. 15 is an exploded perspective view showing the internal arrangement of the reverse module shown in FIG. 14.

More specifically, the pivot shaft 60 is axially supported by the main body block 66 through a pair of bearings 70a and 70b to coaxially extend therethrough. A radially extending vane body 72 is attached to a portion of the pivot shaft 60, which is located in the vane chamber 68, over the total length in the axial direction. The vane chamber 68 is divided into two sub vane chambers 68a and 68b by the vane body 72, as shown in FIG. 22. In order to selectively supply compressed air as a working fluid to these sub vane chambers 68a and 68b or to selectively exhaust compressed air from these sub vane chambers 68a and 68b, a pair of air ports 74a and 74b are attached to the upper attaching plate 62, as shown in FIGS. 14 and 15.

As shown in FIG. 22, a first connection port 76a for supplying/exhausting compressed air to/from the first sub vane chamber 68a is arranged in the vane chamber 68, and a second connection port 76b for supplying/exhausting compressed air to/from the second sub vane chamber 68b is also arranged adjacent clockwise to the first connection port 76a. These first and second connection ports 76a and 76b communicate with each other through communication paths 78a and 78b formed to extend through the upper attaching plate 62 and the main body block 66. The outer surface of each of these first and second connection ports 76a and 76b is formed to be able to contact the outer surface of the vane body 72, which is pivoted to approach the first or second connection port 76a or 76b. More specifically, the pivot shaft 60 to which the vane body 72 is attached is pivotal between a position where the clockwise end face of the vane body 72 contacts the counterclockwise outer surface of the first connection port 76a and a position where the counterclockwise end face of the vane body 72 contacts the clockwise outer surface of the second connection port 76b.

The above-mentioned first and second air ports 74a and 74b are connected to a pneumatic source 82 through a first selector valve 80 comprising an electromagnetic solenoid valve (to be described later). In a first switching mode, the first selector valve 80 is switched to supply compressed air into the first sub vane chamber 68a through the first air port 74a, and to exhaust compressed air from the second sub vane chamber 68b through the second air port 74b. On the other hand, in a second switching mode, the first selector valve 80 is switched to exhaust compressed air from the first sub vane chamber 68a through the first air port 74a, and to supply compressed air into the second sub vane chamber 68b through the second air port 74b.

In this manner, when the first selector valve 80 is set in the first switching mode, the pivot shaft 60 is pivoted counterclockwise in FIG. 22, and the lower attaching plate 64 is reversed from a standby position where the plate 64 is parallel to the upper attaching plate 62 to a reverse position reversed through 90°. When the first selector valve 80 is set in the second switching mode, the pivot shaft 60 is pivoted clockwise from the reverse position through 90° and is returned to the standby position shown in FIG. 22.

Side arms 84 and 86 are attached to two ends of the above-mentioned pivot shaft 60, which ends project from the main body block 66, and the above-mentioned lower attaching plate 64 is integrally coupled to the lower ends of these side arms 84 and 86. The left end portion of the pivot shaft 60 and the left side arm 84 in FIG. 15 are connected through a key 88 to be rotated together. As shown in FIG. 15, the left side arm 84 is formed into a substantially circular shape, and a large number of stopper pin insertion holes 90 are formed in the outer peripheral portion of the side arm 84 at equal angular intervals over the entire circumference to extend therethrough in the direction of thickness. Stopper pins 92a and 92b for regulating a reverse angle are inserted and fixed in arbitrary two of these stopper pin insertion holes 90.

As shown in FIGS. 17 and 23, a first shock absorber 94a, which selectively contacts one stopper pin 92a to regulate a first stop position for achieving the standby state of the lower attaching plate 64 with respect to the upper attaching plate 62, and a second shock absorber 94b, which selectively contacts the other stopper pin 92b to regulate a second stop position for achieving the reverse state of the lower attaching plate 64 with respect to the upper attaching plate 62, are juxtaposed on the left side (FIG. 15) of the main block 66 to be inwardly adjacent to the side arm 84. More specifically, the above-mentioned reverse angle is regulated by a pivot angle between these first and second stop positions. The first stop position is indicated by the lower attaching plate 64 illustrated by a solid line in FIG. 23, and the second stop position is indicated by the lower attaching plate 64 illustrated by an alternate long and two short dashed line in FIG. 23.

In the state shown in FIG. 23, the reverse angle is set at 90° and can be set at an arbitrary angle within a range between 1° to 180° by arbitrarily setting the positions of the pair of stopper pins 92a and 92b. Note that the first and second shock absorbers 94a and 94b are set so that their centers are separated by a distance corresponding to the diameter of the circumference on which these stopper pins 92a and 92b are arranged, and they can receive the contact states of the corresponding stopper pins 92a and 92b in a shock-absorbed state at their lower ends. The stop positions of the shock absorbers 94a and 94b are regulated at positions where they receive the corresponding stopper pins 92a and 92b in a shock-absorbed state.

Although not shown, dummy pins are inserted in remaining stopper pin insertion holes 90 which do not receive the stopper pins 92a and 92b. Each dummy pin is formed to have a length so as not to contact the shock absorbers 94a and 94b. In this manner, when the pair of stopper pins 92a and 92b, and the dummy pins are inserted in all the stopper pin insertion holes 90, the inner space of the left side arm 84, i.e., a space where the pair of shock absorbers 94a and 94b are arranged, is practically closed.

A plate 96 for attaching a disk-like sensor dog is fixed inside the right side arm 86 in FIG. 14. On the other hand, as shown in FIG. 22, grooves 66b and 66a for attaching sensors are formed in the right and left outer side surfaces of the main body block 66 at positions opposing the outer peripheral portion of the plate 96. Second and third sensors 98 and 100 for detecting the return and reverse states of the reverse module M2 are respectively stored in these grooves 66a and 66b. A first detection dog 102a, which is detected by the second sensor 98 when the lower attaching plate 64 is set in the return state (or standby state), as indicated by the solid line in FIG. 23, and a second detection dog 102b, which is detected by the third sensor 100 when the lower attaching plate 64 is set in the revere state, as indicated by the alternate long and two short dashed line in FIG. 23, are attached and fixed at predetermined pivot positions on the outer peripheral portion of the above-mentioned plate 96.

Each of the second and third sensors 98 and 100 comprises a proximity sensor, which is turned on when the corresponding first or second detection dog 102a or 102b approaches it. The sensors 98 and 100 are connected to the above-mentioned controller, and output detection results thereto. More specifically, assume that the controller switches the first selector valve 80 to the first switching mode to pivot the pivot shaft 60 counterclockwise (FIG. 23) from the standby state shown in FIG. 23, so that the second stopper pin 92b contacts the corresponding second shock absorber 94b. In this state, when the third sensor 100 does not output an ON signal after an elapse of a predetermined period of time, the controller determines an abnormal state wherein the lower attaching plate 64 is not pivoted from the standby state through the desired reverse angle, and is stopped halfway, and executes an alarm operation. When the third sensor 100 outputs an ON signal within a predetermined period of time, the controller executes the subsequent control sequence.

On the other hand, assume that the controller switches the above-mentioned first selector valve 80 to the second switching mode to pivot the pivot shaft 60 clockwise (FIG. 23) from the reverse state, so that the first stopper pin 92a contacts the corresponding first shock absorber 94a. In this state, when the second sensor 98 does not output an ON signal after an elapse of a predetermined period of time, the controller determines an abnormal state wherein the lower attaching plate 64 is not returned from the reverse state by the desired reverse angle, and is stopped halfway, and executes an alarm operation. When the second sensor 98 outputs an ON signal within a predetermined period of time, the controller executes the subsequent control sequence.

As shown in FIG. 17, attaching screw holes 62a each having the diameter $d_1$ are formed at the four corners of the upper attaching plate 62 to be separated at the above-mentioned predetermined arrangement pitch $D_1$. As shown in FIG. 18, attaching insertion holes 64a are formed at the four corners of the lower attaching plate 64 in the same state as the holes 62a. A positioning hole 62b and a positioning groove 62c for receiving a pair of positioning pins commonly formed on the bottom surface of each of the modules M1 to M6 are formed at the central portions of the opposing two sides of the upper surface of the upper attaching plate 62. A pair of positioning pins 64b, which are respectively inserted in the positioning hole and the positioning groove formed in the upper attaching plate of each of the modules M2 to M7, have the diameter $d_2$, and are separated by the predetermined distance $D_2$, integrally project downward from the central portions of the opposing two sides of the lower surface of the lower attaching plate 64.

In this manner, one of other modules M3 to M7 is selectively attached to the lower portion of the reverse module M2, and one of other modules M1 and M3 to M6 is selectively attached to the upper portion thereof.

Note that the reverse module M2 is not limited to the arrangement of the above-mentioned embodiment, and various modifications may be made within the scope of the invention.

Figure 24:
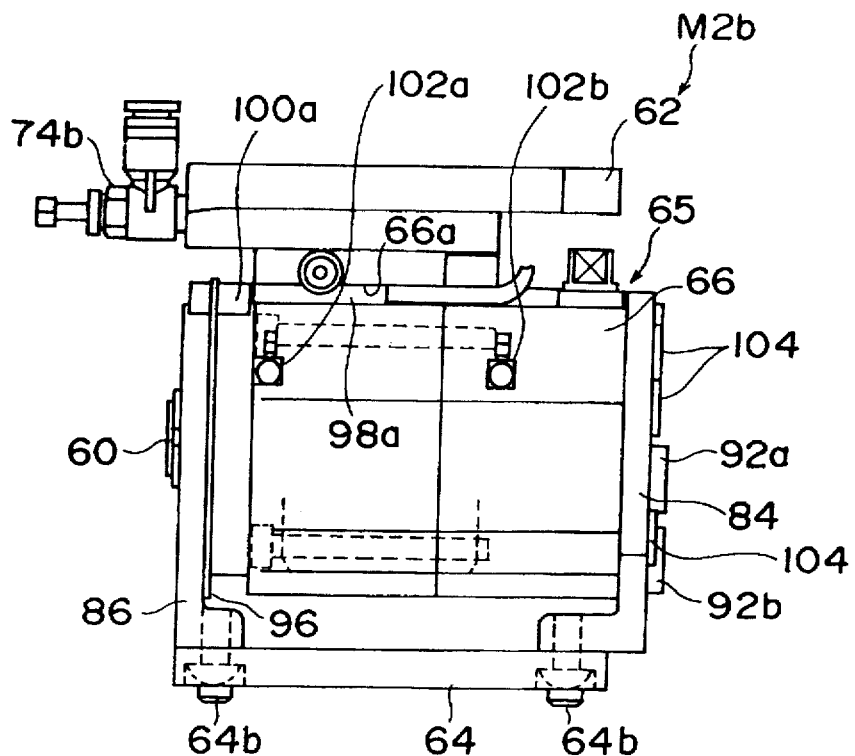
FIG. 24 is a left side view showing the arrangement of another embodiment of a reverse module equipped on the hand mechanism shown in FIG. 1.
Figure 25:
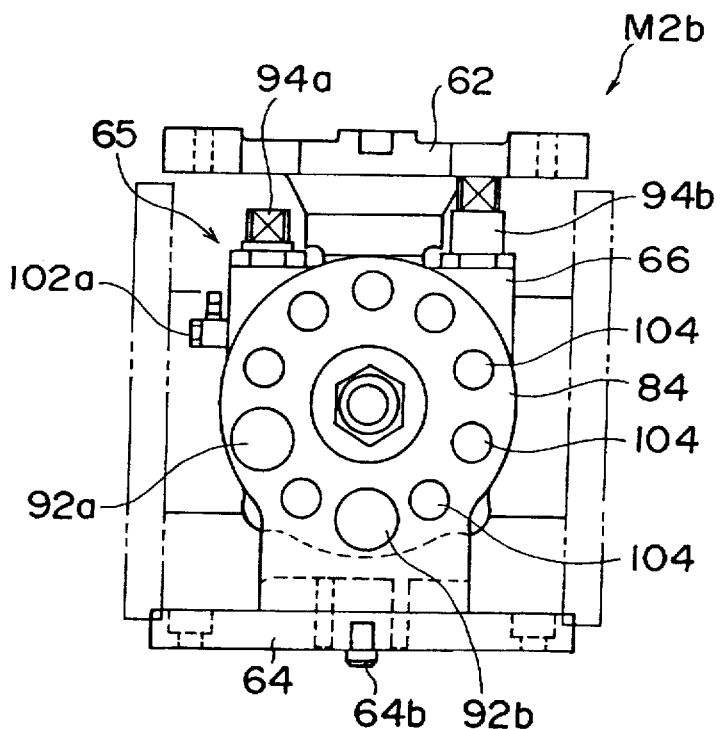
FIG. 25 is a front view showing the front shape of the reverse module of the embodiment shown in FIG. 24.

For example, the reverse module may be arranged as a reverse module M2b according to another embodiment shown in FIGS. 24 and 25. The reverse module M2b of the embodiment shown in FIGS. 24 and 25 has an arrangement especially suitable for a use in a clean room.

The arrangement of the reverse module M2b of this embodiment will be described below. The same reference numerals denote the same parts as in the reverse module M2 of the above embodiment, and a detailed description thereof will be omitted. Thus, only a difference from the reverse module of the above-mentioned embodiment will be explained below.

In this embodiment, as shown in FIGS. 24 and 25, a pair of vacuum ports 104a and 104b are attached to a main body block 66 at positions where the main body block 66 reaches a space wherein a pair of bearings 70a and 70b arranged in the block 66, and a pair of shock absorbers 94a and 94b are arranged. Dummy pins 106 are inserted in stopper pin insertion holes 90 to close them.

This space is formed as a substantially closed space, as has already been described, since all the insertion holes 90 are closed by a pair of stopper pins 92a and 92b and the dummy pins 106. As a result, when this space is evacuated through the pair of vacuum ports 104a and 104b, dust generated in axial supporting operations of the pair of bearings 70a and 70b, and dust generated in positioning operations when the first and second stopper pins 92a and 92b are aligned upon collision against the corresponding first and second shock absorbers 94a and 94b are collected in a cleaner (not shown) without being exhausted outside the reverse module M2b, thus maintaining a clean environment. In this manner, even when the reverse module M2b of this embodiment is used in a clean room, predetermined cleanness is maintained, and the reverse module M2b is suitably used in the clean room.

Description of Turn Module M3

An embodiment of the turn module M3 for executing the above-mentioned turn operation is arranged, as shown in FIGS. 26 to 37. As mainly shown in FIGS. 26 and 27, the turn module M3 comprises a pair of upper and lower attaching plates 112 and 114, which are attached to be relatively pivotal about a pivot support shaft 110 set to extend along the central axis of the module M3. A rotation driving mechanism 116 for turning the lower attaching plate 114 with respect to the upper attaching plate 112 about the central axis of the turn module M3 is integrally attached to the lower portion of the upper attaching plate 112. More specifically, the rotation driving mechanism 116 comprises a main body block 118, which integrally projects downward from the central portion of the lower surface of the upper attaching plate 112. A through hole 120 is formed in the central portion of the main body block 118 to vertically extend therethrough along the central axis.

Figure 34:
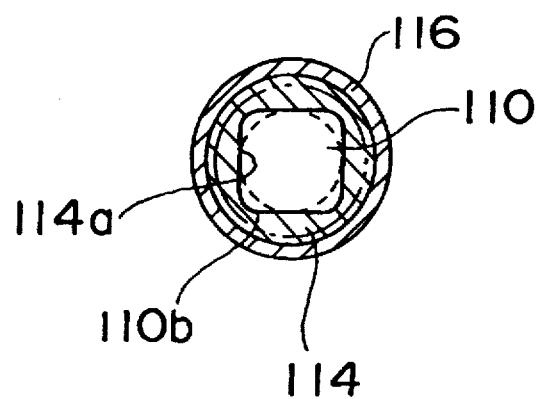
FIG. 34 is a sectional view taken along a line c—c of the turn module shown in FIG. 33.
Figure 35:
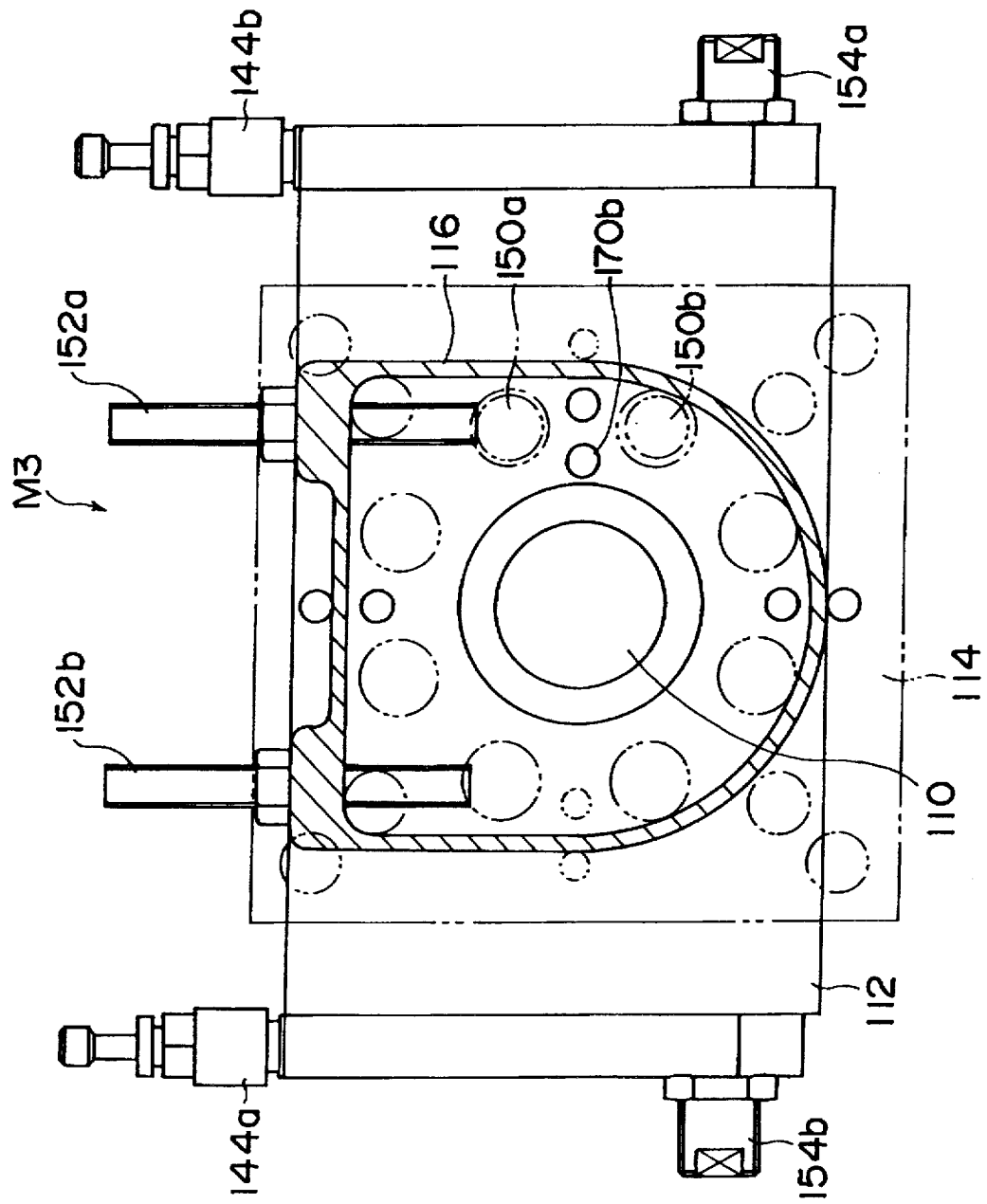
FIG. 35 is a sectional view taken along a line d—d of the turn module shown in FIG. 31.

The above-mentioned pivot support shaft 110 vertically extends through the through hole 120, and is supported through a pair of bearings 122a and 122b to be pivotal about the central axis of the turn module M3. An outward flange portion 110a is integrally formed on the upper end of the pivot support shaft 110 so as to prevent the shaft 110 from being disengaged downward from the through hole 120. The lower end of the pivot support shaft 110 is fixed to the upper surface of the lower attaching plate 114 to be rotated together. More specifically, as shown in FIG. 34, a fitting portion 110b having a substantially rectangular section is integrally formed on the lower end of the pivot support shaft 110, and a rectangular fitting hole 114a for complementarily receiving the fitting portion 110b at the lower end of the pivot support shaft 110 is formed at the central portion of the lower attaching plate 114. When the lower end of the pivot support shaft 110 is fitted in the lower attaching plate 114, the lower attaching plate 114 is integrally rotated upon rotation of the pivot support shaft 110.

A pinion gear 124 is coaxially attached to the outer circumferential surface at the central portion of the pivot support shaft 110 so as to be rotated together through a key. The above-mentioned rotation driving mechanism 116 comprises a pneumatic cylinder mechanism. More specifically, the main body block 118 of the rotation driving mechanism 116 integrally comprises, as a driving cylinder body and a driven cylinder body, first and second parallel cylinder bodies 126 and 128, which extend along a direction perpendicular to the pivot support shaft 110 to sandwich the pivot support shaft 110 therebetween. In the cylinder bodies 126 and 128, first and second cylinder chambers 130 and 132 extending in the direction perpendicular to the pivot support shaft 110 are respectively formed as a driving cylinder chamber and a driven cylinder chamber.

Figure 32:
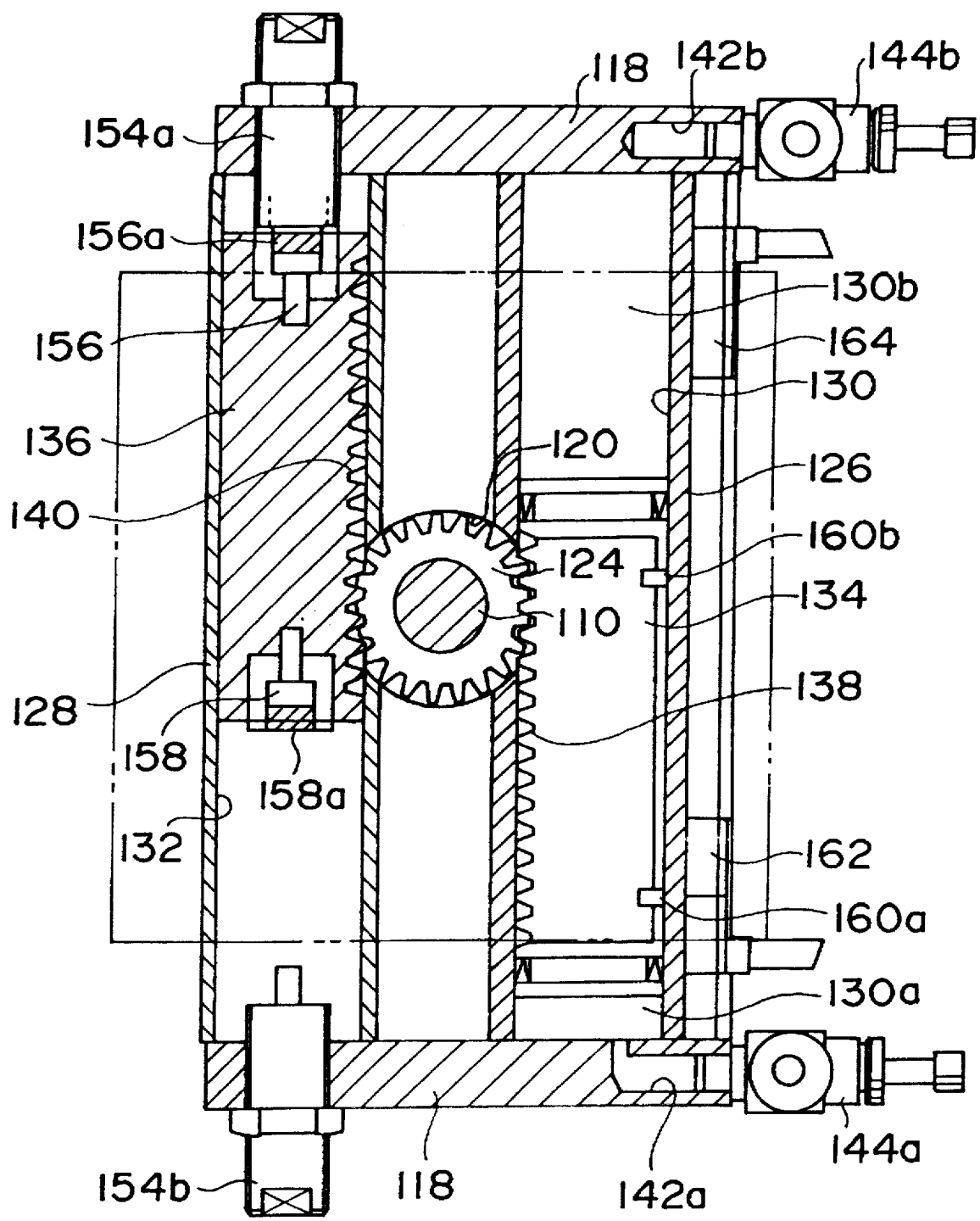
FIG. 32 is a sectional view taken along a line a—a of the turn module shown in FIG. 28.
Figure 33:
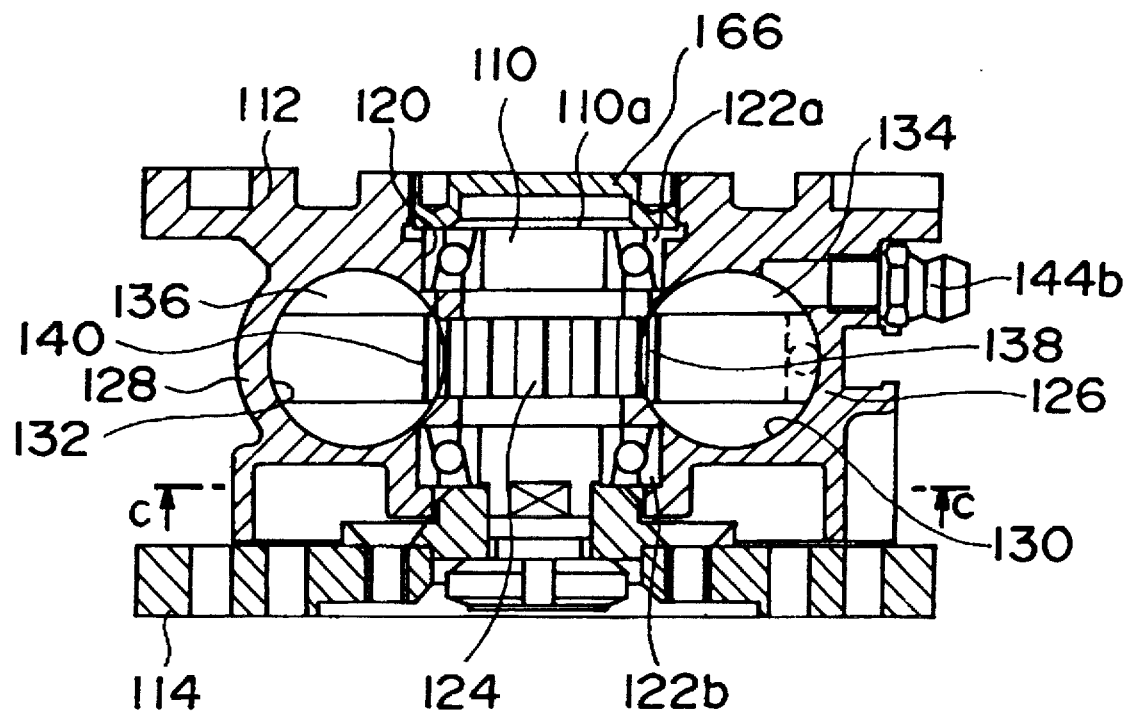
FIG. 33 is a sectional view taken along a line b—b of the turn module shown in FIG. 31.

In the first cylinder chamber 130 arranged at the right side in FIGS. 32 and 33, a first piston 134 is slidably stored as a driving piston while maintaining an air-tight state. In the second cylinder chamber 132 arranged at the left side in FIGS. 32 and 33, a second piston 136 is freely slidably fitted in a non-air-tight state. The cylinder chambers 130 and 132 have openings communicating with the through hole 120 at their central portions. Racks 138 and 140 meshing with the above-mentioned pinion gear 124 from both sides are respectively formed on the pistons 134 and 136 as a driving rack and a driven rack. One sub cylinder chamber 130a is defined by a portion of the cylinder chamber 130, which portion is located below (FIG. 32) the first piston 134, and the other sub cylinder chamber 130b is defined by a portion of the cylinder chamber 130, which portion is located above (FIG. 32) the first piston 134.

In the first cylinder body 126, compressed air supply paths 142a and 142b for supplying working compressed air are respectively formed and connected at the outward end sides of the sub cylinder chambers 130a and 130b. These compressed air supply paths 142a and 142b are respectively coupled to first and second air ports 144a and 144b attached to the outer surface of the first cylinder body 126.

The above-mentioned first and second air ports 144a and 144b are connected to the above-mentioned pneumatic source 82 through a second selector valve 146 comprising an electromagnetic solenoid valve (to be described later). In a first switching mode, the second selector valve 146 is switched to supply compressed air into one sub cylinder chamber 130a through the first air port 144a, and to exhaust air from the other sub cylinder chamber 130b through the second air port 144b. In a second switching mode, the second selector valve 146 is switched to exhaust compressed air from one sub cylinder chamber 130a through the first air port 144a, and to supply air into the other sub cylinder chamber 130b through the second air port 144b. In this manner, when the second switching valve 146 is set in the first switching mode, the pivot support shaft 110 is pivoted counterclockwise in FIG. 27; when it is set in the second switching mode, the shaft 110 is pivoted clockwise.

Figure 30:
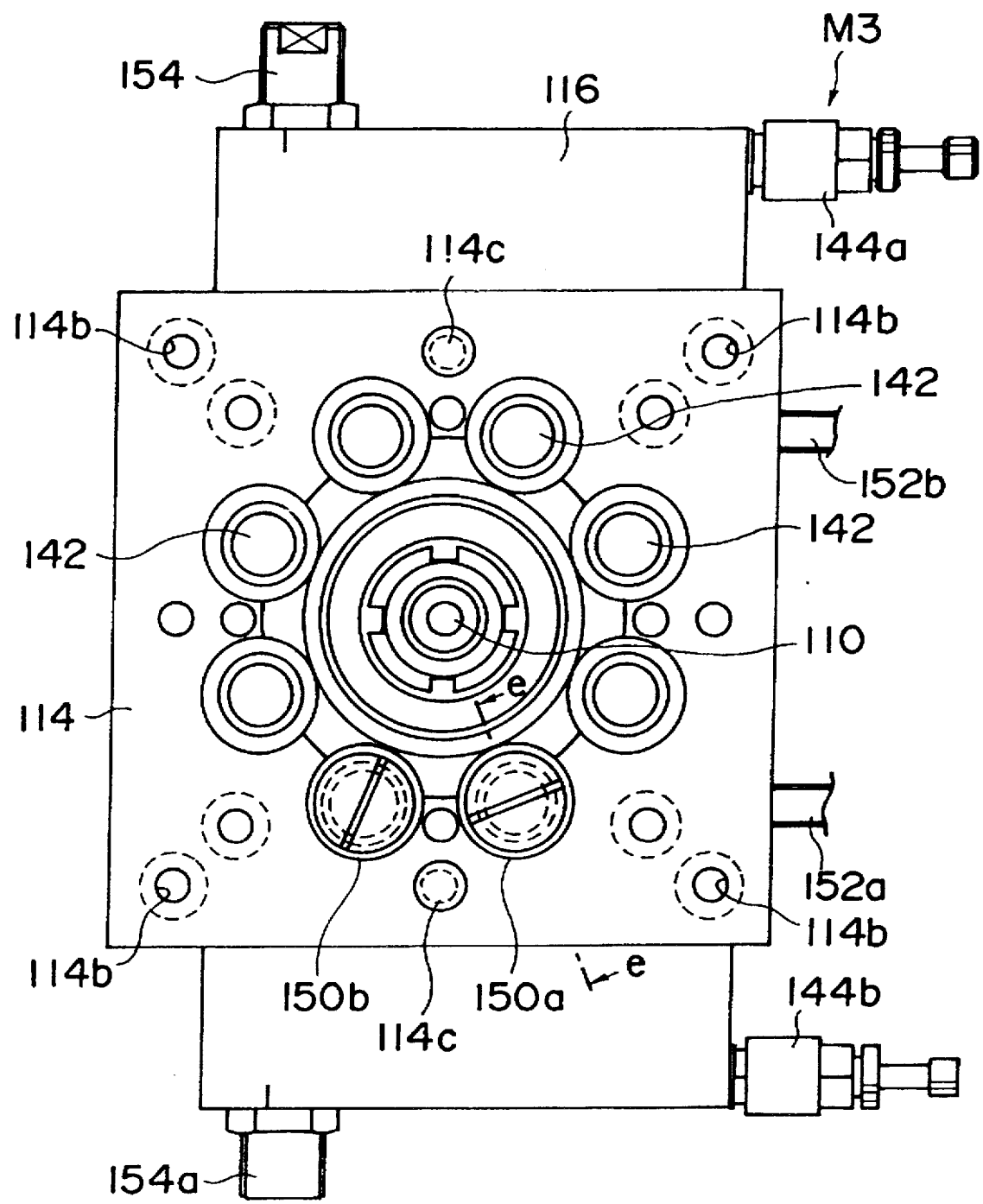
FIG. 30 is a lower view showing the lower shape of the turn module shown in FIG. 26.
Figure 31:
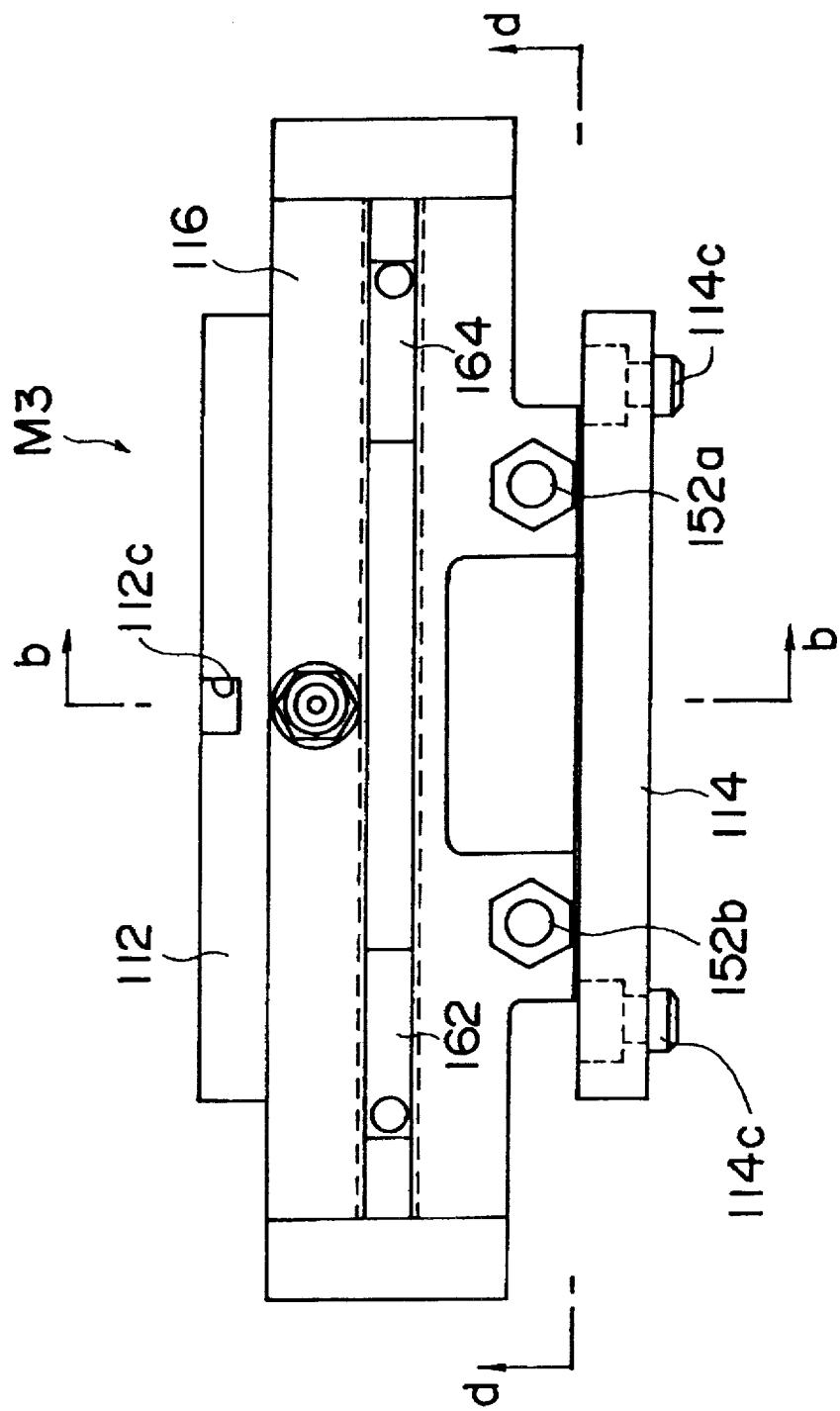
FIG. 31 is a left side view showing the left side shape of the turn module shown in FIG. 26.

As can be seen from FIG. 30, a plurality of turn amount regulation holes 142 are formed in the lower attaching plate 114 at 45° angular intervals in a concentric circular pattern having the pivot support shaft 110 as the center. Two stopper pins 150a and 150b as turn amount regulation members are inserted in two of these turn amount regulation holes 142 through lock screws 151, as shown in FIG. 36, so that their attaching positions are exchangeable. A pair of stopper bolts 152a and 152b are threadably engaged with the main body block 118 of the upper attaching plate 112 so as to be able to be moved forward/backward to adjust their positions. The first and second stopper bolts 152a and 152b are set, so that their centers are separated by a distance corresponding to the diameter of a circumference on which these stopper pins 150a and 150b are set. The first and second stopper bolts 152a and 152b are attached to be able to receive the corresponding stopper pins 150a and 150b at their distal ends in a constant state. The turn stop positions of the stopper bolts 152a and 152b are regulated at contact positions of the corresponding stopper pins 150a and 150b.

As shown in FIG. 32, shock absorbers 154a and 154b are respectively attached to the two ends of the second cylinder chamber 132 located at the left side in FIG. 32. More specifically, as described above, when the second selector valve 146 is set in the second switching mode to turn the lower attaching plate 114 clockwise (FIG. 27; i.e., counterclockwise in FIGS. 30 and 35) with respect to the upper attaching plate 112, the second piston 136 having the second rack 140 meshing with the pinion gear 124 of the pivot support shaft 110 is moved in a direction opposite to the first piston 134 in synchronism with the first piston 134. Immediately before the first stopper pin 150a contacts the distal end of the corresponding first stopper bolt 152a, as shown in FIG. 32, the upper end (FIG. 32) of the second piston 136 located at the left side in FIG. 32 contacts the corresponding first shock absorber 154a, thus shock-absorbing the contact state. Thereafter, the first stopper pin 150a contacts the distal end of the corresponding first stopper bolt 152a, and its turn stop position is accurately regulated. On the other hand, when the second selector valve 146 is set in the first switching mode to turn the lower attaching plate 114 counterclockwise (FIG. 27; i.e., clockwise in FIGS. 30 and 35) with respect to the upper attaching plate 112, immediately before the second stopper pin 150b contacts the distal end of the second stopper bolt 152b, the lower end (FIG. 32) of the second piston 136 contacts the corresponding second shock absorber 154b, thus shock-absorbing the contact state. Thereafter, the second stopper pin 150b contacts the distal end of the second stopper bolt 152b, and its turn stop position is accurately regulated.

As shown in FIG. 32, a contact pin 156 having a rubber contact piece 156a at its head portion is attached to the end portion, contacting the first shock absorber 154a, of the second piston 136 so as to weaken a shock and contact noise in the contact state. On the other hand, a contact pin 158 having a rubber contact piece 158a at its head portion is attached to the end portion, contacting the second shock absorber 154b, of the second piston 136 so as to weaken a shock and contact noise in the contact state.

As shown in FIG. 32, first and second magnets 160a and 160b as turn state confirmation dogs are attached to the outward side surface of the first piston 134 located at the right side in FIG. 32 so as to be located at the two ends along the axial direction. On the other hand, fourth and fifth sensors 162 and 164 for detecting a turn state are attached to the right side surface (FIG. 32) of the main body block 118. The position of the fourth sensor 162 is defined, so that the sensor 162 is turned on by the first magnet 160a in a state wherein the lower attaching plate 114 is turned clockwise in FIG. 27, the first stopper pin 150a contacts the corresponding first stopper bolt 152a, and its turn stop position is accurately regulated. The fourth sensor 162 comprises a non-contact type magnetic sensor. More specifically, the fourth sensor 162 detects a standby state wherein the lower attaching plate 114 vertically coincides with the upper attaching plate 112. On the other hand, the position of the fifth sensor 164 is defined, so that the sensor 164 is turned on by the second magnet 160b in a state wherein the lower attaching plate 114 is turned counterclockwise in FIG. 27, the second stopper pin 150a contacts the second stopper bolt 152b, and its turn stop position is accurately regulated. The fifth sensor 164 comprises a non-contact type magnetic sensor. More specifically, the fifth sensor 164 detects a turn position at which the lower attaching plate 114 is turned about the central axis CL by a predetermined angle with respect to the upper attaching plate 112.

The fourth and fifth sensors 162 and 164 are connected to the above-mentioned controller, and output their detection results thereto. More specifically, assume that the controller sets the above-mentioned second selector valve 146 in the second switching mode to turn the pivot support shaft 110 counterclockwise (FIG. 32) from the first turn stop position shown in FIG. 32, so that the second stopper pin 150b contacts the corresponding second stopper bolt 152b. In this state, when the fifth sensor 164 does not output an ON signal after an elapse of a predetermined period of time, the controller determines an abnormal state wherein the lower attaching plate 114 is not pivoted by the desired turn angle from the first turn stop position, and is stopped halfway, and executes an alarm operation. When the fifth sensor 164 outputs an ON signal within a predetermined period of time, the controller executes the subsequent control sequence. On the other hand, assume that the controller sets the above-mentioned second selector valve 146 in the first switching mode to turn the pivot support shaft 110 clockwise (FIG. 32) from the second turn stop position, so that the first stopper pin 150a contacts the corresponding first stopper bolt 152a. In this state, when the fourth sensor 162 does not output an ON signal after an elapse of a predetermined period of time, the controller determines an abnormal state wherein the lower attaching plate 114 is not returned by the desired turn angle from the second turn stop position, and is stopped halfway, and executes an alarm operation. When the fourth sensor 162 outputs an ON signal within a predetermined period of time, the controller executes the subsequent control sequence.

Figure 26:
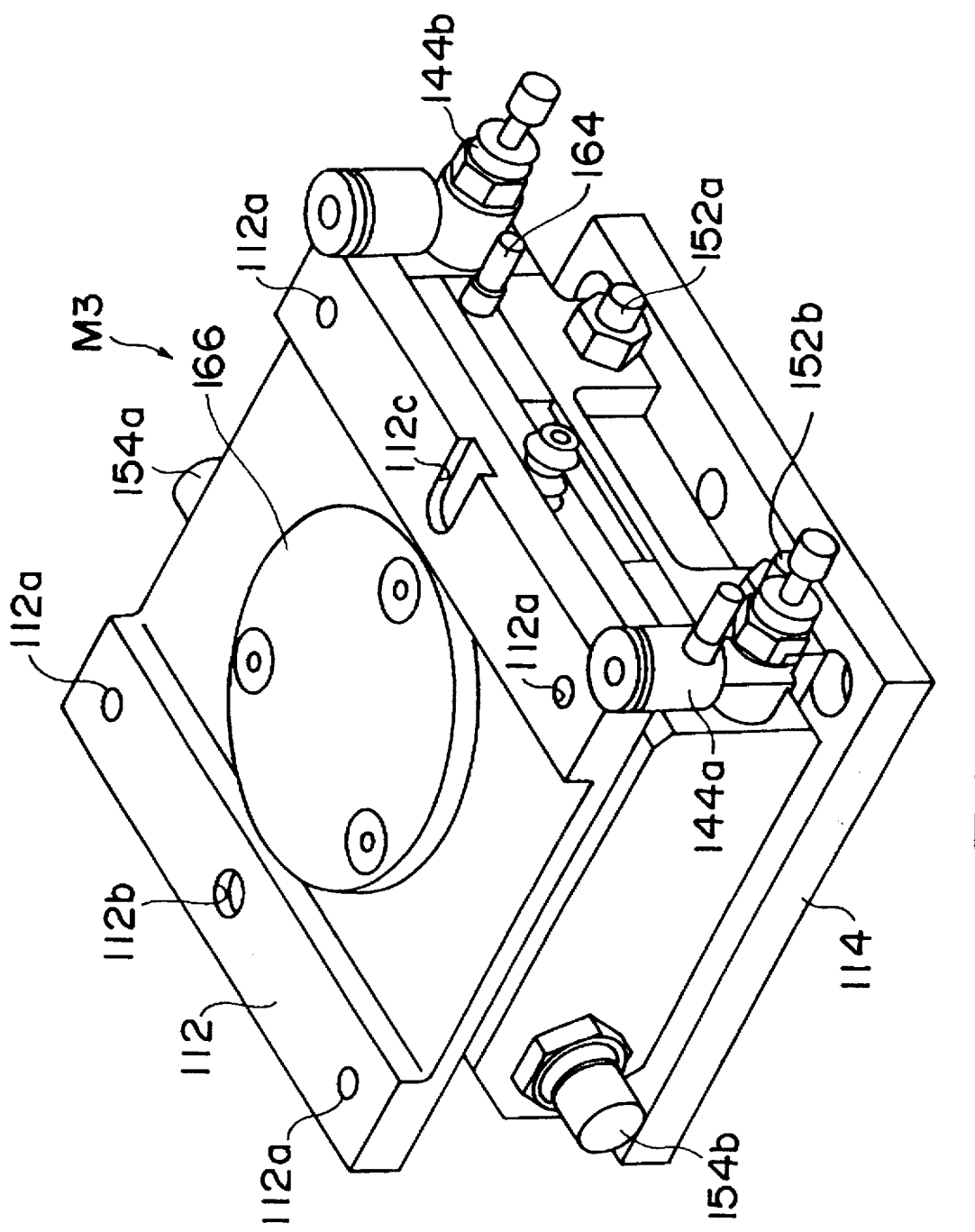
FIG. 26 is a perspective view showing the details of the arrangement of a turn module equipped on the hand mechanism shown in FIG. 1.
Figure 27:
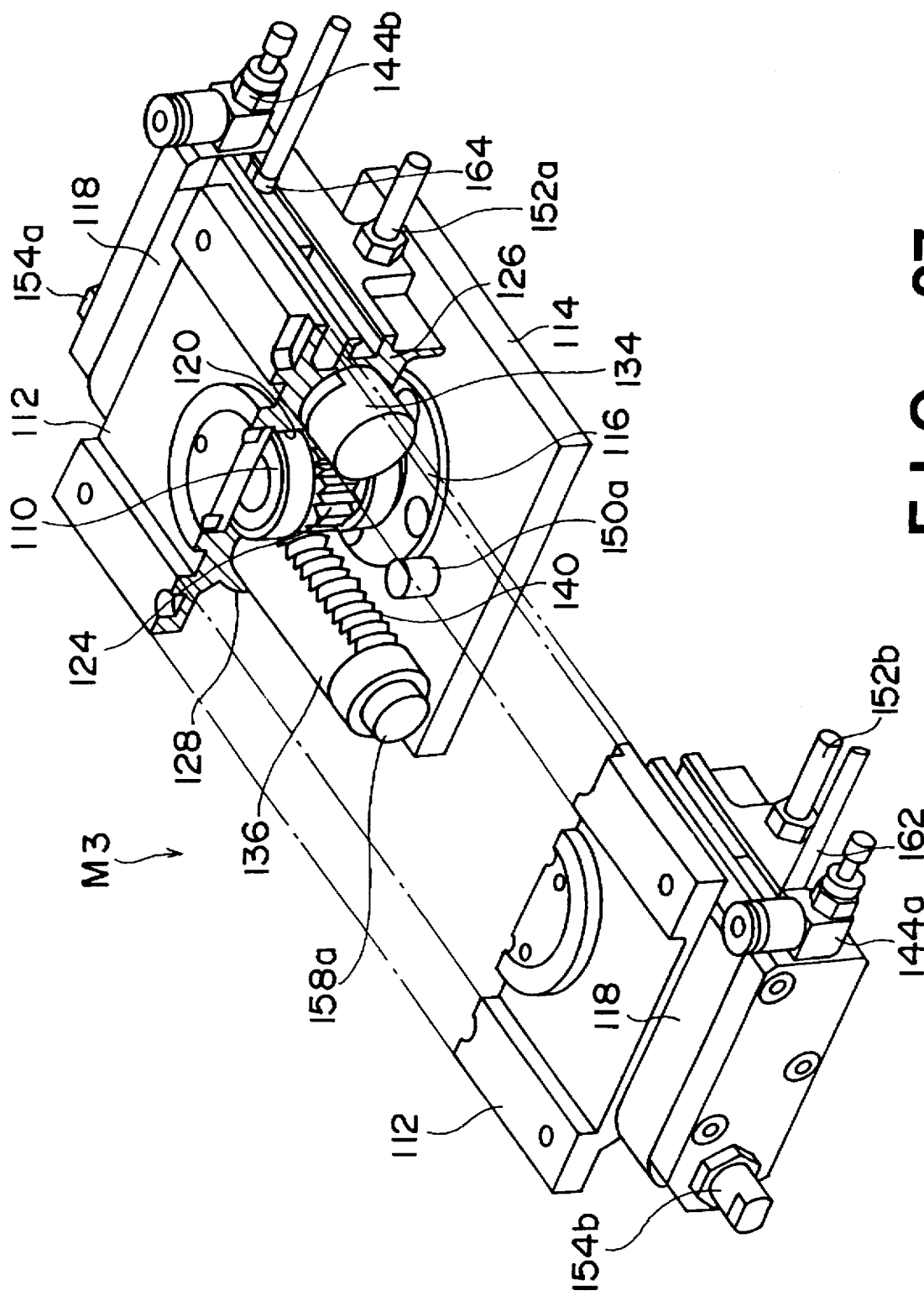
FIG. 27 is an exploded perspective view showing the internal arrangement of the turn module shown in FIG. 26.
Figure 28:
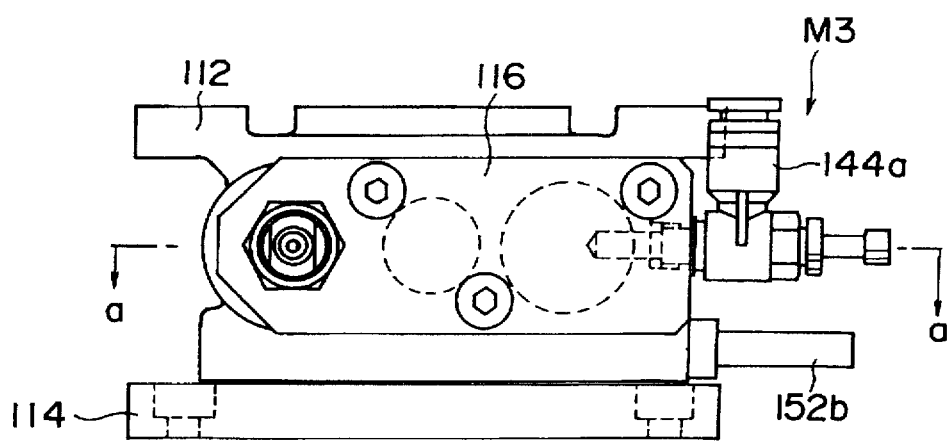
FIG. 28 is a front view showing the front shape of the turn module shown in FIG. 26.
Figure 29:
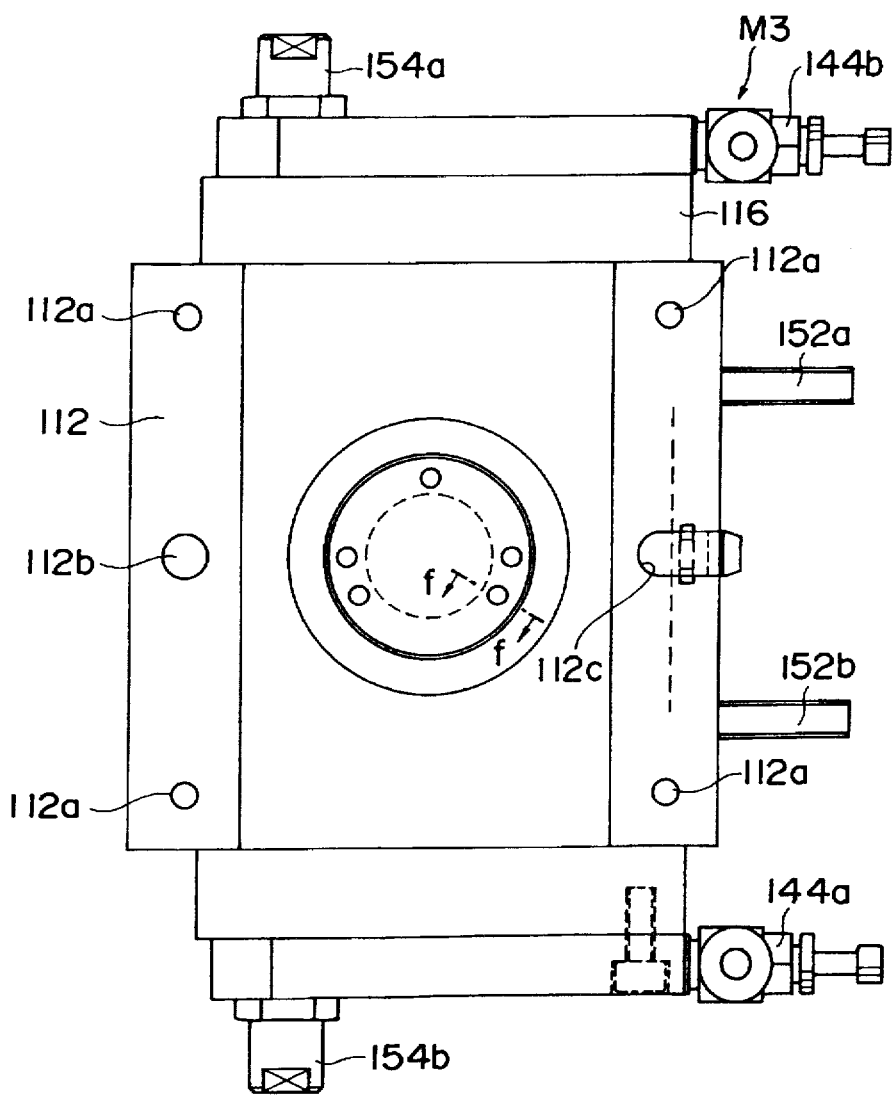
FIG. 29 is a plan view showing the upper shape of the turn module shown in FIG. 26.

As shown in FIGS. 26 and 33, the through hole 120 open to the upper attaching plate 112 is covered with a lid member 166. A screw 168 for applying a pressure to the bearing 122a is attached to the lid member 166, as shown in FIG. 37, thereby pressing the outer lace of the bearing 122a. In this manner, the spacer adjustment step is omitted, and the low-profile and low-cost structure of the turn module M3 can be attained.

Since the turn module M3 is arranged, as described above, as shown in FIG. 32, when compressed air is supplied into the upper sub cylinder chamber 130b (FIG. 32), and the first piston 134 is deviated downward (FIG. 32), the second piston 136 coupled through the pinion gear 124 is deviated upward (FIG. 32). As shown in FIG. 32, in a state wherein the first contact pin 156 is received by the corresponding first shock absorber 154a in a shock-absorbed state, the first stopper pin 150a contacts the corresponding first stopper bolt 152a, thereby regulating the pivot amount of the lower attaching plate, i.e., stopping the lower attaching plate at the first turn stop position.

On the other hand, in this turn module M3, when the second selector valve 146 is switched from the state shown in FIG. 32 to the first switching mode, compressed air is supplied into the lower sub cylinder chamber 130a in FIG. 32, and the first piston 134 is pushed upward in FIG. 32. For this reason, the pinion gear 124 meshing with the piston 134 is pivoted counterclockwise, and hence, the lower attaching plate 114 rotated together with the pinion gear 124 is pivoted counterclockwise. In a state wherein the second contact pin 158 is received by the corresponding second shock absorber 154b in a shock-absorbed state, the second stopper pin 150b contacts the corresponding second stopper bolt 152b, thus regulating the pivot amount of the lower attaching plate, i.e., stopping the lower attaching plate at the second turn stop position.

Attaching screw holes 112a having the diameter $d_1$ are formed at the four corners of the upper attaching plate 112 to be separated at the above-mentioned predetermined arrangement pitch $D_1$, and attaching through holes 114b are formed at the four corners of the lower attaching plate 114 in the same state as the holes 112a. A positioning hole 112b and a positioning groove 112c for receiving a pair of positioning pins commonly formed on the bottom surface of each of the modules M1, M2, and M4 to M6 are formed at the central portions of the opposing two sides of the upper surface of the upper attaching plate 112.

A pair of positioning pins 114c, which are respectively inserted in the positioning hole and the positioning groove formed in each of other modules M2, and M4 to M7, have the diameter $d_2$, and are separated by the predetermined distance $D_2$, integrally project downward from the central portions of the opposing two sides of the lower portion of the lower attaching plate 114.

In this manner, one of other modules M2, and M4 to M7 is selectively attached to the lower portion of the turn module M3, and one of other modules M1, M2, and M4 to M6 is selectively attached to the upper portion thereof.

Note that the turn module M3 is not limited to the arrangement of the above-mentioned embodiment, and various modifications may be made within the scope of the invention.

Figure 39:
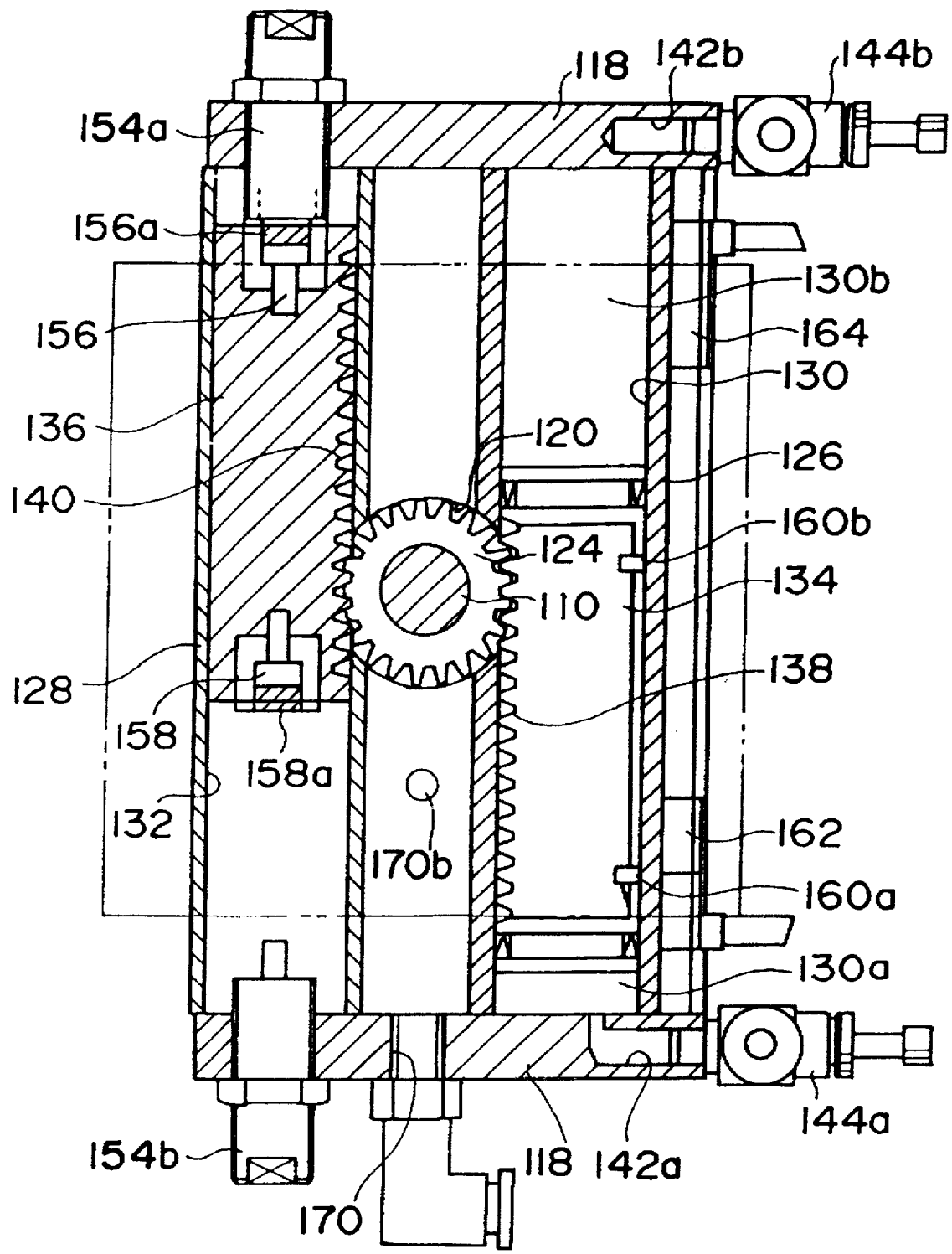
FIG. 39 is a plan view showing the upper shape of the turn module of the embodiment shown in FIG. 38.
Figure 40:
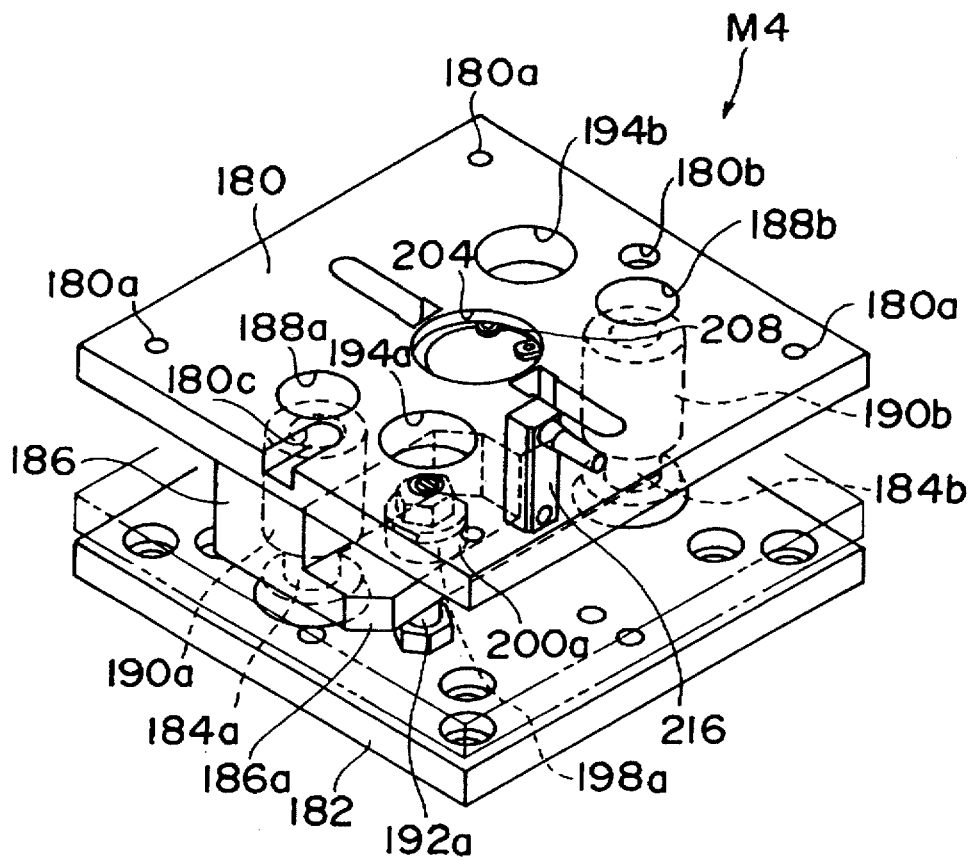
FIG. 40 is a perspective view showing the details of the arrangement of an embodiment of a cushion module equipped on the hand mechanism shown in FIG. 1.

For example, the turn module may be arranged as a turn module M3b according to another embodiment shown in FIGS. 38 and 39. The turn module M3b of the embodiment shown in FIGS. 38 and 39 has an arrangement especially suitable for use in a clean room.

The arrangement of the turn module M3b of this embodiment will be described below. The same reference numerals denote the same parts as in the turn module M3 of the above embodiment, and a detailed description thereof will be omitted. Thus, only a difference from the reverse module of the above-mentioned embodiment will be explained below.

More specifically, in this embodiment, as shown in FIGS. 38 and 39, a vacuum port 170 is attached to one side surface of a main body block 118 at a position where a pair of bearings 122a and 122b arranged in the main body block 118 reach a through hole 120.

The through hole 120 is closed by the above-mentioned lid member 166 to form a substantially closed space. As a result, when the interior of the through hole 120 is evacuated through the vacuum port 170, dust generated by axial support operations of the pair of bearings 122a and 122b is collected in a cleaner (not shown) without being exhausted outside the turn module M3b, thus maintaining a clean environment. In this manner, even when the turn module M3b of this embodiment is used in a clean room, predetermined cleanness is maintained, and the turn module M3b is suitably used in the clean room.

Description of Cushion Module M4

As shown in FIGS. 40 to 46 as an embodiment, the cushion module M4 for executing the above-mentioned cushion operation comprises a pair of parallel upper and lower attaching plates 180 and 182, which are attached to be relatively movable along a central axis C0 of the cushion module M4. A pair of guide pins 184a and 184b for moving the lower attaching plate 182 along the central axis C0, i.e., guiding the lower attaching plate 182 toward or away from the upper attaching plate 180 are fixed in an upright state on the lower attaching plate 182 at point symmetrical positions about the central axis.

Figure 41:
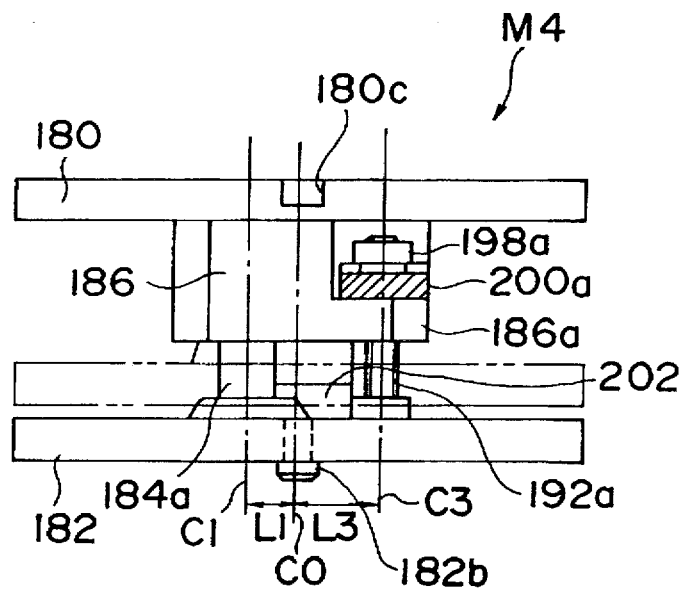
FIG. 41 is a front view showing the front shape of the cushion module shown in FIG. 40.
Figure 44:
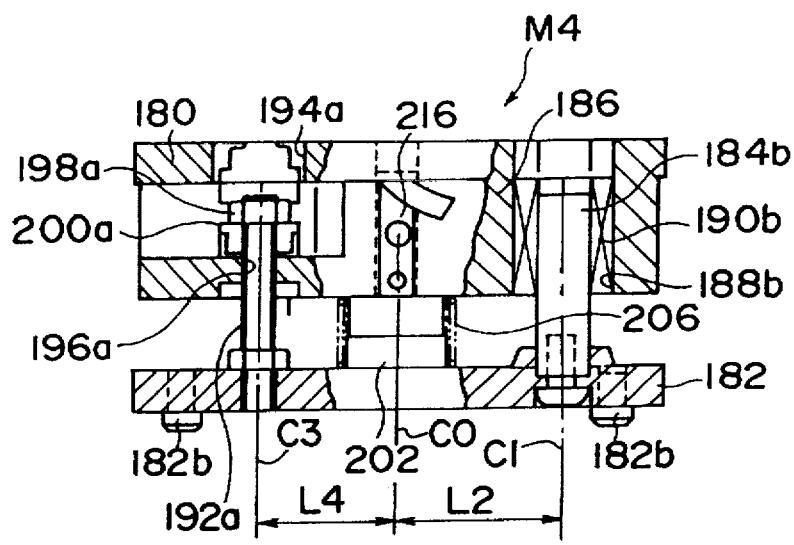
FIG. 44 is a partially cutaway right side view showing the right side shape of the cushion module shown in FIG. 40.
Figure 45:
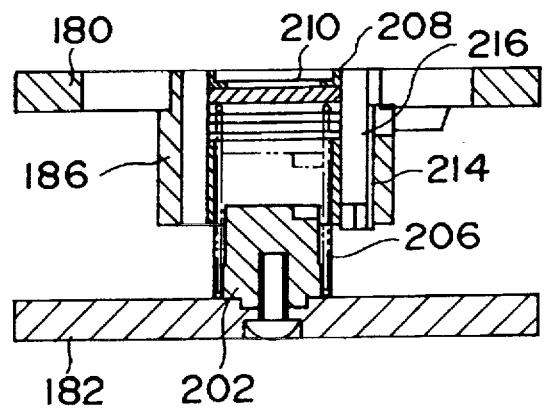
FIG. 45 is a sectional view taken along a line a—a of the cushion module shown in FIG. 42.

A central axis C1 of the first guide pin 184a is set at a position deviated from the central axis C0 of the cushion module M4 to the left in FIG. 41 by a distance L1 when the cushion mode M4 is viewed from the front surface side, as shown in FIG. 41, and is set at a position deviated from the central axis C0 to the left in FIG. 42 by a distance L2 when the cushion module M4 is viewed from the right side surface side, as shown in FIG. 42. As described above, since the two guide pins 184a and 184b have the point symmetrical relationship therebetween, although not shown, a central axis C2 of the second guide pin 184b is set at a position deviated from the central axis C0 of the cushion module to the left by the distance L1 when the cushion module M4 is viewed from the rear surface side, and is set at a position deviated from the central axis of the cushion module to the left by the distance L2 when the cushion module M4 is viewed from the left side surface side.

An attaching block 186 is integrally formed on the lower surface of the central portion of the upper attaching plate 180. First and second through holes 188a and 188b are formed at positions opposing the guide pins 184a and 184b to extend through the upper attaching plate 180 and the attaching block 186 in the direction of thickness. The upper portions of the guide pins 184a and 184b are slidably inserted in the corresponding through holes 188a and 188b through slide bearings 190a and 190b attached to the holes 188a and 188b. In a state wherein the lower attaching plate 182 is moved to approach the upper attaching plate 180 upon the cushion operation, the lengths of the guide pins 184a and 184b are set so that their upper ends stay inside the through holes 188a and 188b without projecting outwardly from the upper openings of the corresponding through holes 188a and 188b.

A pair of stopper pins 192a and 192b for preventing the lower attaching plate 182 from being disengaged from the upper attaching plate 180 are fixed in an upright state on the lower attaching plate 182 at point symmetrical positions about the central axis. A central axis C3 of the first stopper pin 192a is set at a position deviated from the central axis C0 of the cushion module M4 to the right (FIG. 41) by the distance L1 when the cushion module M4 is viewed from the front surface side, as shown in FIG. 41, and is set at a position deviated from the central axis C0 to the right (FIG. 42) by the distance L2 when the cushion module M4 is viewed from the right side surface side, as shown in FIG. 42. As described above, since the two stopper pins 192a and 192b have a point symmetrical relationship therebetween, although not shown, a central axis C4 of the second stopper pin 192b is set at a position deviated from the central axis C0 of the cushion module M4 to the right by the distance L1 when the cushion module M4 is viewed from the rear surface side, and is set at a position deviated from the central axis C0 of the cushion module M4 to the right by the distance L2 when the cushion module M4 is viewed from the left side surface side.

Third and fourth through holes 194a and 194b are formed in the upper attaching plate 180 at positions opposing the stopper pins 192a and 192b to extend therethrough in the direction of thickness. The thickness of a portion of the attaching block 186, through which the stopper pins 192a and 192b extend, is set to be small, and thin portions 186a and 186b are formed to define predetermined spaces between the attaching block 186 and the lower surface of the upper attaching plate 180. Fourth and fifth through holes 196a and 196b are also formed in these thin portions 186a and 186b at positions opposing the corresponding stopper pins 192a and 192b to extend therethrough in the direction of thickness. The upper ends of the stopper pins 192a and 192b project upward through the corresponding fourth and fifth through holes 196a and 196b, and head portions 198a and 198b having a diameter larger than the diameter of the fourth and fifth through holes 196a and 196b are integrally attached to the projecting upper ends, respectively.

In this manner, in the cushion module M4, the bottom surfaces of the head portions 198a and 198b contact the upper surfaces of the thin portions 186a and 186b through shock absorbers 200a and 200b, and the lower attaching plate 182 is suspended from the upper attaching plate 180.

A substantially columnar locking member 202 is fixed on the central portion of the lower attaching plate 182. A central through hole 204 is formed in the central portion of the upper attaching plate 180 to extend therethrough in the direction of thickness. A coil spring 206 is interposed between the two attaching plates 180 and 182 to extend along the central axis. The coil spring 206 has a biasing force for biasing the two attaching plates 180 and 182 in a direction to separate them from each other. More specifically, the lower end of the coil spring 206 is locked around the outer circumference of the above-mentioned locking member 202, and the upper end thereof is locked on the lower surface of a lid member 210 attached to close the central through hole 204 through a C ring 208.

Figure 46:
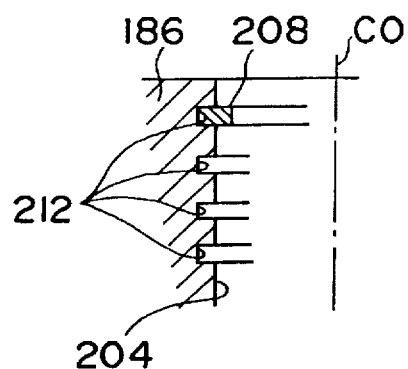
FIG. 46 is a sectional view showing the formation state of a circumferential groove formed in the inner circumferential surface of a central through hole shown in FIG. 45.
Figure 47:
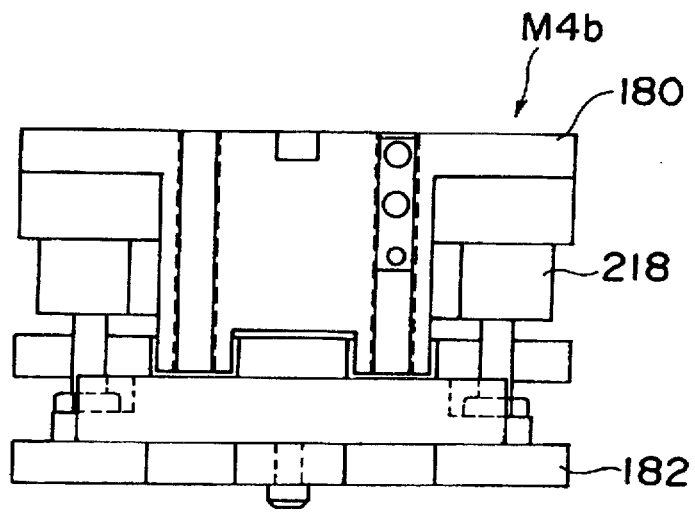
FIG. 47 is a front view showing the arrangement of another embodiment of a cushion module equipped on the hand mechanism shown in FIG. 1.

As shown in detail in FIG. 46, the C ring 208 is fitted in one of a plurality of circumferential grooves 212 formed in the inner circumferential surface of the central through hole 204 along the axial direction, thereby attaching the lid member 210 at an arbitrary level position with respect to the lower attaching plate 182. In this manner, the set length of the coil spring 206 is adjusted by arbitrarily setting the level position of the lid member 210 with respect to the lower attaching plate 182, thereby adjusting the elastic biasing force of the spring 206.

A magnet 214 as a portion to be detected is attached to the outer circumferential surface of the upper end of the above-mentioned locking member 202. A sixth sensor 216 is arranged on the outer peripheral portion of the central through hole 204 at the side where the magnet 214 is arranged. The sixth sensor 216 is turned on when the magnet 214 approaches it upon the approaching operation of the lower attaching plate 182 to the upper attaching plate 180. In this embodiment, the sixth sensor 216 comprises a non-contact type magnetic sensor. The sixth sensor 216 is attached at a position where the sensor 216 is turned on when the lower attaching plate 182 approaches the upper attaching plate 180 up to an allowable closest position. At the closest position, the lengths of the guide pins 184a and 184b; and the pair of stopper pins 192a and 192b are set, so that they stay in the corresponding through holes 188a and 188b; and 194a and 194b formed in the upper attaching plates 180 without projecting upward therefrom.

The sixth sensor 216 is connected to the above-mentioned controller. When the sensor 216 outputs an ON signal, the controller determines that the cushion function of the cushion module M4 exceeds an allowable amount upon operation of the shift module M6 (to be described later), and cannot be provided any more. In this case, the controller performs a predetermined alarm operation.

In the cushion module M4 with the above arrangement, in a non-cushion mode state, the lower attaching plate 182 is separated from the upper attaching plate 180 up to a state wherein the head portions 198a and 198b of the stopper pins 192a and 192b contact the upper surfaces of the thin portions 186a and 186b through the corresponding shock absorbers 200a and 200b.

On the other hand, when the gear member G grabbed by the clamp module M7 (to be described later) is inserted in the hole H2 shown in FIG. 6, and the lower surface of the second shaft portion G3 of the gear member G contacts the bottom surface of the hole H2, the cushion module M4 passively performs the cushion operation. More specifically, when the shift operation of the shift module M6, i.e., the insertion operation of the gear member G is continued in a state wherein the lower surface of the second shaft portion G3 of the gear member G contacts the bottom surface of the hole H2, the lower attaching plate 182 coupled to the clamp module M7 is moved along the central axis C0 through the pair of guide pins 184a and 184b to approach the upper attaching plate 180 against the biasing force of the coil spring 206.

In this manner, when this cushion module M4 is assembled in the hand mechanism 10, for example, in the insertion operation of the gear member G, a shock along the central axis C0 upon interference between the gear member G and the hole H2 is absorbed, and an excessive force can be effectively prevented from being applied to the attached modules, e.g., the clamp module M7, and the robot 12.

Attaching screw holes 180a having the diameter $d_1$ are formed at the four corners of the upper attaching plate 180 to be separated at the above-mentioned predetermined arrangement pitch $D_1$, and attaching through holes 182a are formed at the four corners of the lower attaching plate 182 in the same state as the holes 180a. A positioning hole 180b and a positioning groove 180c for receiving a pair of positioning pins commonly formed on the bottom surface of each of the modules M1 to M3, M5, and M6 are formed at the central portions of the opposing two sides of the upper surface of the upper attaching plate 180. A pair of positioning pins 182b, which are respectively inserted in the positioning hole and the positioning groove formed in each of other modules M2, M3, and M5 to M7, have the diameter $d_2$, and are separated by the predetermined distance $D_2$, integrally project downward from the central portions of the opposing two sides of the lower surface of the lower attaching plate 182.

In this manner, one of other modules M2, M3, and M5 to M7 is selectively attached to the lower portion of the cushion module M4, and one of other modules M1 to M3, M5, and M6 is selectively attached to the upper portion thereof.

Note that the cushion module M4 is not limited to the arrangement of the above-mentioned embodiment, and various modifications may be made within the scope of the invention.

For example, the cushion module may be arranged as a cushion module M4b as another embodiment shown in FIGS. 47 to 52. The cushion module M4b of this embodiment has an arrangement especially suitable for prolonging the cushion stroke.

The arrangement of the cushion module M4b of this embodiment will be described below. In the following description, the same reference numerals denote the same parts as in the cushion module M4 of the above-mentioned embodiment, and a detailed description thereof will be omitted. Thus, only a difference from the cushion module of the above embodiment will be described below.

Figure 50:
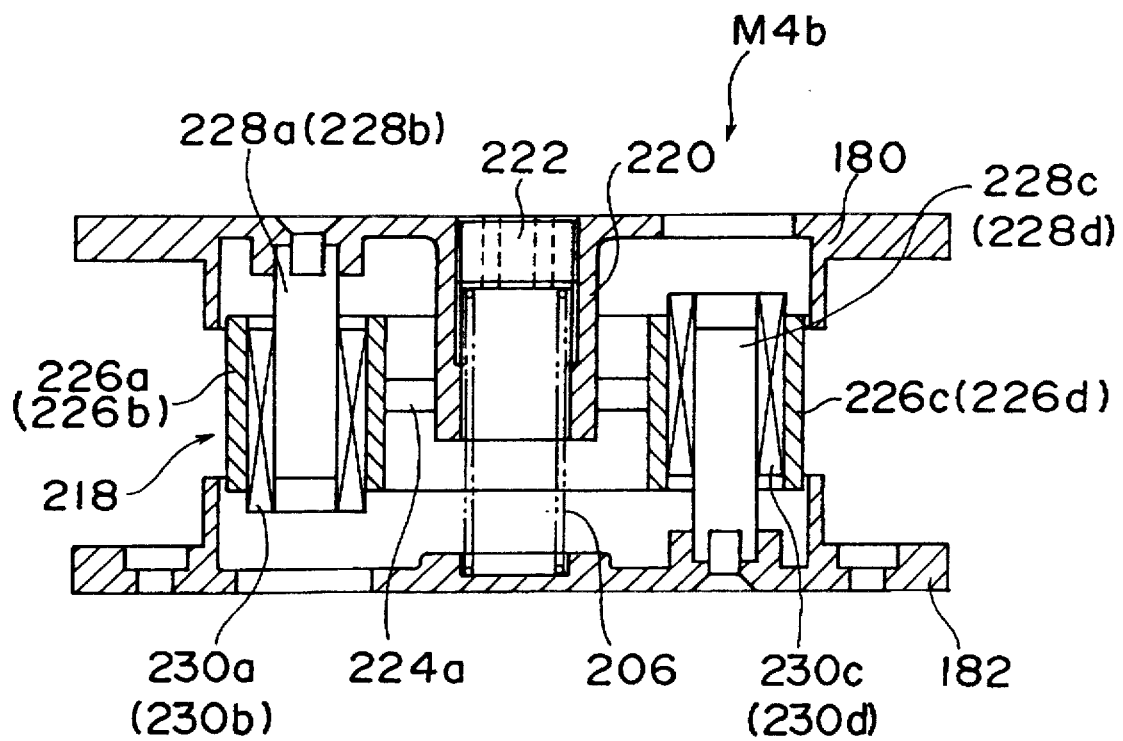
FIG. 50 is a sectional view taken along a line a—a of the cushion module of the embodiment shown in FIG. 48.
Figure 51:
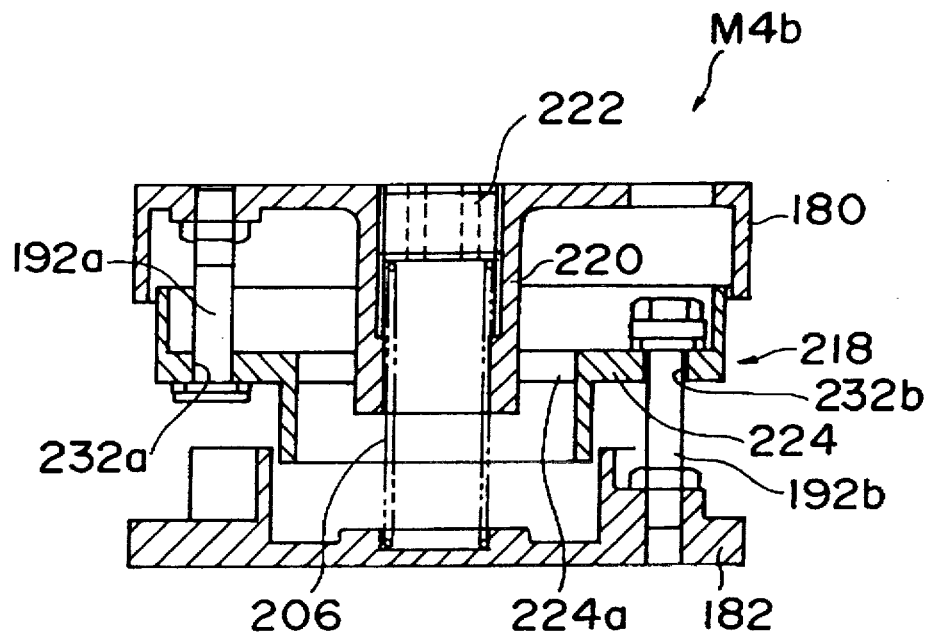
FIG. 51 is a sectional view taken along a line b—b of the cushion module of the embodiment shown in FIG. 48.
Figure 52:
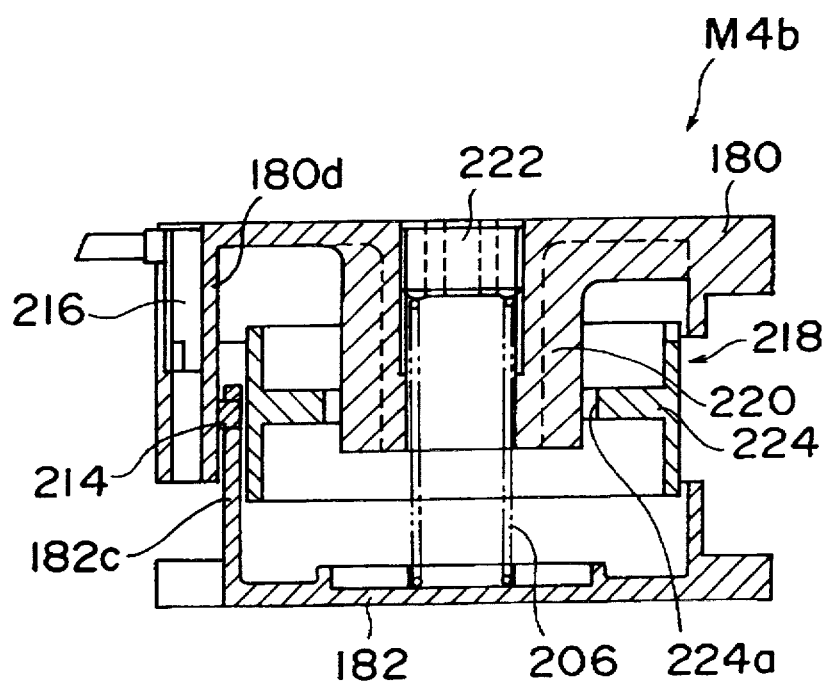
FIG. 52 is a sectional view taken along a line c—c of the cushion module of the embodiment shown in FIG. 48.
Figure 53:
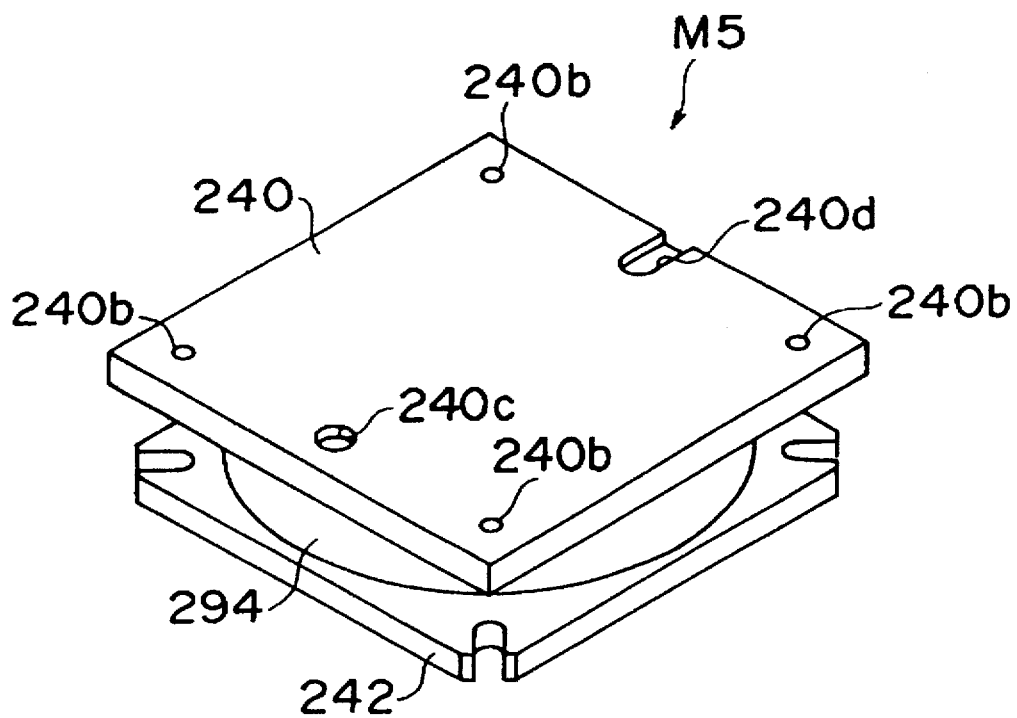
FIG. 53 is a perspective view showing the details of the arrangement of a cushion module equipped on the hand mechanism shown in FIG. 1.
Figure 54:
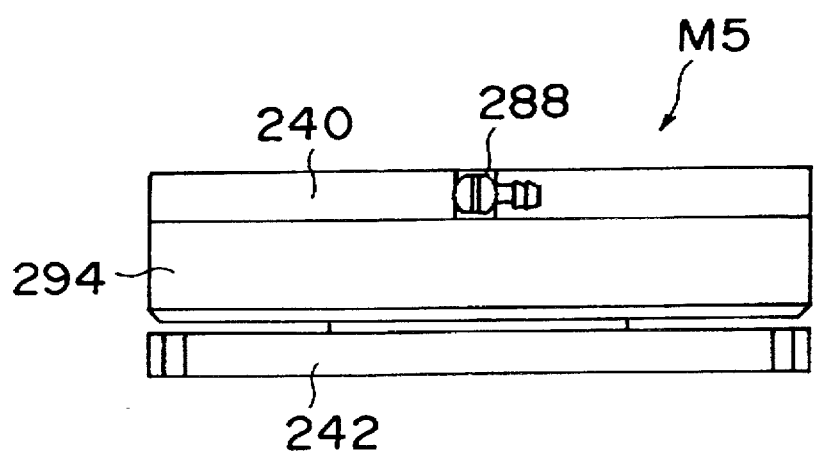
FIG. 54 is a front view showing the front shape of the cushion module shown in FIG. 53.

More specifically, in this embodiment, as mainly shown in FIGS. 50 to 52, the cushion module M4b comprises, as principal components, an intermediate member 218 arranged between upper and lower attaching plates 180 and 182 in addition to the upper and lower attaching plates 180 and 182.

The upper attaching plate 180 integrally comprises a sleeve 220 extending downward along the central axis C0 at the central portion of its lower surface. Threads are formed in the inner surface of the sleeve 220, and a screw member 222 is threadably engaged with the threads to be movable forward/backward along a central axis C0. Note that the upper end of a coil spring 206 for biasing the lower attaching plate 182 in a direction to separate from the upper attaching plate 180 is locked on the lower surface of the screw member 222. In this manner, when the screw member 222 is pivoted to be moved forward/backward along the central axis C0, the elastic biasing force of the coil spring 206 can be adjusted like in the cushion module M4 of the above embodiment.

The above-mentioned intermediate member 218 comprises a main body portion 224 as a flat plate in which a through hole 224a for freely receiving the sleeve 220 is formed at the central portion to extend therethrough in the direction of thickness, first and second sleeves 226a and 226b arranged at opposing positions on the same diameter to sandwich the central axis of the main body portion 224 therebetween, and respectively having central axes parallel to the central axis of the main body portion 224, and third and fourth sleeves 226c and 226d located on the circumference where the first and second sleeves 226a and 226b are arranged to sandwich the central axis of the main body portion 224 therebetween, and respectively having central axes parallel to the central axis of the main body portion 224. The first to fourth sleeves 226a to 226d are attached to vertically extend through the main body portion 224.

Figure 48:
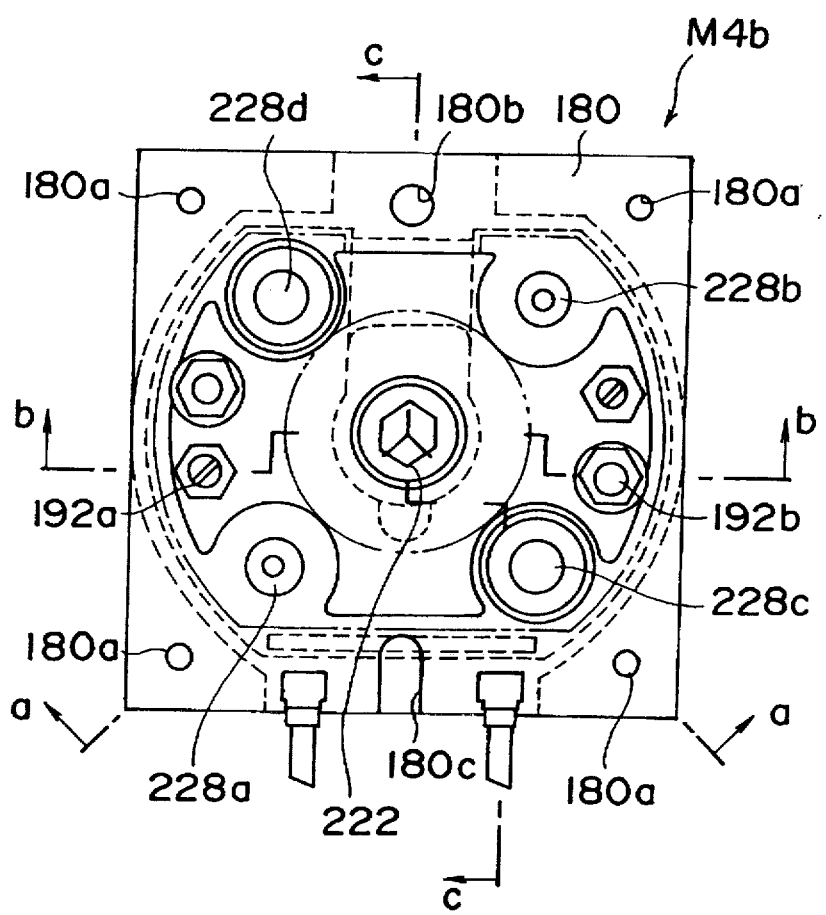
FIG. 48 is a plan view showing the upper shape of the cushion module of the embodiment shown in FIG. 47.
Figure 49:
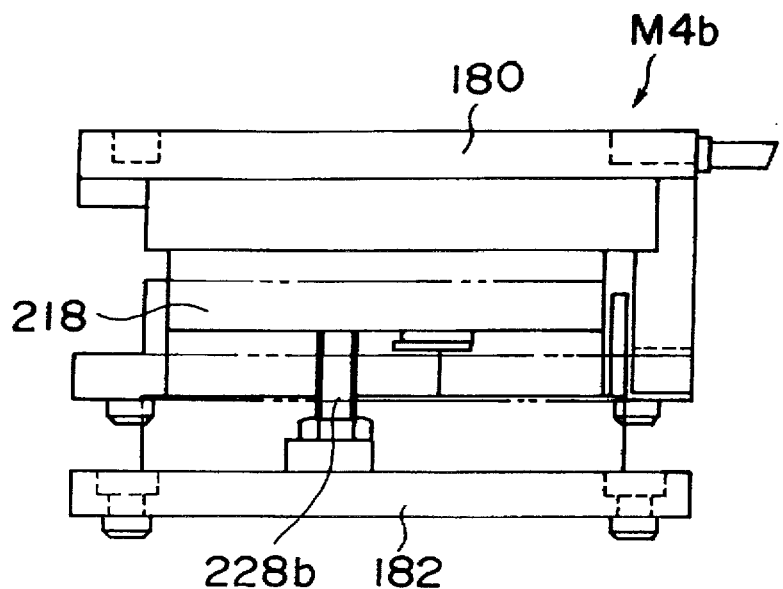
FIG. 49 is a left side view showing the left side shape of the cushion module of the embodiment shown in FIG. 47.

As can be seen from FIGS. 48 and 50, first and second guide pins 228a and 228b extending toward the first and second sleeves 226a and 226b, and having lower ends to be inserted in the corresponding sleeves 226a and 226b are fixed to depend from the lower surface of the upper attaching plate 180. The lower ends of these first and second guide pins 228a and 228b are supported by slide bearings 230a and 230b attached to the inner circumferential surfaces of the first and second sleeves 226a and 226b so as to be slidable along the axial direction. On the other hand, third and fourth guide pins 228c and 228d extending toward the third and fourth sleeves 226c and 226d, and having upper ends to be inserted in the corresponding sleeves 226c and 226d are fixed in an upright state on the upper surface of the lower attaching plate 182. The upper ends of these third and fourth guide pins 228a and 228b are supported by slide bearings 230c and 230d attached to the inner circumferential surfaces of the third and fourth sleeves 226c and 226d so as to be slidable in the axial direction. In this manner, in this embodiment, the lower attaching plate 182 is supported through the four guide pins 228a to 228d arranged at equal intervals to be able to approach or be separated from the upper attaching plate 180.

As shown in FIGS. 48 and 51, in this embodiment, the upper end of a first stopper pin 192a is fixed to the lower surface of the upper attaching plate 180, and the lower end thereof is attached to the upper attaching plate 180 to project downward from the main body portion 224 through a through hole 232a formed in the main body portion 224 of the intermediate member 218 to extend therethrough in the direction of thickness. On the other hand, the lower end of a second stopper pin 192b is fixed to the upper surface of the lower attaching plate 182, and the upper end thereof is attached to the upper attaching plate 180 to project upward from the main body portion 224 through a through hole 232b formed in the main body portion 224 of the intermediate portion 218 to extend therethrough in the direction of thickness.

A head portion 234a having a diameter larger than the diameter of the through hole 232a for receiving the first stopper pin 192a is integrally attached to the lower end of the first stopper pin 192a. When the upper surface of the head portion 234a contacts the lower surface of the main body portion 224 through a shock absorber 236a, the intermediate member 218 is suspended from the upper attaching plate 180. A head portion 234b having a diameter larger than the diameter of the through hole 232b for receiving the second stopper pin 192b is integrally attached to the upper end of the second stopper pin 192b. When the lower surface of this head portion 234b contacts the upper surface of the main body portion 224 through a shock absorber 236b, the lower attaching plate 182 is suspended from the intermediate member 218. In this manner, in this embodiment, the lower attaching plate 182 is suspended from the upper attaching plate 180 through the intermediate member 218.

In the cushion module M4b of this embodiment with the above-mentioned arrangement, a cushion stroke S is defined as a total of an axially movable distance S1 between the upper attaching plate 180 and the intermediate member 218, and an axially movable distance S2 between the lower attaching plate 182 and the intermediate member 218. In this manner, this embodiment can prolong the cushion stroke as compared to that of the above-mentioned embodiment.

As shown in FIG. 52, a magnet 214 is attached to an attaching piece 182c integrally projecting upward from the lower attaching plate 182. The attaching piece 182c is located immediately outside the intermediate member 218, as shown in FIG. 52. A sixth sensor 216, which is turned on by the magnet 214, is attached to an attaching piece 180d integrally projecting downward from the upper attaching plate 180. The attaching piece 180d is located immediately outside the above-mentioned attaching piece 182c. In this manner, since the magnet 214 and the sixth sensor 216 are respectively attached to the attaching pieces 182c and 180d integrally formed on the lower and upper attaching plates 182 and 180, the same detection result as in the above-mentioned embodiment can be obtained.

In the above-mentioned two embodiments, the C ring 208 and the screw member 222 as means for adjusting the elastic biasing force of the coil spring 206 are attached to the upper attaching plate 180. However, the present invention is not limited to this. For example, these members may be attached to the lower attaching plate 182. That is, the set length of the coil spring 206 need only be adjustable.

Description of Compliance Module M5

Finally, the compliance module M5 for executing the above-mentioned compliance operation is arranged, as shown in FIGS. 53 to 62 as an embodiment.

Figure 60:
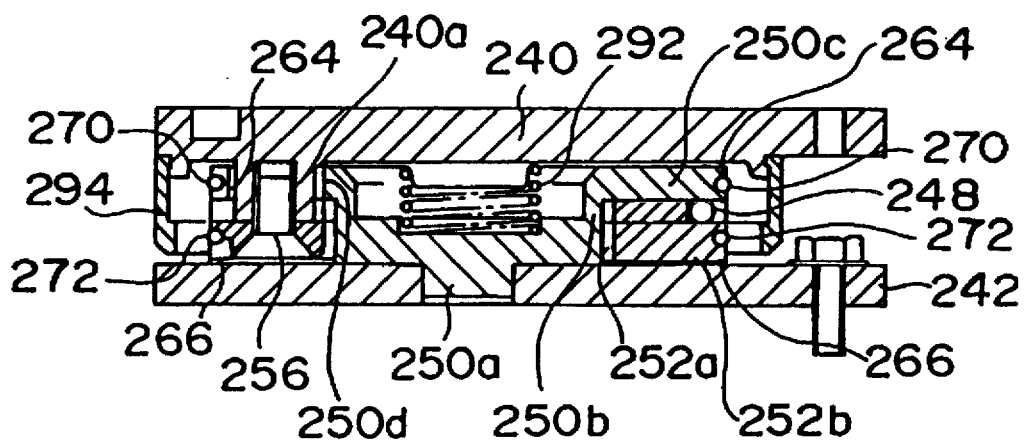
FIG. 60 is a sectional view taken along a line b—b of the cushion module shown in FIG. 55.

More specifically, the compliance module M5 comprises a pair of upper and lower parallel attaching plates 240 and 242, which are relatively movable along a direction perpendicular to the central axis of the module M5, and are separated at a predetermined interval. A compliance mechanism 244 is interposed between these attaching plates 240 and 242, as shown in FIGS. 57 and 60. The compliance mechanism 244 is provided with a lock mechanism 246 for locking the two, i.e., upper and lower attaching plates 240 and 242, upon movement of the hand mechanism 10 on the basis of the operation of the robot 12, and fixing the alignment state therebetween so as to shorten the operation standby time immediately after the movement of the hand mechanism 10 is stopped.

As mainly shown in FIGS. 57 to 60, the compliance mechanism 244 comprises first and second alignment members 250 and 252, which are formed in a substantially disk shape, and are coaxially arranged to overlap each other through a bearing 248. The first alignment member 250 is integrally formed by a central portion 250a fixed to the central portion of the upper surface of the lower attaching plate 242 through a bolt 254 (FIG. 57), a sleeve portion 250b standing upright from the outer peripheral portion of the central portion 250a, and an outward flange portion 250c extending outwardly from the upper edge of the sleeve portion 250b. The upper surface of the outward flange portion 250c is located immediately below the outer peripheral portion of the lower surface of the upper attaching plate 240, and faces it. As shown in FIG. 60, a through hole 250d for receiving an attaching boss portion 240a (to be described later) integrally projecting downward from the lower surface of the upper attaching plate 240 so as to fix the upper attaching plate 240 and the second alignment member 252 is formed in a portion of the outward flange portion 250c to extend therethrough in the direction of thickness.

As shown in FIG. 60, the second alignment member 252 is formed to have a central through hole 252a for receiving the central portion 250a of the first alignment member 250, which hole extends through the central portion in the direction of thickness, so that its outer peripheral portion 252b is located immediately below the outward flange portion 250c of the first alignment member 250. The outer peripheral portion 252b of the second alignment member 252 and the attaching boss portion 240a projecting downward from the outward flange portion 250c through the above-mentioned through hole 250d are integrally attached to each other through a bolt 256. In other words, the second alignment member 252 is fixed to the upper attaching plate 240 through the bolt 256.

The bearing 248 interposed between the first and second alignment members 250 and 252 is constituted by a bearing lace 248a formed of a substantially disk-like thin plate located therebetween, a plurality of through holes 248b formed on the same circumference on the outer peripheral portion of the bearing lace 248a, and bearing balls 248c stored in the through holes 248b. Since the bearing 248 is arranged in this manner, the first and second alignment members 250 and 252 are supported in a relatively movable state in a plane perpendicular to the central axis (to be referred to as a cross-sectional plane). More specifically, since these first and second alignment members 250 and 252 are respectively fixed to the lower and upper attaching plates 242 and 240, the central axes of the upper and lower attaching plates 240 and 242 can be shifted from each other in a plane perpendicular to the central axis.

The compliance mechanism 244 comprises a biasing mechanism 258 for elastically holding the alignment state of the central axes of these upper and lower attaching plates 240 and 242. More specifically, when no external force acts on the lower attaching plate 242 in a normal state, the compliance mechanism 244 is elastically held by the biasing mechanism 258 in a state wherein the central axes $C_1$ and $C_2$ of the upper and lower attaching plates 240 and 242 are aligned with the central axis of the compliance module M5. When an external force in the cross-sectional plane acts on the lower attaching plate 242, the compliance mechanism 244 permits flexible deviation within the cross-sectional plane within in a predetermined range according to the external force.

Prior to the description of the biasing mechanism 258, the detailed shape of the first and second alignment members 250 and 252 associated with the biasing mechanism 258 will be described below. More specifically, the first and second alignment members 250 and 252 are formed to have the same shape, so as to perfectly coincide with each other when they vertically overlap each other. Recess portions 260a to 260d; and 262a to 262d having a substantially V shape when viewed from the top are respectively formed in the outer circumferential surfaces of the alignment members 250 and 252 at four positions set at equal angular intervals. Circumferential grooves 264 and 266 are respectively formed in the outer circumferential surfaces of the alignment members 250 and 252 along their circumferential directions so as to extend over the entire circumferences.

The biasing mechanism 258 for biasing the first and second alignment members 250 and 252 formed in this manner in an aligned state comprises a total of four support pins 268 arranged in units of pairs of upper and lower recess portions 260a and 262a; 260b and 262b; 260c and 262c; and 260d and 262d, a ring-like first biasing member 270 for simultaneously elastically biasing the upper ends of the support pins 268 against the outer circumferential surface of the first alignment member 250, and a ring-like second biasing member 272 for simultaneously elastically biasing the lower ends of the support pins 268 against the outer circumferential surface of the second alignment member 252. The diameter of each support pin 268 is set so that the radially outer portion thereof projects radially outwardly from the outer circumferential surface of the first and second alignment members 250 and 252 when it is stored in the corresponding pair of upper and lower recess portions 260a and 262a; 260b and 262b; 260c and 262c; or 260d and 262d.

More specifically, annular grooves 268a and 268b are respectively formed in the upper and lower end portions of each support pin 268. In a state wherein the support pins 268 are stored in the corresponding pairs of upper and lower recess portions 260a and 262a; 260b and 262b; 260c and 262c; and 260d and 262d, the upper grooves 268a communicate with the circumferential grooves 264 formed in the outer circumferential surface of the first alignment member 250 along the circumferential direction, and the lower grooves 268b communicate with the circumferential grooves 266 formed in the outer circumferential surface of the second alignment member 252 along the circumferential direction. In this storage state, the four support pins 268 elastically contact the outer circumferential surfaces of the corresponding pairs of upper and lower recess portions 260a and 262a; 260b and 262b; 260c and 262c; and 260d and 262d since the first biasing member 270 fitted in the circumferential groove 264 of the first alignment member 250 is fitted in the upper grooves 268a, and the second biasing member 272 fitted in the circumferential groove 266 of the second alignment member 252 is fitted in the lower grooves 268b. In this manner, the first and second alignment members 250 and 252 are elastically held in a state wherein their central axes are aligned with each other.

In this embodiment, the biasing member 270 or 272 is formed of a finely wound ring-like coil spring.

The above-mentioned lock mechanism 246 is arranged to prevent the lower attaching plate 242 from deviating in the lateral direction with respect to the upper attaching plate 240 by its inertia when the z-axis arm 14 of the robot 12 is laterally moved at high speed.

The lock mechanism 246 comprises a pair of cylinder bodies 274 which integrally project from the lower surface of the above-mentioned upper attaching plate 240 between the right and left pairs of support pins 268, as shown in FIG. 58, so as to have central axes parallel to the central axis of the compliance module M5, as shown in FIG. 57. Each cylinder body 274 is formed with a cylinder chamber 276 extending along its own central axis and having a lower end opening. The cylinder chamber 276 axially slidably stores a piston 278, which serves as a lock pin. A conical lock hole 278a for receiving a lock ball 280 (to be described later) is formed in the lower end face of the piston 278.

As shown in FIG. 57, the cylinder bodies 274 extend through recess portions 282 and 284 formed in the outer circumferential surfaces of the first and second alignment members 250 and 252 to avoid the cylinder bodies, so that their lower end faces approach and oppose the upper surface of the lower attaching plate 242. Recess portions 242a for receiving and fixing the lock balls 280 are formed in the upper surface of the lower attaching plate 242 at positions opposing the lower end faces of the cylinder bodies 274. The balls 280 are received and fixed in the corresponding recess portion 242a by drive machining.

Communication paths 286 communicating with the upper portions of the cylinder chambers 276 are formed in the upper attaching plate 240. The outer ends of the communication paths 286 commonly communicate with an air port 288 attached to the outer surface of the upper attaching plate 240. The air port 288 is connected to the above-mentioned pneumatic source 82 through a first opening/closing valve 290 (to be described later). The first opening/closing valve 290 is opened/closed by the above-mentioned controller. The controller sets the first opening/closing valve 290 in a connection mode only during an interval in which it is determined that the robot 12 drives to move the z-axis arm 14. Thus, the controller controls operations to connect the pneumatic source 82 and the cylinder chambers 276 through the air port 288, and to supply compressed air into the cylinder chambers 276. In other states, the controller sets the first opening/closing valve 290 in an open mode. Thus, the controller controls operations to open the cylinder chambers 276 to the outer air through the air port 288, so that compressed air is exhausted from the interiors of the cylinder chambers 276 to the outer air. As a result, when the first opening/closing valve 290 is connected, the pistons 278 project from the corresponding cylinder chambers 276, and are brought to lock positions where the balls 280 fixed to the lower attaching plate 242 are fitted in the lock holes 278a formed in their lower end faces. Consequently, the upper and lower attaching plates 240 and 242 are locked with each other in the lateral direction, and are laterally moved integrally.

As shown in FIGS. 57 and 60, a coil spring 292 is interposed between the central portion of the lower surface of the upper attaching plate 240 and the central portion of the upper surface of the first alignment member 250 fixed to the lower attaching plate 242. Thus, the upper attaching plate 240 and the first alignment member 250 deviate in a direction to separate from each other in the axial direction. As a result, the outward flange portion 250c of the first alignment member 250 elastically contacts the outer peripheral portion 252b of the second alignment member 252. When the extending surfaces (i.e., planes perpendicular to the central axis) of the outward flange portion 250c and the outer peripheral portion 252b are shifted to form a predetermined angle therebetween, the shift in angle is permitted. When a force for causing this shift in angle is removed, the outward flange portion 250c and the outer peripheral portion 252b are returned to be in tight contact with each other. More specifically, since the coil spring 292 is arranged, the compliance module M5 can absorb a shift in a plane perpendicular to the vertical axis, and can also absorb a shift in angle between planes perpendicular to the vertical axis.

The compliance module M5 comprises a sleeve-like cover 294, which projects downward from the outer circumferential edge of the upper attaching plate 240, and substantially closes the compliance module 244 and the lock mechanism 246 arranged in the module M5.

The alignment operation in the compliance module M5 with the above-mentioned arrangement will be described below. As can be apparent from the above description, the alignment operation can be executed only when the first opening/closing valve 290 is closed, and the lock state is released in the lock mechanism 246.

As shown in FIG. 6, when the second shaft portion G3 of the gear member G grabbed by the clamp module M7 is to be fitted in the hole H2, the position information of the hole H2 on the x-y' plane, and the three-dimensional position of the z-axis arm 14 of the robot 12, i.e., the position information of the gear member G to be fitted are input in advance, and the z-axis arm 14 is controlled to be moved by the control operation of the controller on the basis of these pieces of position information.

When the z-axis arm 14 is controlled to be moved in the horizontal direction, i.e., in the x-y' plane, the first opening/closing valve 290 is opened, and compressed air is supplied into the cylinder chambers 276 through the communication paths 286. In this manner, the pistons 278 are pushed downward, and deviate to their lock positions. The lock mechanism 246 is enabled in this manner, and is set in a lock actuation state. When the pistons 278 are brought to their lock positions, and the balls are fitted in the lock holes 278a, the pair of upper and lower attaching plates 240 and 242 are locked with each other in the lateral direction, and are laterally moved integrally.

When the z-axis arm 14 is controlled to be moved in the vertical direction, i.e., in the x-z' or y'-z' plane, the first opening/closing valve is closed, and no compressed air is supplied into the cylinder chambers 276. In this manner, the pistons 278 are released from the lock positions. Thus, the lock mechanism 246 is set in an unlock state, and the upper and lower attaching plates 240 and 242 can be desirably relatively moved in the lateral direction.

When the above-mentioned position information is accurate, the z-axis arm 14 is moved according to the control content of the control mechanism, and the hole H2 is positioned according to the setting value, the gear member G is moved immediately above this hole H2 on the basis of the above-mentioned movement control operation, and thereafter, is moved vertically downward, so that the second shaft portion G3 of the gear member G can be satisfactorily fitted in the hole H2.

However, in some cases, the hole H2 may not be accurately positioned, and its position may be slightly shifted from the setting value in the x-y' plane, or the position of the z-axis arm 14 may be slightly shifted from the position defined by the control mechanism due to an error of the driving system, e.g., backlash of gears.

When such a shift occurs, the lower edge of the second shaft portion G3 of the gear member G, which is moved vertically downward upon downward movement of the z-axis arm 14, contacts the tapered surface formed at the opening edge of the hole H2, and the lower edge of the gear member G receives a partial force along the x-y' plane along the tapered surface upon further downward movement of the z-axis arm 14.

As described above, when the z-axis arm 14 is vertically moved, the lock mechanism 246 is set in a non-actuation state. For this reason, the pair of upper and lower attaching plates 240 and 242 can relatively laterally deviate from each other. As a result, when the gear member G receives the partial force along the x-y' plane, this partial force acts on the compliance mechanism 244 through the lower attaching plate 242.

Figure 61:
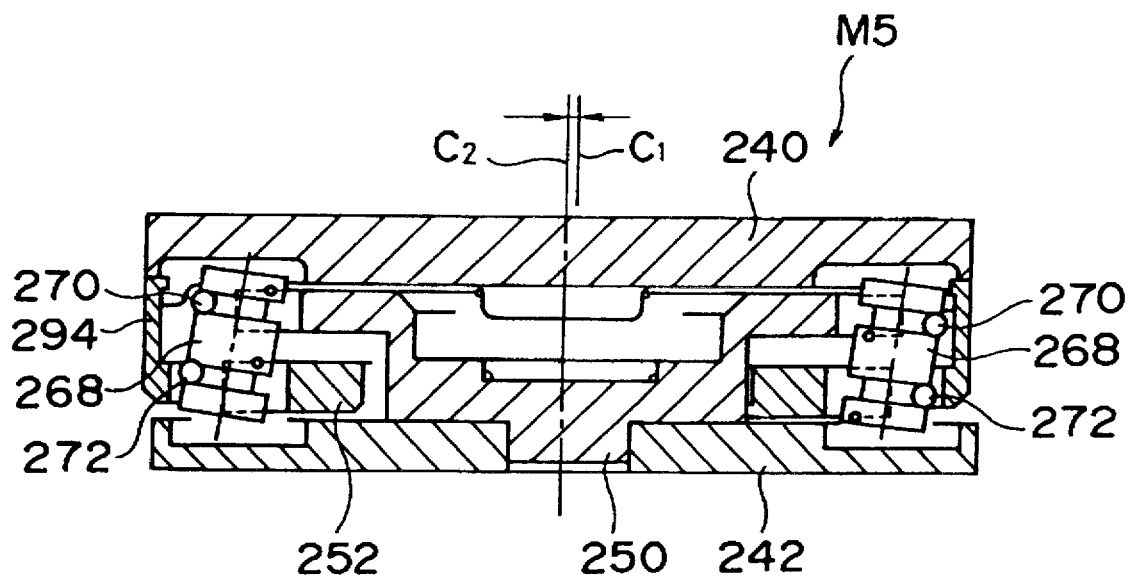
FIG. 61 is a sectional view showing the execution state of a compliance operation of the cushion module shown in FIG. 52 in a plane perpendicular to the central axis.

For this reason, in a state wherein no partial force acts, the central axes of the first and second alignment members 250 and 252 are elastically aligned with each other by the pair of upper and lower biasing members 270 and 272. Upon application of the partial force, the support pins 268 are obliquely inclined from the above-mentioned state against the biasing forces of the biasing members 270 and 272, as shown in FIG. 61. As a result, the lower attaching plate 242 is moved to be shifted along the plane perpendicular to the central axis with respect to the upper attaching plate 240.

In this shifting movement, as shown in FIG. 61, the lower attaching plate 242 is moved while supporting the gear member G in a vertically extending state without being inclined. For this reason, a subsequent fitting operation can be very easily performed.

In this manner, a shift between the second shaft portion G3 of the gear member G and the hole H2 is elastically absorbed by the shift between the first and second alignment members 250 and 252 in the compliance mechanism 244, and the gear member G and the hole H2 are aligned with each other in the vertical direction. Thereafter, upon downward movement of the z-axis arm 14, the second shaft portion G3 of the gear member G can be satisfactorily fitted in the hole H2.

Upon completion of the fitting operation of the gear member G into the hole H2, the grabbing state of the gear member G by the clamp module M7 is released, and the z-axis arm 14 is moved upward. Thus, the clamp module M7 is solely moved upward while releasing the gear member G. When the gear G is completely separated from the clamp module M7, the above-mentioned partial force acting on the lower attaching plate 242 is stopped. As a result, the partial force acting on the lower attaching plate 242 in the compliance mechanism 244 is removed, and the upper and lower attaching plates 240 and 242 can be satisfactorily returned from the shifted state shown in FIG. 61 to the aligned state shown in FIG. 57 by the biasing forces of the pair of upper and lower biasing members 270 and 272.

In this manner, the alignment operation of the compliance module M5, in other words, the elastic deviation/return operation of the compliance mechanism 244 is ended.

Figure 62:
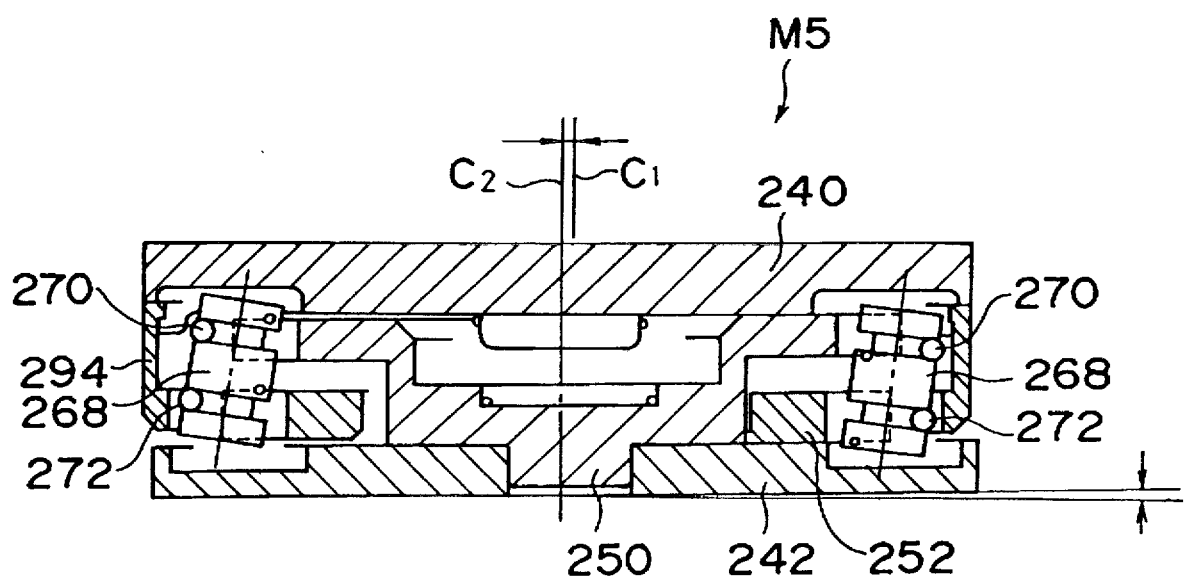
FIG. 62 is a sectional view showing the execution state of a compliance operation of the cushion module shown in FIG. 52 in a plane perpendicular to the central axis, and with an inclination with respect to the central axis.

The alignment operation in the compliance mechanism 244 absorbs not only a shift in the plane perpendicular to the central axis, but also an inclination of the central axis of the lower attaching plate 242 with respect to the central axis of the upper attaching plate 240 while absorbing the shift in the plane perpendicular to the central axis, as shown in FIG. 62.

Figure 55:
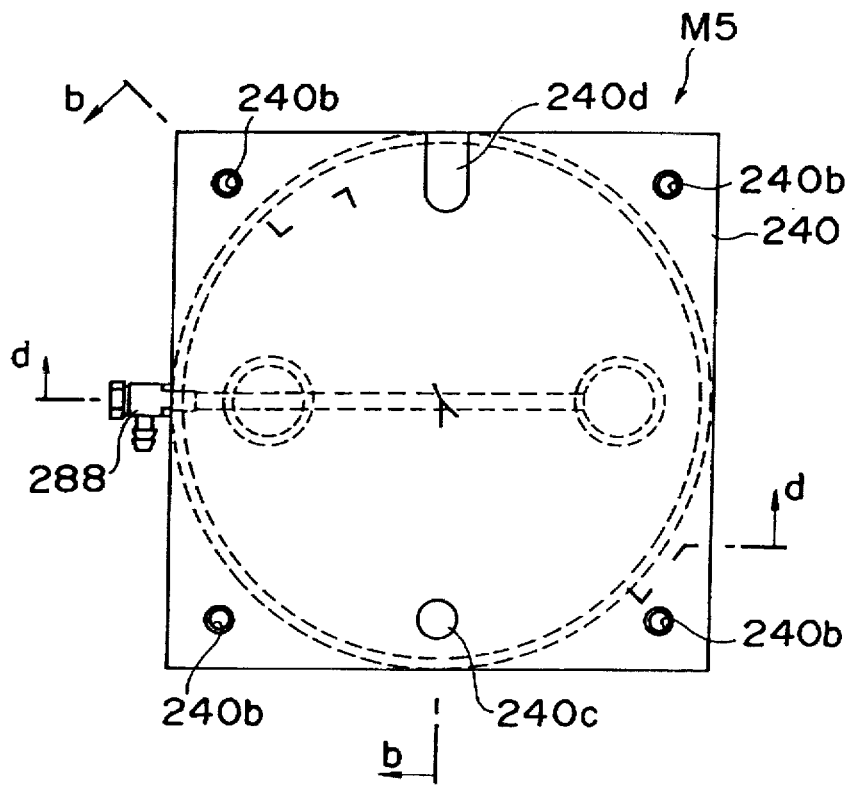
FIG. 55 is a plan view showing the upper shape of the cushion module shown in FIG. 53.
Figure 56:
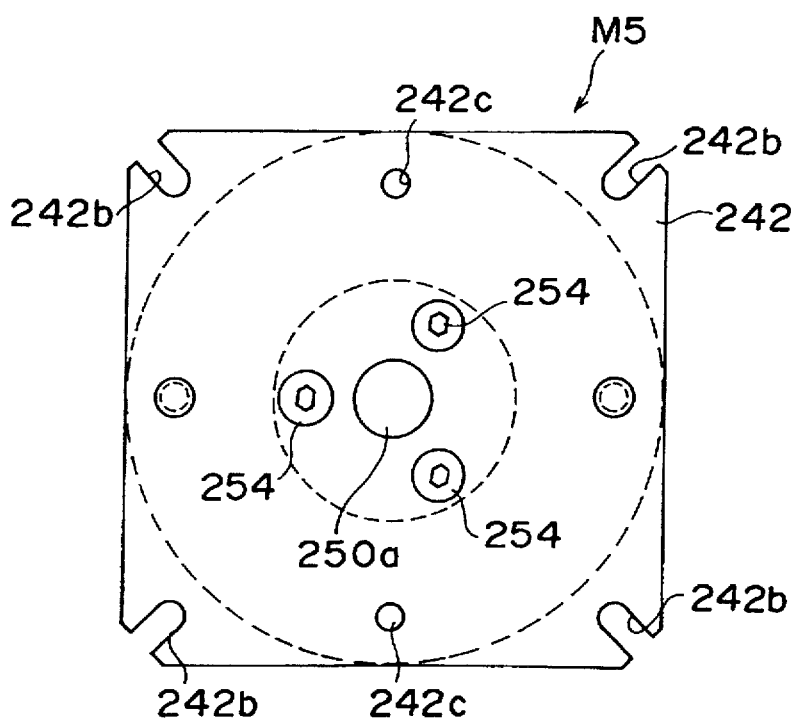
FIG. 56 is a lower view showing the lower shape of the cushion module shown in FIG. 53.
Figure 59:
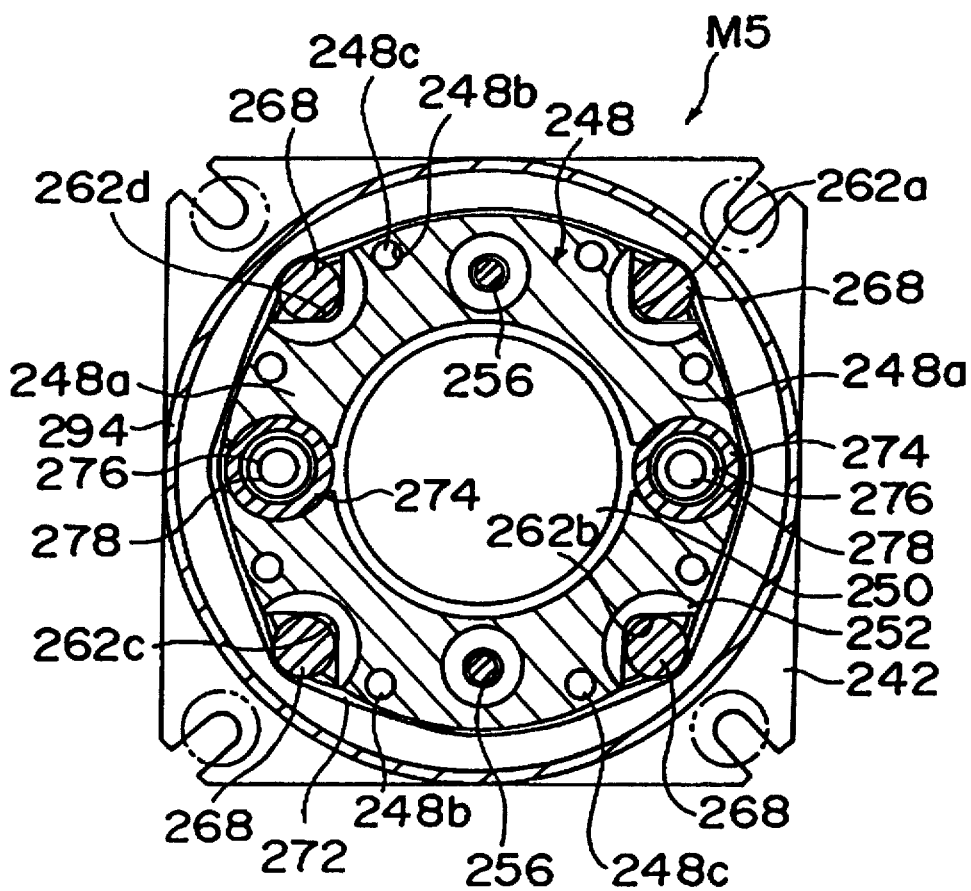
FIG. 59 is a sectional view taken along a line c—c of the cushion module shown in FIG. 57.

As shown in FIG. 55, attaching screw holes 240b having the diameter $d_1$ are formed at the four corners of the upper attaching plate 240 to be separated at the above-mentioned predetermined arrangement pitch $D_1$, and, as shown in FIG. 56, attaching through holes 242b are formed at the four corners of the lower attaching plate 242 in the same state as the holes 240b. A positioning hole 240c and a positioning groove 240d for receiving a pair of positioning pins commonly formed on the bottom surface of each of the modules M1 to M4, and M6 are formed at the central portions of the opposing two sides of the upper surface of the upper attaching plate 240. A pair of positioning pins 242c, which are respectively inserted in the positioning hole and the positioning groove formed in each of other modules M2 to M4, M6, and M7, have the diameter $d_2$, and are separated by the predetermined distance $D_2$, integrally project downward from the central portions of the opposing two sides of the lower surface of the lower attaching plate 242.

In this manner, one of other modules M2 to M4, M6, and M7 is selectively attached to the lower portion of the compliance module M5, and one of other modules M1 to M4, and M6 is selectively attached to the upper portion thereof.

Description of Shift Module M6

The shift module M6 for performing the above-mentioned shift operation comprises a pair of upper and lower attaching plates 300 and 302 which are attached to be relatively movable along the central axis of the shift module M6, and an intermediate member 304 interposed between the upper and lower attaching plates 300 and 302 in a telescopic shape, as shown in FIGS. 63 to 70 as an embodiment. A movement driving mechanism 306 for moving the lower attaching plate 302 toward or away from the upper attaching plate 300 along the axial direction is integrally attached to the central portion of the upper attaching plate 300. The movement driving mechanism 306 is constituted as a pneumatic cylinder mechanism in this embodiment.

On the lower surface of the above-mentioned upper attaching plate 300, a pair of first downward guide rods 308 are fixed at positions on the same diameter and separated from the central axis by the same distance. A sleeve-like first cover 310 is integrally formed to depend from the outer peripheral portion of the lower surface of the upper attaching plate 300 so as to surround the above-mentioned pair of first guide rods 308. On the upper surface of the above-mentioned lower attaching plate 302, a pair of upward guide rods 312 are fixed at positions located on the diameter perpendicular to the diameter where the first guide rods 308 are arranged, and separated from the central axis by the same distance as the separation distance of the first guide rods 308 from the central axis. A second cover 314 is integrally formed in an upright state on the outer peripheral portion of the upper surface of the lower attaching plate 302 so as to be aligned with the above-mentioned first cover 310.

The above-mentioned intermediate member 304 is located inside the first and second covers 310 and 314, and is surrounded by these covers. More specifically, the intermediate member 304 is integrally formed by a disk-like main body portion 316 formed with a central through hole 316a for receiving the above-mentioned movement driving mechanism 306 at its center, a pair of sleeves 318, formed on the outer circumferential surface of the main body portion 316, for receiving the above-mentioned pair of first guide rods 308 from the above, and a pair of sleeves 320, formed on the outer circumferential surface of the main body portion 316, for receiving the pair of second guide rods 312 from below. Note that these first and second guide rods 308 and 312 are slidably supported by slide bearings 322 and 324 which are stored in the inner circumferential surfaces of the corresponding sleeves 318 and 320.

Figure 64:
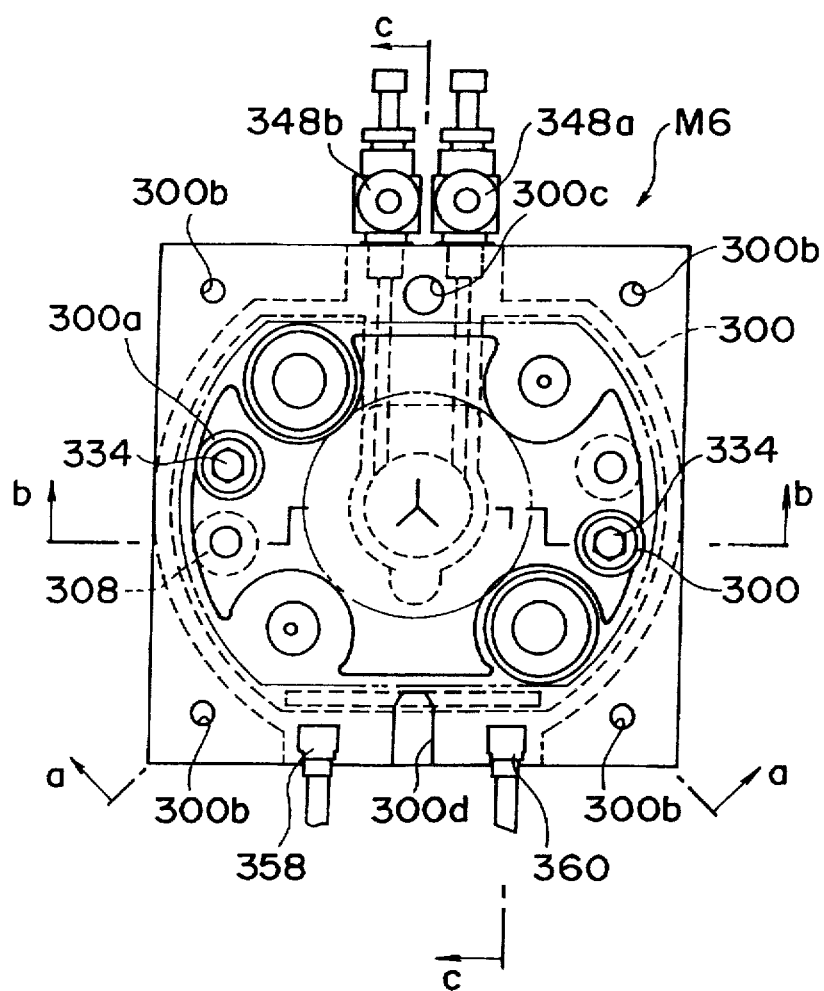
FIG. 64 is a plan view showing the upper shape of the shift module shown in FIG. 63.
Figure 65:
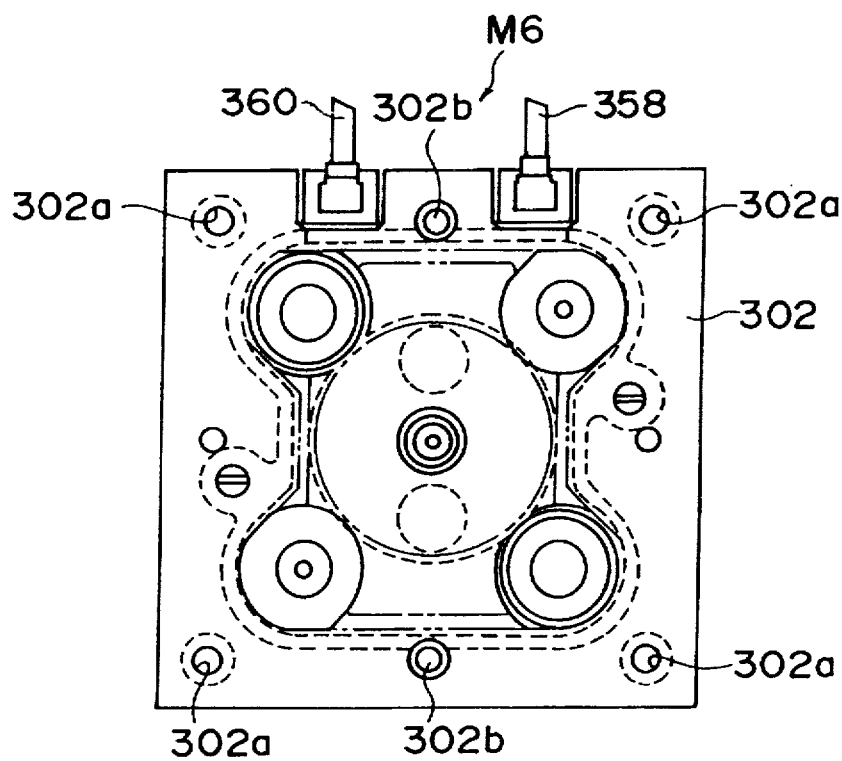
FIG. 65 is a lower view showing the lower shape of the shift module shown in FIG. 63.
Figure 66:
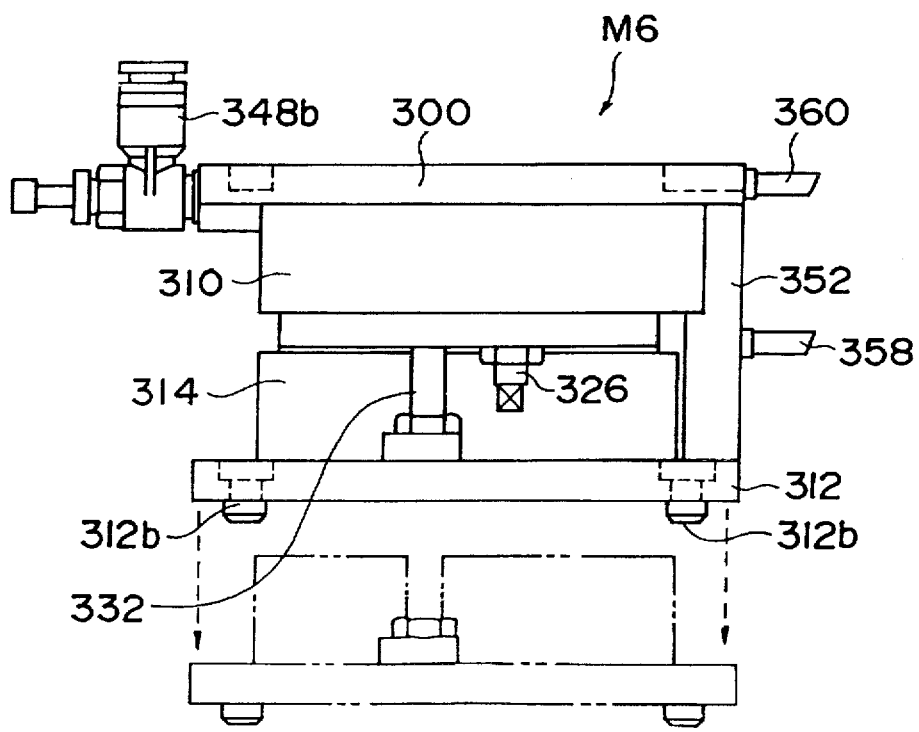
FIG. 66 is a left side view showing the left side shape of the shift module shown in FIG. 63.
Figure 67:
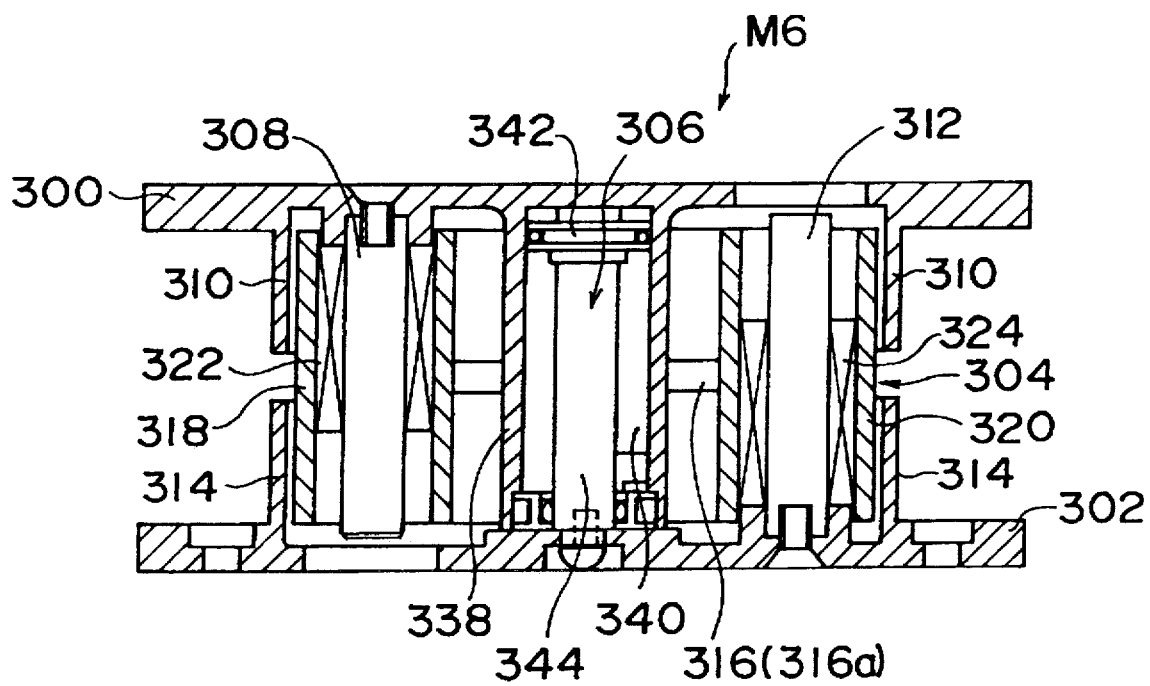
FIG. 67 is a sectional view taken along a line a—a of the shift module shown in FIG. 64.
Figure 68:
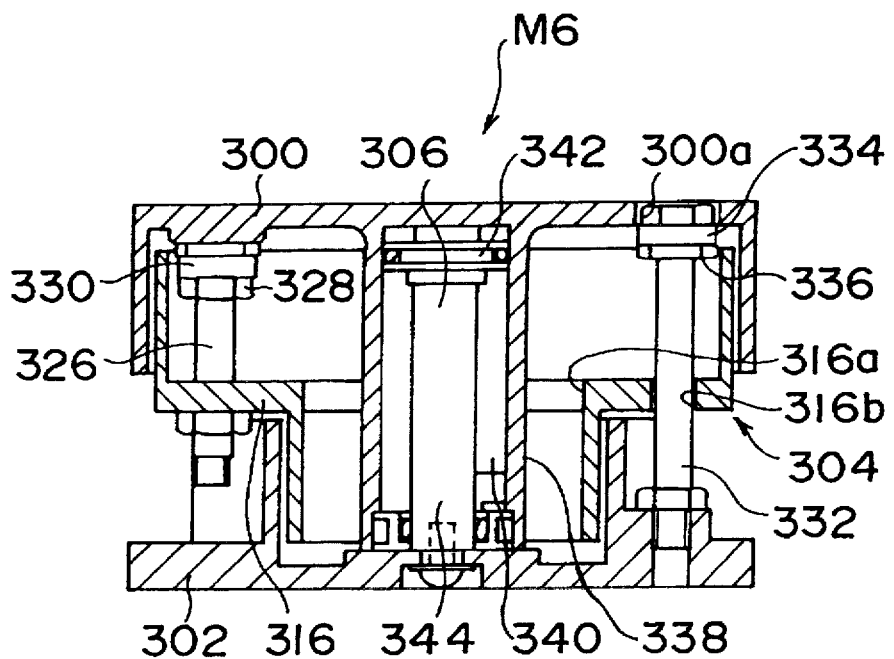
FIG. 68 is a sectional view taken along a line b—b of the shift module shown in FIG. 64.

As shown in FIGS. 64 and 68, a pair of first stopper pins 326 for regulating the upward end position in the shift module M6 are fixed in an upright state on the upper surface of the main body portion 316. The first stopper pins 326 are located on a diameter different from the diameter where the pair of first guide rods 308 are arranged, and the diameter where the pair of second guide rods 312 are arranged, and are located on the same circumference as that where these guide rods are arranged. A first head portion 328 for regulating the upward end of the intermediate member 304 when it contacts with the lower surface of the upper attaching plate 300 is attached to the upper end of each first stopper pin 326, and contacts the lower surface of the upper attaching plate 300 through a first shock absorber 330.

A thread is formed on the outer circumferential surface of the first stopper pin 326 across its total length, and the first head portion 328 is engaged with this thread. As a result, the first head portion 328 is movable along the axial direction of the first stopper pin 326. More specifically, when the first head portion 328 is moved along the axial direction of the first stopper pin 326, the shift stroke amount of the intermediate member 304 to the upper attaching plate 300 can be changed and adjusted.

A pair of second stopper pins 332 for regulating the downward end position in the shift module M6 are fixed in an upright state on the upper surface of the lower attaching plate 302. The second stopper pins 332 are located on a diameter different from the diameter where the pair of first guide rods 308 are arranged, and the diameter where the pair of second guide rods 312 are arranged, and are located on the same circumference as that where these guide rods are arranged. The upper ends of these second stopper pins 332 project upward from the main body portion 316 through side through holes 316b formed in the main body portion 316 of the intermediate member 304 to extend therethrough in the direction of thickness. A second head portion 334 having a diameter larger than that of the side through hole 316b is attached to the upper end of each second stopper pin 332. When the lower surfaces of the second head portions 334 contact the upper surface of the main body portion 316 of the intermediate portion 304 through second shock absorbers 336, the downward end position of the lower attaching plate 302 with respect to the intermediate member 304 is regulated.

As shown in FIG. 68, the second head portions 334 attached to the upper ends of the second stopper pins 332 are inserted in through holes 300a formed in the upper attaching plate 300 in a state wherein the head portions 328 of the first stopper pins 326 contact the lower surface of the upper attaching plate 300 through the first shock absorbers 330 to regulate the upward end position.

A thread is formed on the outer circumferential surface of each second stopper pin 332, and the above-mentioned second head portion 334 is engaged with this thread. As a result, the second head portion 334 is movable along the axial direction of the second stopper pin 332. More specifically, when the second head portions 334 are moved along the axial direction of the second stopper pins 332, the shift stroke of the lower attaching plate 302 with respect to the intermediate member 304 can be changed and adjusted.

As described above, the upper and lower attaching plates 300 and 302 are guided to approach or be separated from each other along the central axis through the intermediate member 304, which is interposed in a telescopic shape between the upper and lower attaching plates 300 and 302. Thus, a sufficient shift stroke can be obtained by a small height, and when modules are combined, a more compact structure can be realized.

The above-mentioned movement driving mechanism 306 is constituted by a cylinder body 338 integrally attached to depend from the central portion of the lower surface of the upper attaching plate 300, a piston 342 stored in a cylinder chamber 340 formed inside the cylinder body 338 to be reciprocally slidable along the central axis of the shift module M6, and a piston rod 344 which is integrally connected to the lower surface of the piston 342, projects downward to extend through the lower portion of the cylinder body 338, and has a lower end coupled to the central portion of the upper surface of the lower attaching plate 302.

A first sub cylinder chamber 340a is defined by a portion, located below the piston 342, of the cylinder chamber 340, and a second sub cylinder chamber 340b is defined by a portion, located above the piston 342, of the cylinder chamber 340. As can be seen from FIG. 70, a first communication path 346a is formed to extend through the upper attaching plate 300 and the circumferential wall of the cylinder body 338. One end of the first communication path 346a is connected to the first sub cylinder chamber 340a. The first communication path 346a is connected to a first air port 348a attached to the outer side surface of the upper attaching plate 300. A second air port 348b is attached to the outer side surface of the upper attaching plate 300 to be juxtaposed with the first air port 348a. Although not shown, the second air port 348b is connected to the second sub cylinder chamber 340b through a second communication path formed to extend through the upper attaching plate 300.

These first and second air ports 348a and 348b are connected to the above-mentioned pneumatic source 82 through a third selector valve 350 comprising an electromagnetic solenoid valve (to be described later). In a first switching mode, the third selector valve 350 is switched to supply compressed air to the first sub cylinder chamber 340a through the first air port 348a, and to exhaust air from the second cylinder sub chamber 340b through the second air port 348b. In a second switching mode, the third selector valve 350 is switched to exhaust air from the first sub cylinder chamber 340a through the first air port 348a, and to supply compressed air into the second cylinder sub chamber 340b through the second air port 348b. When the third selector valve 350 is set in the first switching mode, the lower attaching plate 302 approaches the upper attaching plate 300; when it is set in the second switching mode, the lower attaching plate 302 is separated from the upper attaching plate 300.

Figure 63:
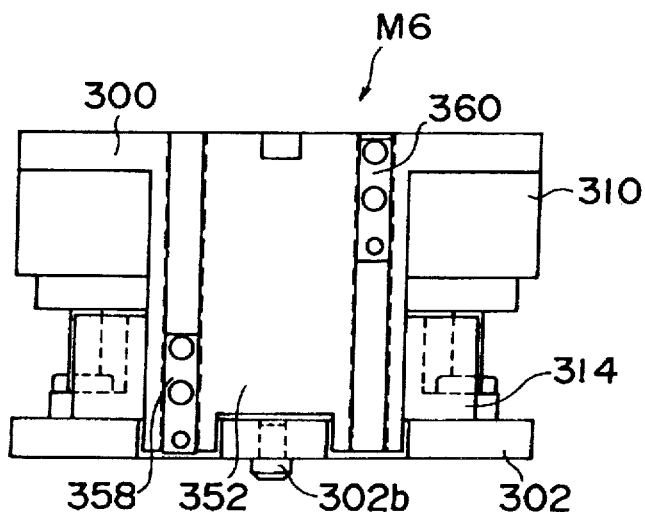
FIG. 63 is a front view showing the front shape of a shift module equipped on the hand mechanism shown in FIG. 1.
Figure 69:
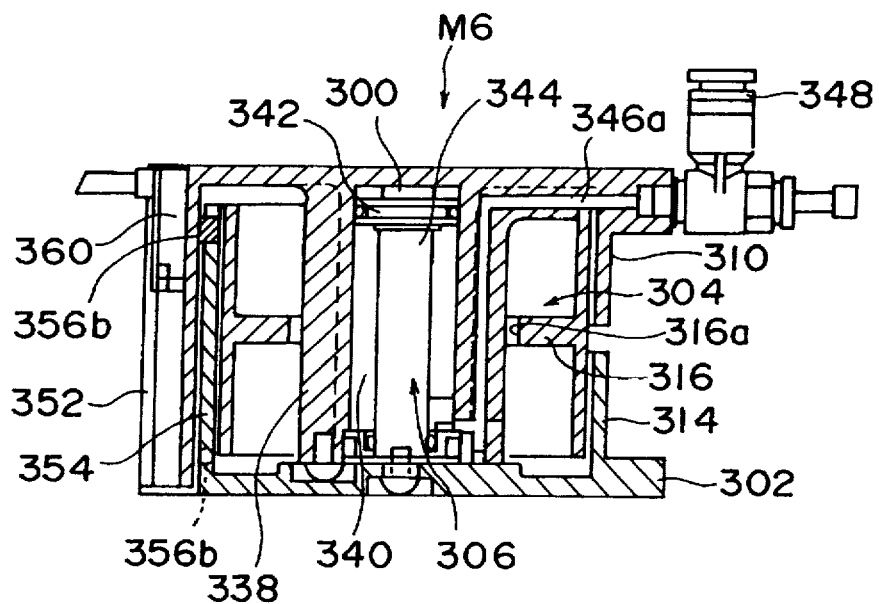
FIG. 69 is a sectional view taken along a line c—c of the shift module shown in FIG. 64.
Figure 70:
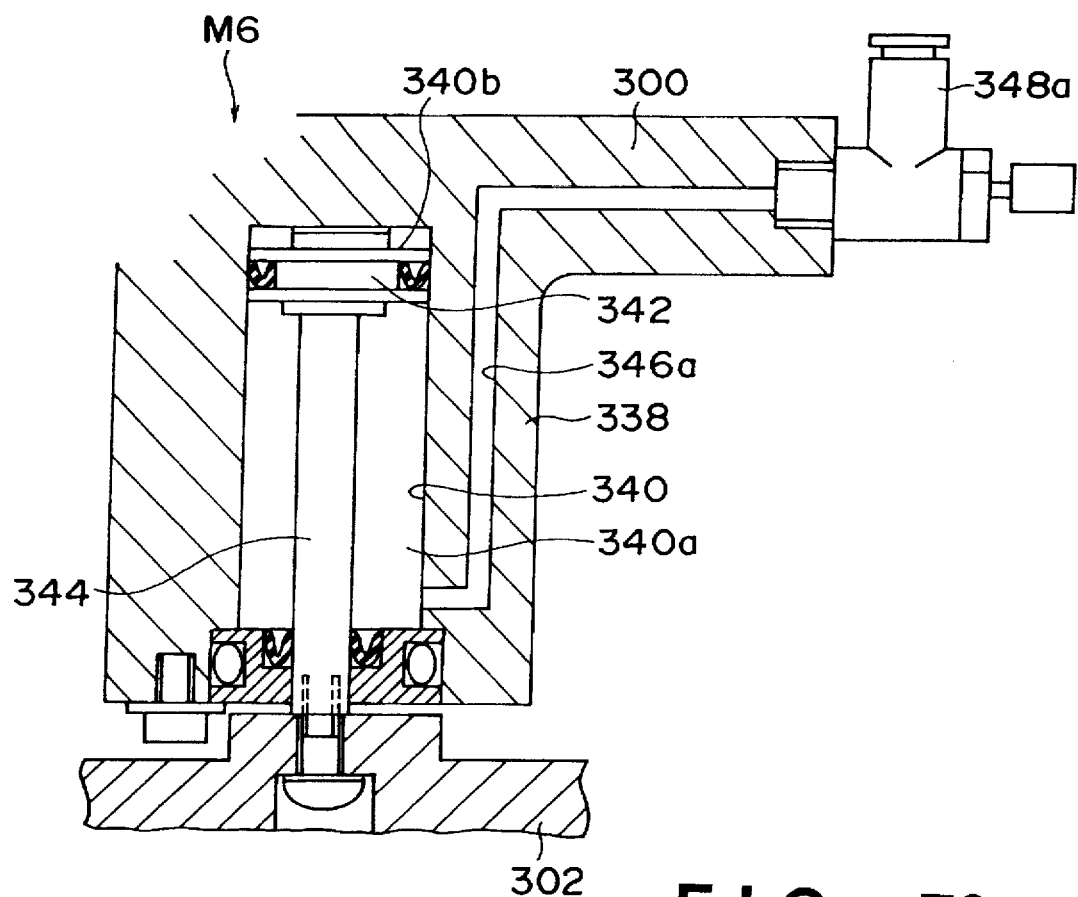
FIG. 70 is a sectional view showing in detail the formation state of a first communication path shown in FIG. 69.
Figure 79:
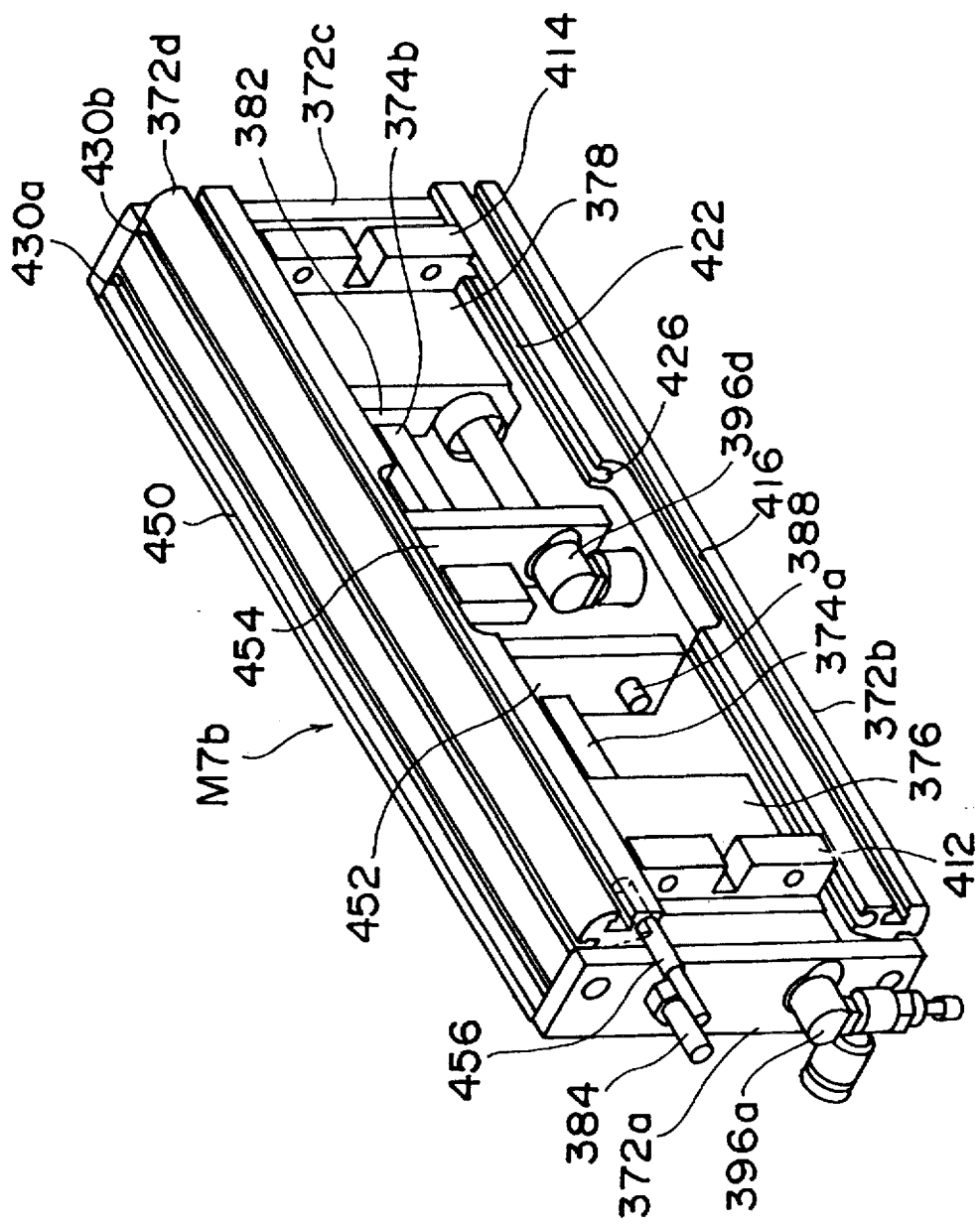
FIG. 79 is a perspective view showing the details of the arrangement of the second embodiment of a clamp module equipped on the hand mechanism shown in FIG. 1.
Figure 80:
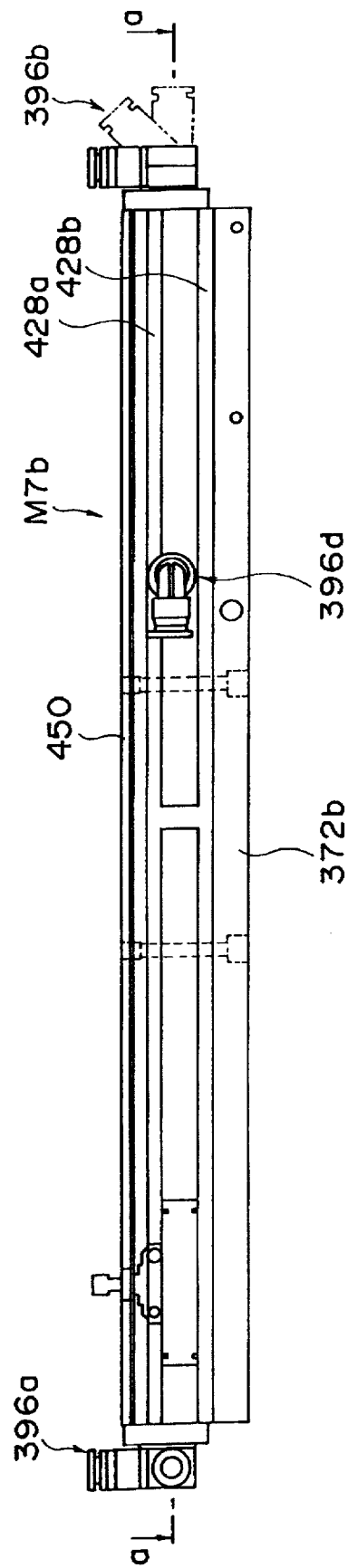
FIG. 80 is a front view showing the front shape of the second embodiment shown in FIG. 79.
Figure 81:
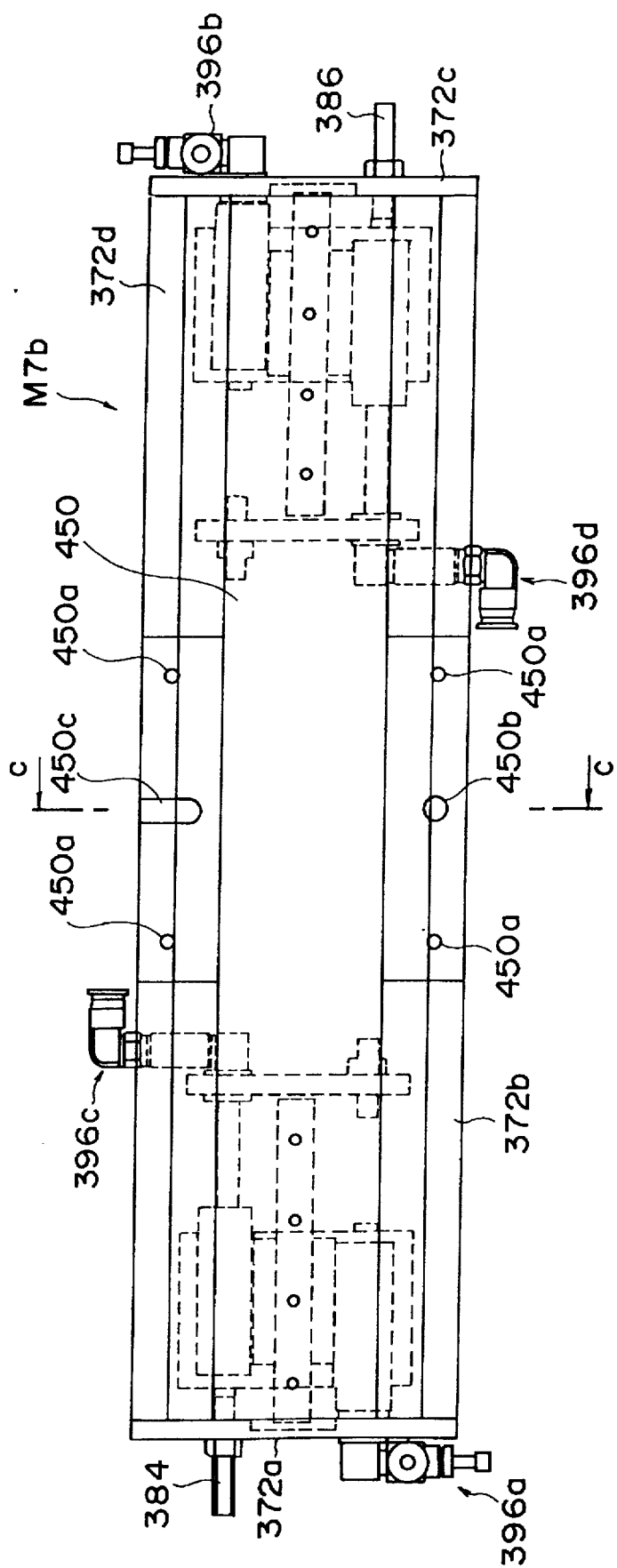
FIG. 81 is a plan view showing the upper shape of the clamp module of the second embodiment shown in FIG. 79.
Figure 82:
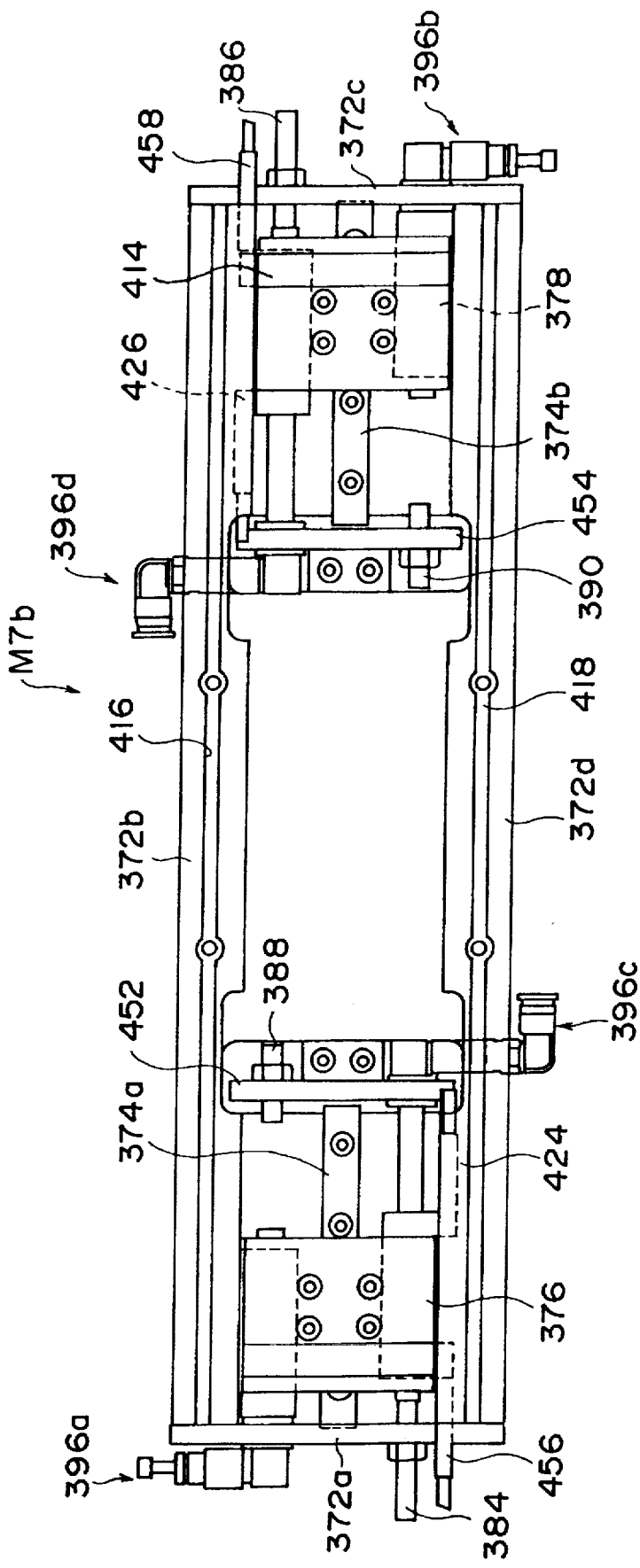
FIG. 82 is a lower view showing the lower shape of the clamp module of the second embodiment shown in FIG. 79.
Figure 83:
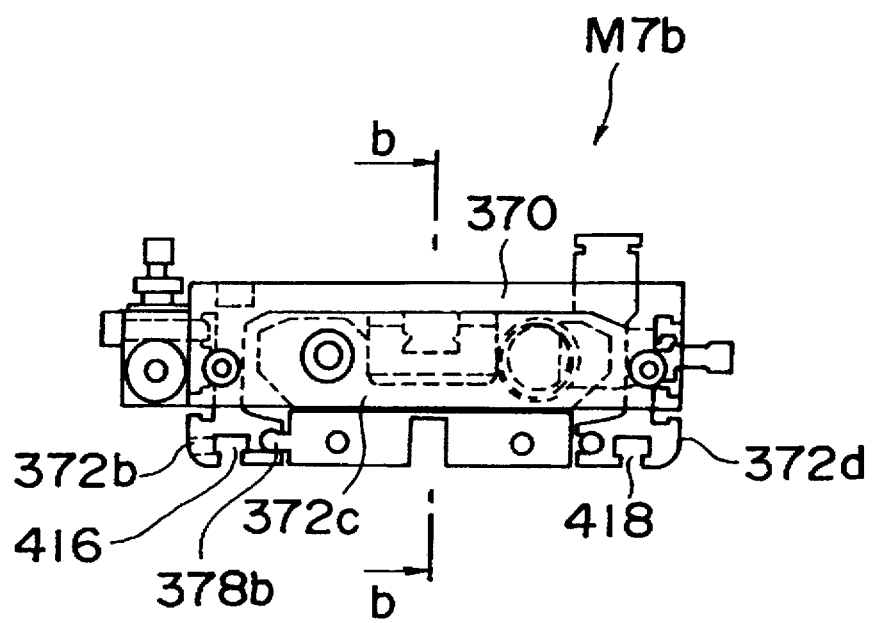
FIG. 83 is a right side view showing the right side shape of the clamp module of the second embodiment shown in FIG. 79.
Figure 84:
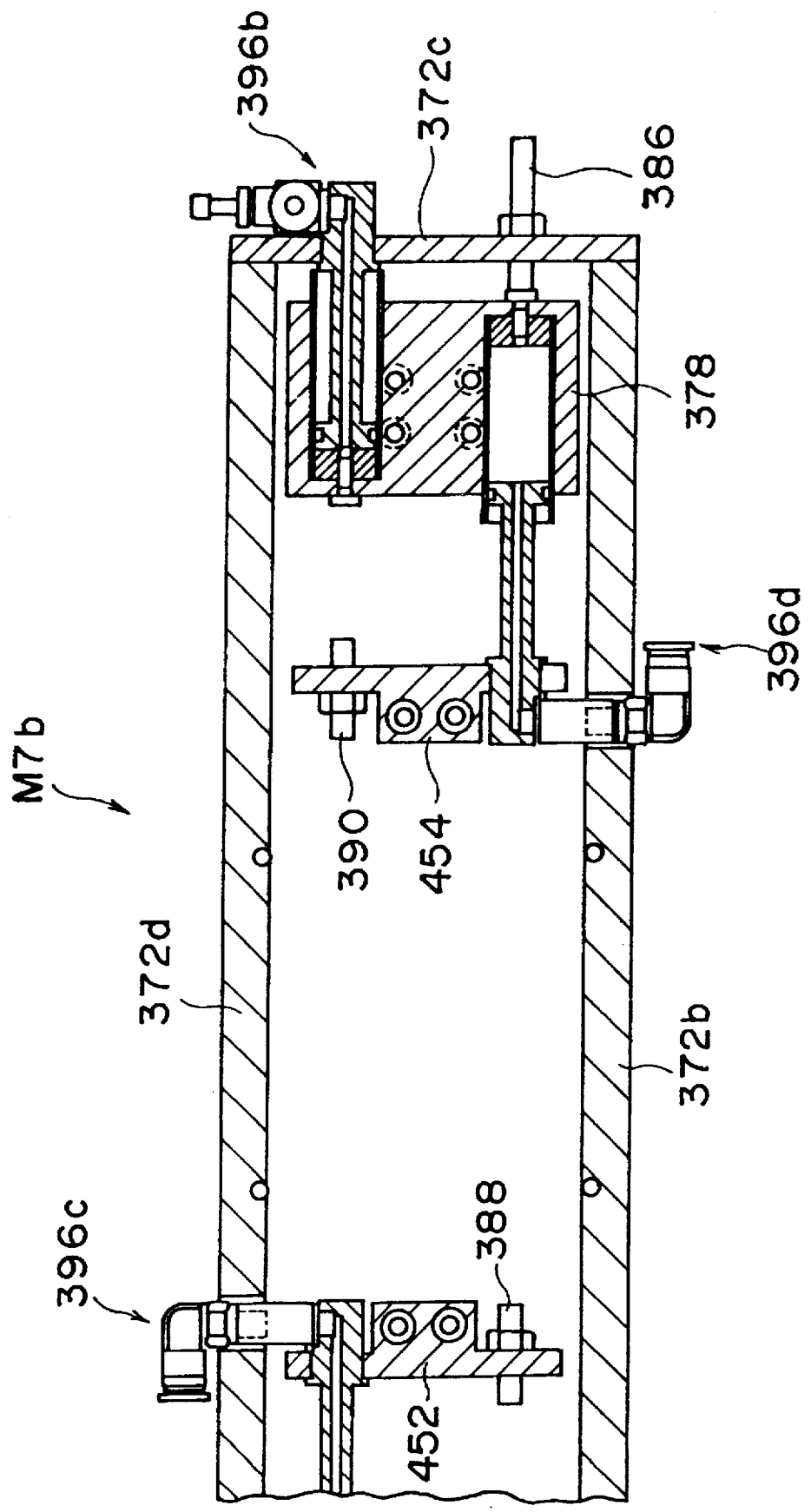
FIG. 84 is a sectional view taken along a line a—a of the clamp module of the second embodiment shown in FIG. 80.
Figure 85:
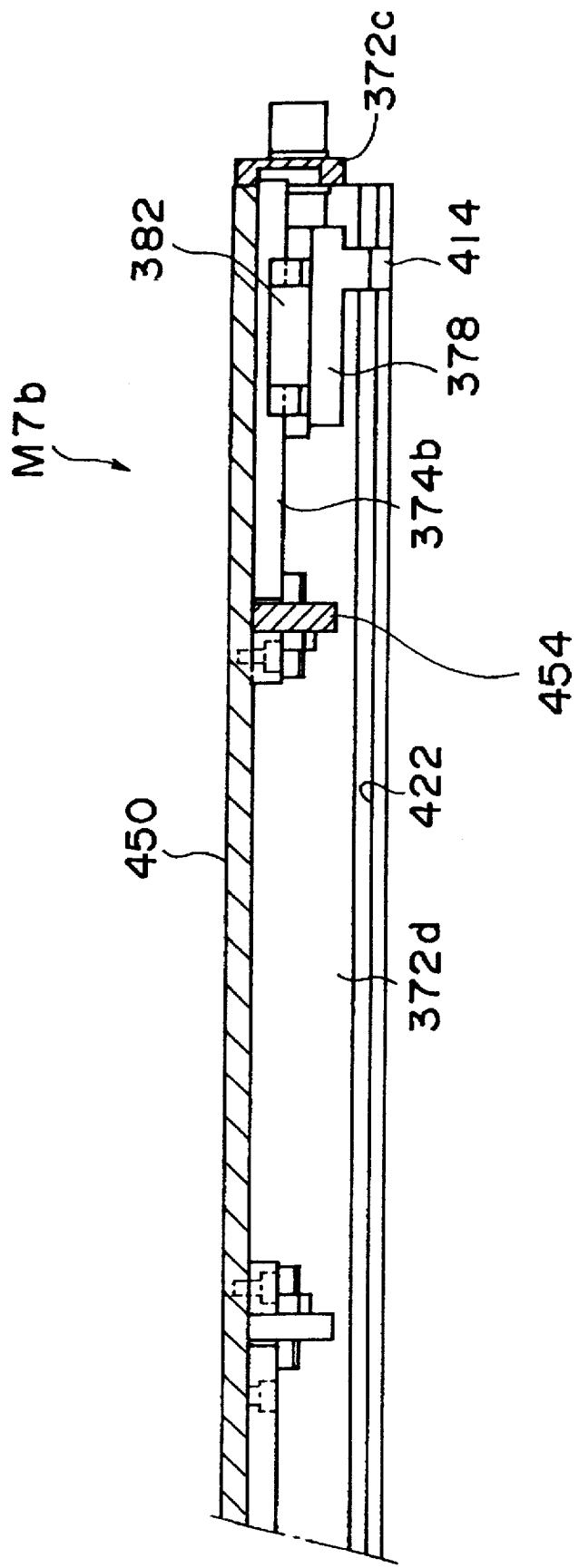
FIG. 85 is a sectional view taken along a line b—b of the clamp module of the second embodiment shown in FIG. 83.
Figure 89:
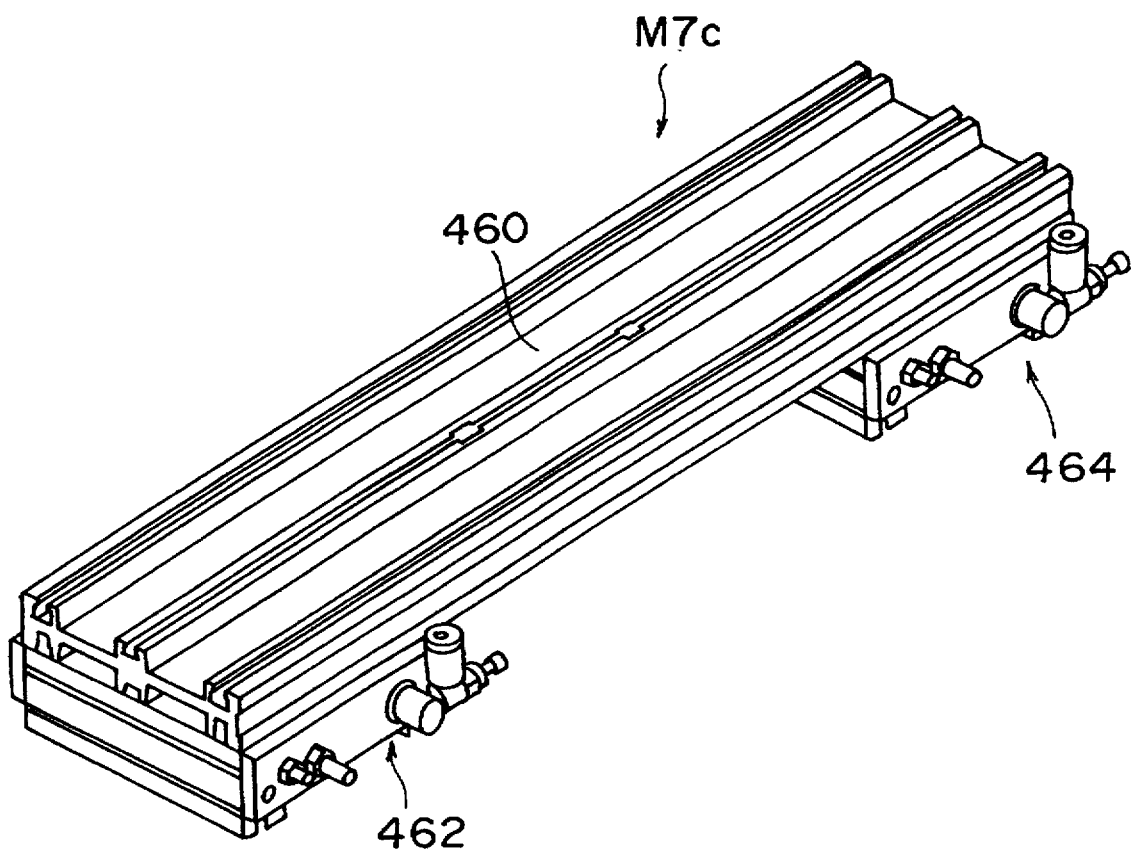
FIG. 89 is a perspective view showing the arrangement of the third embodiment of a clamp module equipped on the hand mechanism shown in FIG. 1.
Figure 90:
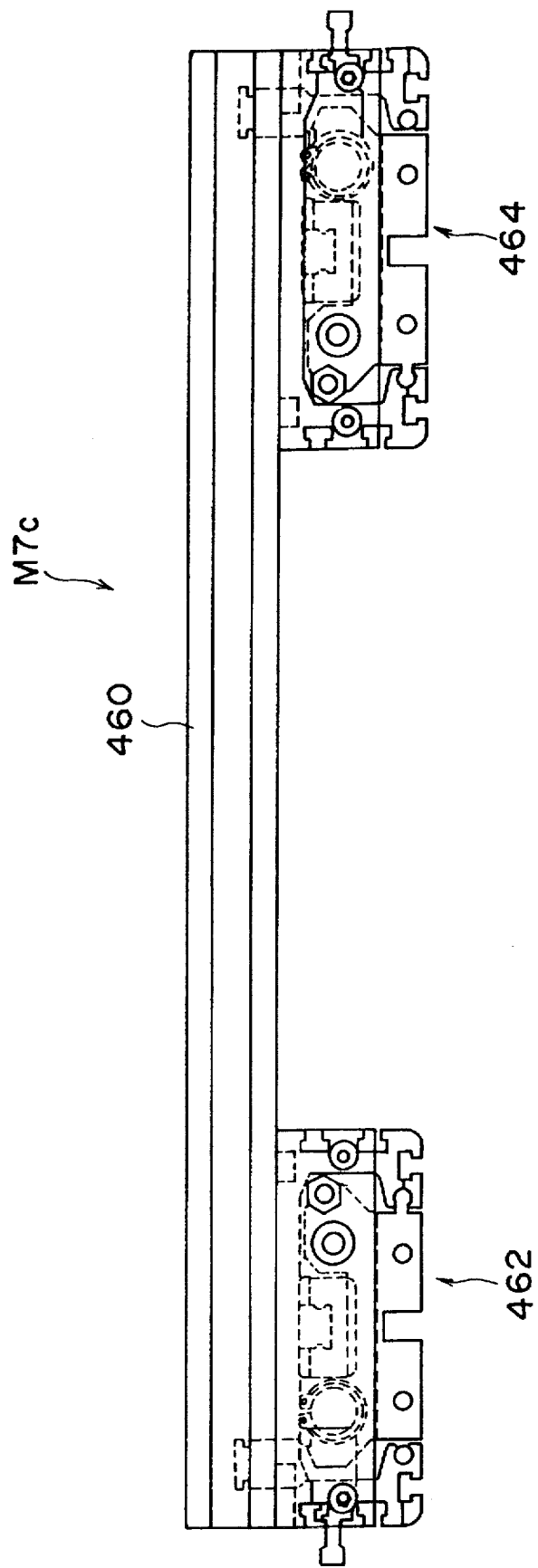
FIG. 90 is a front view showing the front shape of the clamp module of the third embodiment shown in FIG. 86.
Figure 91:
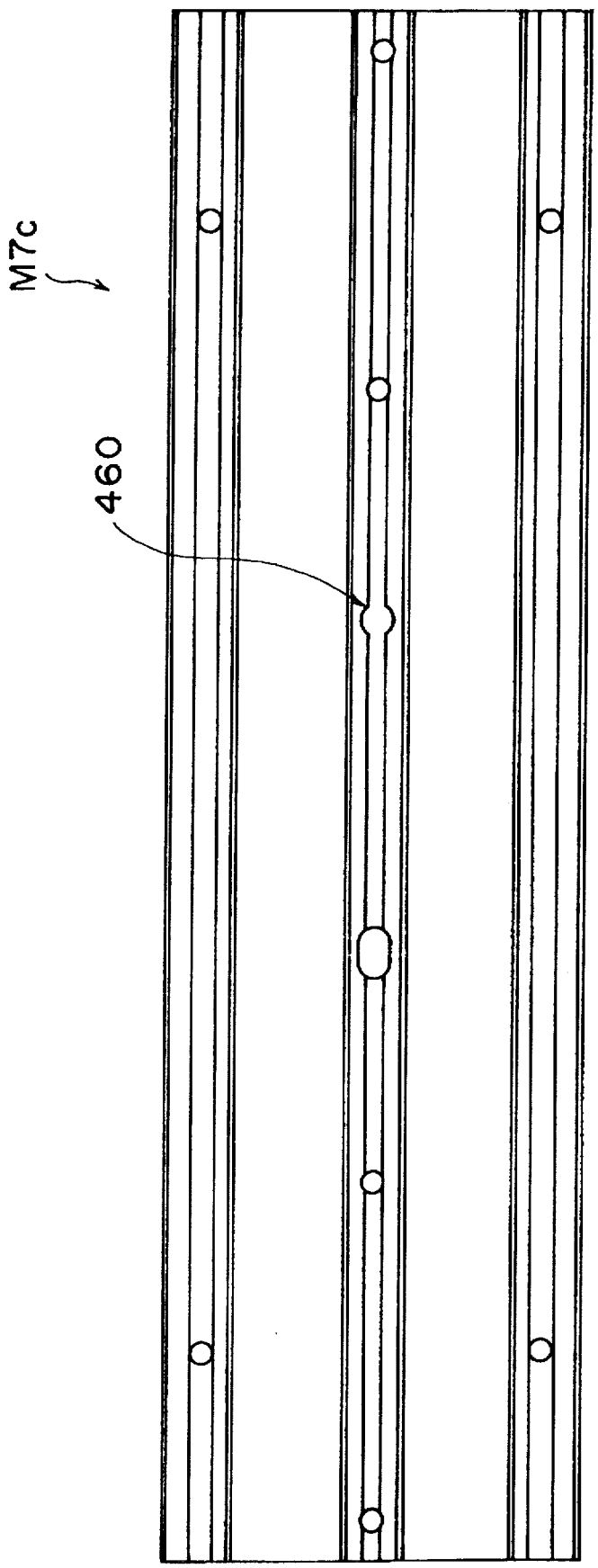
FIG. 91 is a plan view showing the upper shape of the clamp module of the third embodiment shown in FIG. 86.
Figure 92:
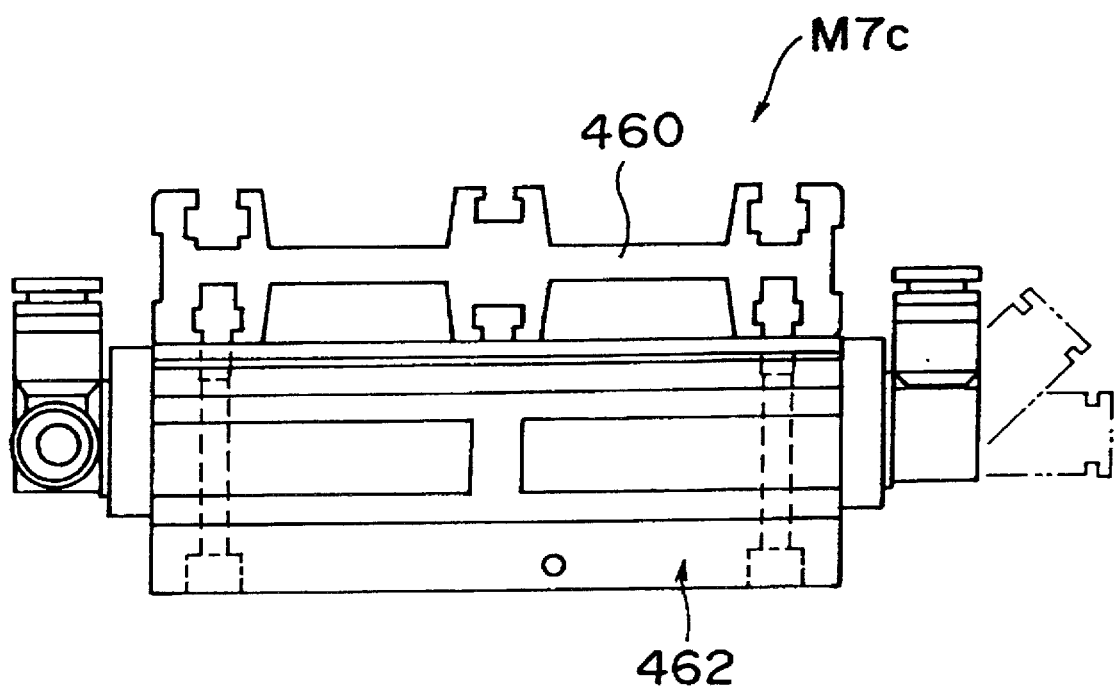
FIG. 92 is a right side view showing the right side shape of the clamp module of the third embodiment shown in FIG. 86.

As shown in FIGS. 63 and 69, a sensor attachment stay 352 is attached to depend from one outer side surface of the upper attaching plate 300. A dog attachment stay 354 is attached to one outer side surface of the lower attaching plate 302 in an upright state so as to oppose the inner surface of the sensor attachment stay 352. A first dog 356a for defining the downward end position of the lower attaching plate 302 is attached to the upper end of the dog attachment stay 354, and a second dog 356b for defining the upward end position of the lower attachment plate 302 is attached to the lower end thereof. These first and second dogs 356a and 356b comprise magnets. These first and second dogs 356a and 356b are arranged at positions separated from each other in the circumferential direction.

A seventh sensor 358 which is turned on by the first dog 356a when the lower attaching plate 302 is moved downward to the downward end position, and an eighth sensor 360 which is turned on by the second dog 356b when the lower attaching plate 302 is moved upward to the upward end position are attached to the above-mentioned sensor attachment stay 352. The seventh and eighth sensors 358 and 360 comprise non-contact type magnetic sensors, which are turned on when they approach magnets.

The seventh and eighth sensors 358 and 360 are connected to the above-mentioned controller, and output their detection results thereto. More specifically, assume that the controller sets the third selector valve 350 in the first switching mode to separate the lower attaching plate 302 from the upper attaching plate 300. In this state, when the seventh sensor 358 does not output an ON signal after an elapse of a predetermined period of time, the controller determines an abnormal state wherein the lower attaching plate 302 is stopped during the downward movement operation, or does not execute the downward movement operation, and executes an alarm operation. When the seventh sensor 358 outputs an ON signal within the predetermined period of time, the controller executes the subsequent control sequence. Assume that the controller sets the third selector valve 350 in the second switching mode to cause the lower attaching plate 302 to approach the upper attaching plate 300. In this state, when the eighth sensor 360 does not output an ON signal after an elapse of a predetermined period of time, the controller determines an abnormal state wherein the lower attaching plate 302 is stopped during the upward movement operation or does not execute the upward movement operation, and executes an alarm operation. When the eighth sensor 360 outputs an ON signal within the predetermined period of time, the controller executes the subsequent control sequence.

Since the shift module M6 is arranged as described above, when the third selector valve 350 is set in the first switching mode, compressed air is supplied into the first sub cylinder chamber 340a through the first air port 348a, and air is exhausted from the second sub cylinder chamber 340b through the second air port 348b, the lower attaching plate 302 approaches the upper attaching plate 300. When the third selector valve 350 is set in the second switching mode, compressed air is supplied into the second sub cylinder chamber 340b through the second air port 348b, and air is exhausted from the first sub cylinder chamber 340a through the first air port 348b, the lower attaching plate 302 is separated from the upper attaching plate 300.

Attaching screw holes 300b having the diameter $d_1$ are formed at the four corners of the upper attaching plate 300 to be separated at the predetermined arrangement pitch $D_1$, and attaching through holes 302a are formed at the four corners of the lower attaching plate 302 in the same state as the holes 300b. A positioning hole 300c and a positioning groove 300d for receiving a pair of positioning pins commonly formed on the bottom surface of each of the modules M1 to M5 are formed at the central portions of the opposing two sides of the upper surface of the upper attaching plate 300.

A pair of positioning pins 302b, which are respectively inserted in the positioning hole and the positioning groove formed in each of other modules M2 to M5, and M7, have the diameter $d_2$, and are separated by the predetermined distance $D_2$, integrally project downward from the central portions of the opposing two sides of the lower surface of the lower attaching plate 302.

In this manner, one of other modules M2, M5, and M7 is selectively attached to the lower portion of the shift module M6, and one of other modules M1 to M5 is selectively attached to the upper portion thereof.
Description of Clamp Module M7

The clamp module M7, attached to the lower portion of the hand mechanism 10, for grabbing a work is arranged, is shown in FIGS. 71 to 78 as the first embodiment.

More specifically, the clamp module M7 is pneumatically driven, i.e., driven by working compressed air. The module M7 comprises an attachment plate 370, which is attached to the lower surface of the lower attachment plate of another module (or the attachment plate of the holder module M1). A frame member 372 integrally depends from the attaching plate 370 to surround it. More specifically, the frame member 372 is constituted by four frame pieces 372a to 372d corresponding to the four sides of the attaching plate 370. A guide rail 374 extending along the central axis of the attaching plate 370 is fixed to the lower surface of the attaching plate 370, as shown in FIGS. 72 and 74. A pair of slide blocks 376 and 378 are slidably guided along the guide rail 374 through slide guides 380 and 382. These slide guides 380 and 382 are supported by the guide rail 374 so as not be disengaged therefrom.

The slide blocks 376 and 378 are slidable between the pair of opposing frame pieces 372a and 372c in a space surrounded by the frame member 372 below the attaching plate 370, as shown in FIG. 74. More specifically, these slide blocks 376 and 378 are independently slidable between unclamp positions (i.e., maximum separate positions) where their outer surfaces contact the distal end faces of unclamp amount adjustment stopper bolts 384 and 386 attached to the corresponding frame pieces 372a and 372c, and clamp positions (i.e., maximum approach position) where their inner surfaces contact the distal end faces of clamp amount adjustment stopper bolts 388 and 390 attached to the opposite frame pieces 372c and 372a.

Note that the two unclamp amount adjustment stopper bolts 384 and 386 are independently retractably attached to the corresponding frames 372a and 372c. When these bolts project or retract, arbitrary unclamp positions (i.e., maximum separate amount) can be set. The distal ends of the two clamp amount adjustment stopper bolts 388 and 390 extend near the central portion of the clamp module via through holes 378a and 376a formed to extend through the opposing slide blocks 378 and 376. The two clamp amount adjustment stopper bolts 388 and 390 are independently retractably attached to the opposite frame pieces 372c and 372a. When these stopper bolts project or retract, the clamp positions (i.e., the minimum separate amount) can be arbitrarily set.

The first slide block 376 located at the left side in FIG. 78 is always biased to the unclamp position by a first coil spring 392, which has a proximal end portion wound around the outer circumferential surface of the clamp amount adjustment bolt 388, extends through the through hole 378a formed in the second slide block 378, and has a distal end locked with the inner surface. The second slide block 378 located at the right side in FIG. 78 is always biased to the unclamp position by a second coil spring 394, which has a proximal end portion wound around the outer circumferential surface of the corresponding clamp amount adjustment stopper bolt 390, extends through the through hole 376a formed in the first slide block 376, and has a distal end locked with the inner surface. More specifically, these slide blocks 376 and 378 are always elastically held in an unclamp state unless an external force acts thereon.

In order to move these slide blocks 376 and 378 to the clamp positions against the biasing forces of the corresponding coil springs 392 and 394, a movement driving mechanism 396 is arranged. In this embodiment, the movement driving mechanism 396 is constituted by air cylinder mechanisms 396a and 396b attached to the slide blocks 376 and 378. Since these air cylinder mechanisms 396a and 396b have the same arrangement, parts of the air cylinder mechanism 396a for driving the first slide block 376 will be representatively described while attaching "a" to their reference numerals. As for the air cylinder mechanism 396b for driving the second slide block 378, "b" will be attached to the reference numerals of the same parts as those of the air cylinder mechanism 396a, and a detailed description thereof will be omitted.

In this air cylinder mechanism 396a, a recess portion 398a having a circular section is formed in the outer surface of the first slide block 376 to have an extended axis precisely coinciding with the corresponding clamp amount adjustment stopper bolt 388. The distal end portion of a piston 400a is loosely fitted in the recess portion 398a through this opening portion. The proximal end portion of this piston 400a is fixed to the corresponding frame piece 372a. A cylinder body 402a formed of a thin steel plate, and having a closed distal end is slidably fitted on the outer circumferential surface of the distal end portion of the piston 400a in an air-tight state. The cylinder body 402a is fixed to the first slide block 376 by fixing its distal end to the end face of the recess portion 398a. As a result, the internal space of the cylinder body 402a, which space is located in front of the distal end face of the piston 400a, defines a cylinder chamber 404a.

A communication path 406a having one end communicating with the cylinder chamber 404a to supply compressed air is formed in the piston 400a. The other end of this communication path 406a is connected to an air port 408a attached to the proximal end portion, projecting outwardly from the corresponding frame piece 372a, of the piston 400a. The air ports 408a and 408b provided to the air cylinder mechanisms 396a and 396b are connected to the above-mentioned pneumatic source 82 through a second opening/closing valve 410 to be described later. When the second opening/closing valve 410 is set in a connection mode by the controller, it connects the pneumatic source 82 to the first and second cylinder chambers 404a and 404b through the first and second air ports 408a and 408b so as to supply compressed air to these cylinder chambers 404a and 404b. When the second opening/closing valve 410 is set in an open mode, it opens the first and second cylinder chambers 404a and 404b to the outer air through the first and second air ports 408a and 408b, thereby exhausting air from these cylinder chambers.

When the second opening/closing valve 410 is set in the connection mode, the first and second slide blocks 376 and 378 are moved from the unclamp positions to the clamp positions against the biasing forces of the corresponding coil springs 392 and 394. When the second opening/closing valve 410 is set in the open mode, the first and second slide blocks 376 and 378 are moved from the clamp positions to the unclamp positions by the biasing forces of the corresponding coil springs 392 and 394.

Jaws 412 and 414 for grabbing a work from both sides are respectively attached to the lower surfaces of these first and second slide blocks 376 and 378. Therefore, when the second opening/closing valve 410 is set in the connection mode, the gear member G as a work is grabbed by these jaws 412 and 414 from its both sides.

In this embodiment, the diameter of the cylinder chamber 404a in the first air cylinder mechanism 396a is set to be larger than that of the cylinder chamber 404b in the second air cylinder mechanism 396b. As a result, the movement driving force in the first air cylinder mechanism 396a is set to be larger than that in the second air cylinder mechanism 396b. For this reason, when a work is practically grabbed, the clamp position is defined in a state wherein the first slide block 376 moved with a larger driving force always contacts the clamp amount adjustment stopper bolt 388. In this manner, even when the placing position of a work is shifted from a predetermined position, the clamp position of the work clamped by the jaws 412 and 414 can always be set at a predetermined position with respect to the attaching plate 370.

As shown in FIGS. 75 and 78, first longitudinal attaching grooves 416 and 418 are formed in the lower end faces of the pair of opposing frame pieces 372b and 372d of the above-mentioned frame member 372. Second grooves 420 and 422, through which detection dogs 376b and 378b integrally attached to the opposing outer side surfaces of the slide blocks 376 and 378 are inserted, are respectively formed in the opposing inner side surfaces of these frame pieces 372b and 372d. The second groove 422 formed in the inner side surface of the frame piece 372d stores a ninth sensor 424, which is turned on by the corresponding detection dog 376b when the first slide block 376 is brought to the clamp position. The second groove 420 formed in the inner side surface of the frame piece 372b stores a tenth sensor 426, which is turned on by the corresponding detection dog 378b when the second slide block 378 is brought to the clamp position. These ninth and tenth sensors 424 and 426 comprise non-contact type proximity sensors, which are turned on when the corresponding dogs 376b and 378b approach them.

These ninth and tenth sensors 424 and 426 are connected to the above-mentioned controller, and output their detection results thereto. More specifically, assume that the controller sets the second opening/closing valve 410 in the connection mode to move the two slide blocks 376 and 378 from the unclamp positions to the clamp position. In this state, when neither of the ninth and tenth sensors 424 and 426 output ON signals after an elapse of a predetermined period of time, the controller determines an abnormal state wherein the two slide blocks 376 and 378 are stopped during movement operations, or do not execute movement operations, and executes an alarm operation. When both the ninth and tenth sensors 424 and 426 output ON signals within the predetermined period of time, the controller executes the subsequent control sequence.

On the other hand, assume that the controller sets the second opening/closing valve 410 in the open mode to move the two slide blocks 376 and 378 from the unclamp positions to the clamp positions. In this state, when the ninth and tenth sensors 424 and 426 keep outputting ON signals after an elapse of the predetermined period of time, the controller determines an abnormal state wherein the two slide blocks 376 and 378 are locked at the clamp positions, and executes an alarm operation. When the ninth and tenth sensors 424 and 426 stop outputting of ON signals within the predetermined period of time, the controller executes the subsequent control sequence.

Pairs of upper and lower attaching grooves 428a and 428b; and 430a and 430b, to which auxiliary units are attached as optional devices, as needed, is formed in the outer side surfaces of the above-mentioned frame pieces 372b and 372d to have a substantially T-shaped section. In this embodiment, as an auxiliary unit to be attached to the outer side surface of the frame piece 372b through the pair of upper and lower attaching grooves 428a and 428b, a sighting unit 440 for accurately detecting the position of the hand mechanism 10 relative to the gear placing surface S1 is prepared, and is detachably attached to the outer side surface of the frame piece 372b, as shown in FIG. 1. Since this sighting unit 440 does not define the characteristic features of the present invention at all, a detailed description thereof will be omitted. The sighting unit 440 comprises an eleventh sensor 442 for detecting a reference mark (not shown) formed on the placing surface S1. When the sighting unit 440 detects the reference mark through the eleventh sensor 442, the origin position of the hand mechanism 10 can be calibrated. In this embodiment, the eleventh sensor 442 comprises a photosensor, and more specifically, a reflection type photocoupler.

In the clamp module M7 with the above-mentioned arrangement, when the second opening/closing valve 410 is set in the connection mode, and compressed air is supplied into the first and second cylinder chambers through the first and second air ports 408a and 408b, the two jaws 412 and 414 are driven to approach each other, and clamp the flat surfaces G4 formed on the two sides of the first shaft portion G2 of the gear member G. When the second opening/closing valve 410 is set in the open mode, and compressed air is exhausted from the first and second cylinder chambers through the first and second air ports 408a and 408b, the two jaws 412 and 414 are driven to be separated from each other, and are set in an unclamp state.

Attaching screw holes 370a having the diameter $d_1$ are formed at the four corners of the attaching plate 370 to be separated at the predetermined arrangement pitch $D_1$. The diameter $d_1$ and the arrangement pitch $D_1$ are set to have values common to the above-mentioned six types of modules M1 to M6. A positioning hole 370b and a positioning groove 370c for receiving a pair of positioning pins which are formed on the bottom surface of each of the above-mentioned modules M1 to M6 to have the common diameter $d_2$ and to be separated at the common distance $D_2$ are formed at the central portions of the opposing two sides of the upper surface of the attaching plate 370.

Since the positioning hole 370b and the positioning groove 370c are set common to the modules M1 to M6, as described above, this clamp module M7 can be attached to the lower portion of any of the modules M1 to M6 in the same state.

For example, when this clamp module M7 is directly attached to the attaching plate 30 of the holder module M1, threaded portions formed on the lower ends of attachment screws (not shown) inserted from the above through the attachment through holes 30a of the attaching plate 30 are threadably engaged with the attaching screw holes 370a.

The clamp module M7 is not limited to the arrangement of the above-mentioned first embodiment, and various modifications thereof may be made within the scope of the invention.

For example, the clamp module may be arranged, as shown in FIGS. 79 to 85 as the second embodiment. More specifically, in the first embodiment described above, the unclamp positions of the first and second jaws 412 and 414 are set in the frame member 372, and hence, the maximum separate distance between the two jaws 412 and 414 is limited. Therefore, the size of a work to be clamped by these jaws must be smaller than the frame member 372. In contrast to this, in a clamp module M7b of the second embodiment, the size of a work to be clamped is not practically limited, and a work having an arbitrary size can be clamped.

The clamp module M7b of the second embodiment will be described below. The same reference numerals in the second embodiment denote the same parts as in the clamp module M7 of the first embodiment, and a detailed description thereof will be omitted.

More specifically, in the second embodiment, an attaching plate 450 of the clamp module M7b comprises an elongated planar member, which can be selectively attached at its central portion to each of other modules M1 to M6. First and second slide blocks 376 and 378 are independently arranged at the two ends of the elongated attaching plate 450. More specifically, the above-mentioned guide rail 374 is divided into a pair of guide rails 374a and 374b, and the first and second slide blocks 376 and 378 are separately and independently guided by these guide rails 374a and 374b. As for the first slide block 376, in the first embodiment, the corresponding clamp amount adjustment stopper bolt 388 is attached to the opposing frame piece 382c. However, in this embodiment, a first auxiliary attaching piece 452 for supporting the stopper bolt 388 is fixed to the lower surface of the attaching plate 450. On the other hand, as for the second slide block 378, in the first embodiment, the corresponding clamp amount adjustment stopper bolt 390 is attached to the opposing frame piece 382a. However, in this embodiment, a second auxiliary attaching piece 454 for supporting this stopper bolt 390 is fixed to the lower surface of the attaching plate 450.

In the first embodiment described above, the first and second slide blocks 376 and 378 are moved from the clamp positions to the unclamp positions on the basis of the biasing forces of the corresponding coil springs 392 and 394. However, in this embodiment, in order to drive the first slide block 376 from the clamp position to the unclamp position, a third air cylinder mechanism 396c having substantially the same arrangement as the second air cylinder mechanism 396b is attached to the first slide block 376. In order to drive the second slide block 378 from the clamp position to the unclamp position, a fourth air cylinder mechanism 396d having substantially the same arrangement as the first air cylinder mechanism 396a is attached to the second slide block 378.

In the second embodiment, since the first and second slide blocks 376 and 378 are reciprocally moved by pneumatic pressure, the first to fourth air cylinder mechanisms 396a to 396d are connected to the pneumatic source 82 through a fourth selector valve, although not shown. When the fourth selector valve is set in a first switching mode by the controller, it is switched to connect the first and second air cylinder mechanisms 396a and 396b to the pneumatic source 82, and to open the third and fourth air cylinder mechanisms 396c and 396d to the outer air. When the fourth selector valve is set in a second switching mode, it is switched to open the first and second air cylinder mechanisms 396a and 396b to the outer air, and to connect the third and fourth air cylinder mechanisms 396c and 396d to the pneumatic source 82.

Since the clamp module M7 of the second embodiment is arranged as described above, when the fourth selector valve is switched from the second switching mode to the first switching mode to supply compressed air to first and second cylinder chambers 404a and 404b through first and second air ports 348a and 348b, and to exhaust air from third and fourth cylinder chambers 404c and 404d through third and fourth air ports 348c and 348d, the first and second slide blocks 376 and 278 are moved from the unclamp positions toward the clamp positions, i.e., are driven to approach each other. When the fourth selector valve is switched from the first switching mode to the second switching mode to supply compressed air to the third and fourth cylinder chambers 404c and 404d through the third and fourth air ports 348c and 348d, and to exhaust air from the first and second cylinder chambers 404a and 404b through the first and second air ports 348a and 348b, the first and second slide blocks 376 and 378 are moved from the clamp positions to the unclamp positions, i.e., are driven to be separated from each other.

In this manner, since the first and second slide blocks 376 and 378 are driven between the unclamp and clamp positions by pneumatic control, eleventh and twelfth sensors 456 and 458 for respectively detecting the first and second slide blocks 376 and 378 brought to the corresponding unclamp positions are further arranged in addition to ninth and tenth sensors 424 and 426 for detecting the first and second slide blocks 376 and 378 brought to the corresponding clamp positions.

When the clamp module M7b of the second embodiment is arranged as described above, a work having an arbitrary size can be clamped.

In the second embodiment, as shown in FIG. 86, a compliance module M5b may be attached to the central portion of the lower surface of the attaching plate 450. The compliance module M5b has substantially the same arrangement as that of the above-mentioned compliance module M5, except that a pair of positioning pins 296a and 296b for positioning a work W to be clamped by the clamp module M7b project downward from the lower surface of the lower attaching plate 242 of the compliance module M5b. Positioning holes Wa and Wb for respectively receiving the pair of positioning pins 296a and 296b for positioning are formed in the upper surface of the work W.

In this arrangement, when the hand mechanism 10 is moved downward to clamp the work W through the clamp module M7b, the pins 296a and 296b are respectively inserted in the positioning holes Wa and Wb of the work W from the above. Even when the position of the work W is shifted in the horizontal plane, if the lock mechanism 246 is set in an unlock state, a compliance operation is passively executed, as shown in FIG. 87, and the two positioning pins 296a and 296b are respectively inserted in the corresponding positioning holes Wa and Wb. In this state, the center of the work W and the center of the compliance module M5b are shifted in the horizontal direction. Thereafter, when the lock mechanism 246 is locked, the center of the work W and the center of the compliance module M5b are aligned with each other, as shown in FIG. 88. As a result, the work W brought to the predetermined central position (i.e., the center of which is caused to coincide with that of the hand mechanism 10) is reliably clamped by the clamp module M7b.

The clamp module H7 is not limited to the arrangements of the above-mentioned first and second embodiments, and various modifications thereof may be made within the scope of the invention.

For example, the clamp module may be arranged, as shown in FIGS. 89 to 92 as the third embodiment. More specifically, in the second embodiment described above, the maximum separate distance between the two jaws 412 and 414 is prolonged to be able to clamp a work having an arbitrary size. However, it is difficult to clamp an elongated work at its two ends. In contrast to this, a clamp module M7c of the third embodiment can reliably clamp an elongated work.

The clamp module M7c of the third embodiment will be described below. The same reference numerals in the third embodiment denote the same parts as in the clamp modules M7 and M7b of the first and second embodiments, and a detailed description thereof will be omitted.

More specifically, the clamp module M7c of the third embodiment comprises an elongated base 460, which is selectively attached, at its central portion, to one of other modules M1 to M6. First and second clamp units 462 and 464, each of which has the same arrangement as that of the clamp module M7 of the first embodiment, are attached to the lower surface portions at the two ends of the elongated base 460, so that their attaching positions can be changed. The clamp directions of the first and second clamp units 462 and 464 (the extending direction of the guide rail 374) are set to be perpendicular to the longitudinal direction of the elongated base 460.

When the clamp module M7c is arranged, as described above, the two ends of an elongated work are clamped by the first and second clamp units 462 and 464. According to the third embodiment, an elongated work can be reliably clamped.

Description of Operation of Hand Mechanism 10 Comprising All Seven Types of Modules M1 to M7

Figure 93:
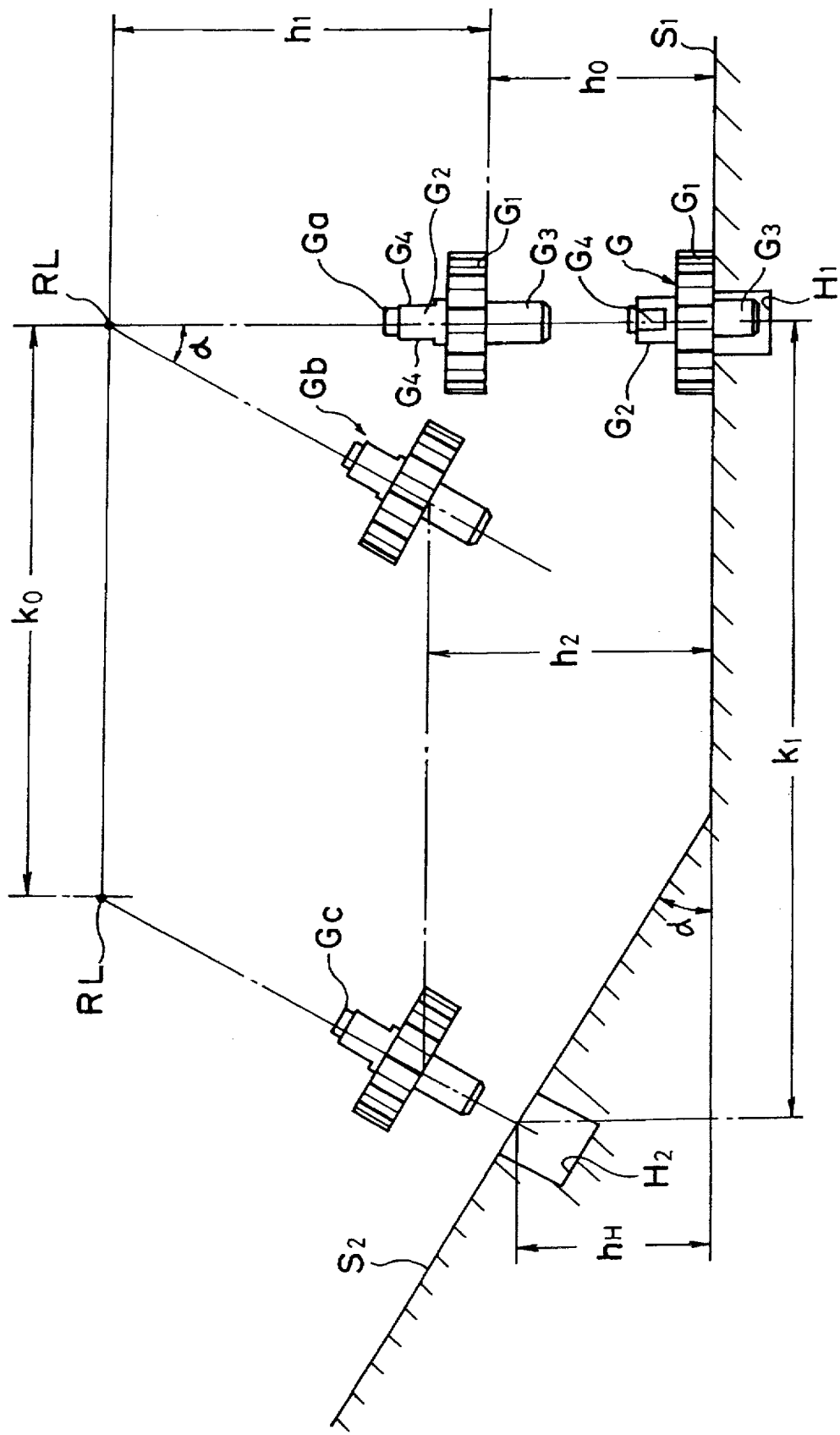
FIG. 93 is a view for explaining a pick-and-place operation of a gear by the hand mechanism of the embodiment shown in FIG. 1.
Figure 94:
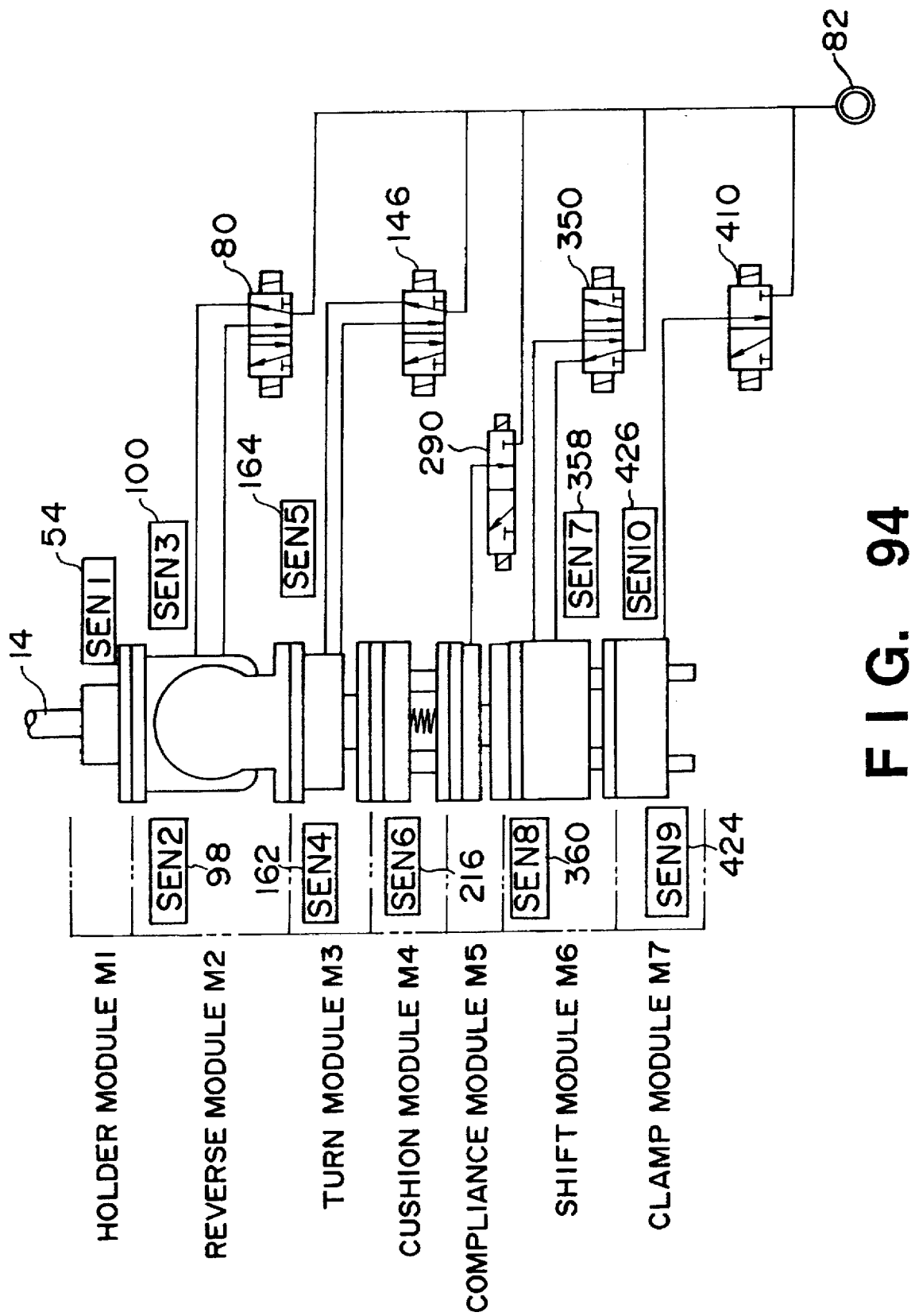
FIG. 94 is a view showing the connection state of sensors and valves provided to the hand mechanism of the embodiment shown in FIG. 1.
Figure 95:
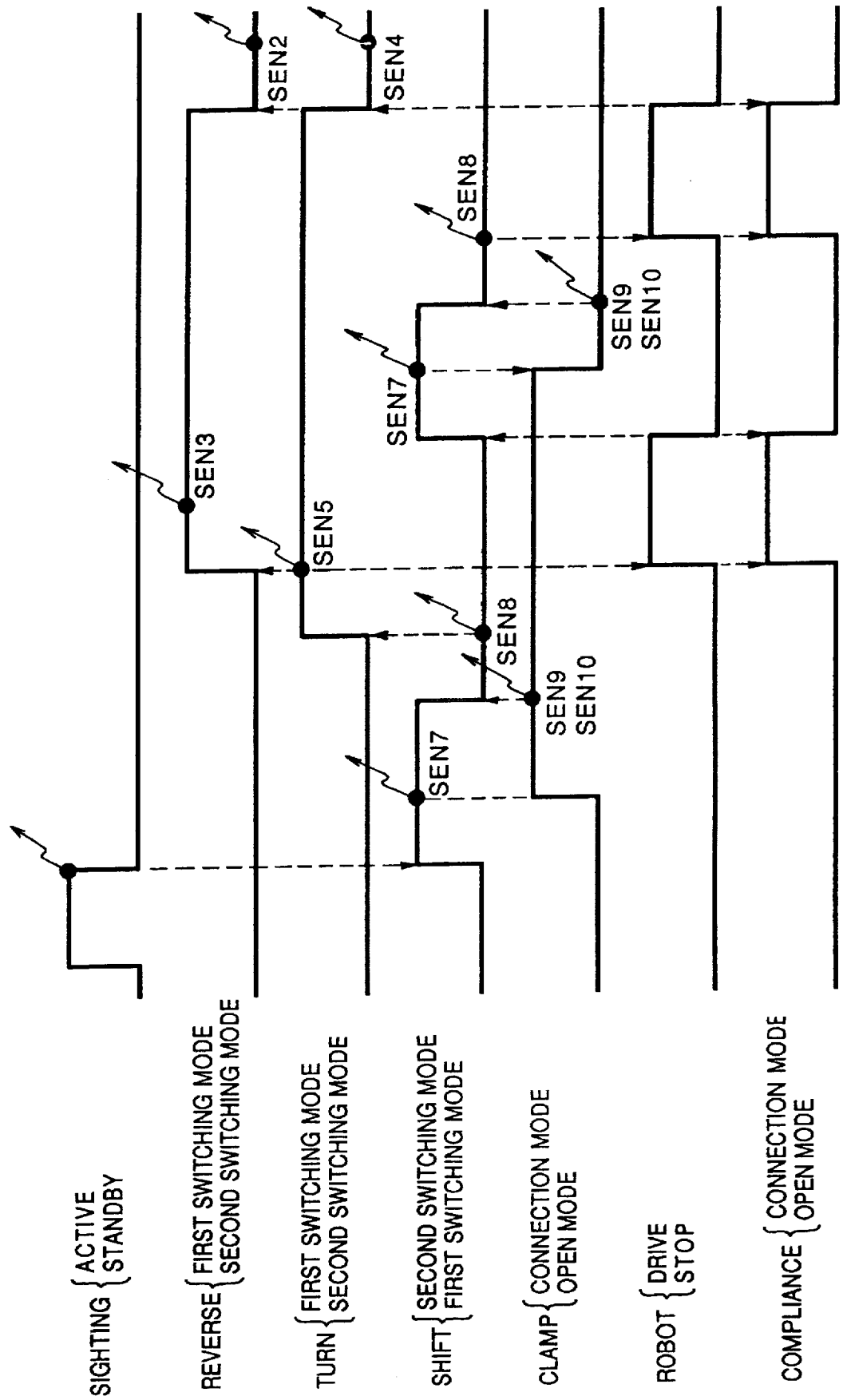
FIG. 95 is a timing chart for executing the pick-and-place operation by the hand mechanism of the embodiment shown in FIG. 1.

In the hand mechanism 10, operations for clamping the gear member G inserted and placed in the hole H1 formed in the horizontal surface portion S1 by the clamp module M7 attached to the lower portion of the hand mechanism 10, turning the gear member G through a predetermined angle (e.g., 90°) about its own central axis, and then, inserting the gear member G in the hole H2 formed in the inclined surface portion S2 inclined at a predetermined angle with respect to the horizontal surface portion, as shown in FIG. 6, will be described below with reference to FIGS. 93 to 95. In the hand mechanism 10 of this embodiment, the seven types of modules M1 to M7 are arranged downward from the z-axis arm 14 of the robot 12 in the above-mentioned order upon execution of the grabbing and insertion operations.

In FIG. 93, the inclined surface portion S2 is set to be inclined at an inclination angle (30° in this embodiment) with respect to the horizontal surface portion S1 like in the above-mentioned case illustrated in FIG. 6. FIG. 94 shows the connection states of the sensors and valves required in the operations of the hand mechanism 10. These sensors and valves have already been described in the descriptions of the modules M1 to M7. The first sensor 54 is attached to the holder module M1, and is turned on when the attaching plate 30 drops, and the coupling state with the fixing member 28 is released. The first selector valve 80 is connected to the reverse module M2. When the first selector valve 80 is set in the first switching mode, the pivot shaft 60 is pivoted from the standby position where the lower attaching plate 64 is parallel to the upper attaching plate 62 to the reverse position where the lower attaching plate is reversed about the rotational shaft RL through the angle. When the first selector valve 80 is set in the second switching mode, the pivot shaft 60 is pivoted from the reverse position to the standby position. The reverse module M2 is provided with the second sensor 98 for detecting if the lower attaching plate 64 is located at the standby position, and the third sensor 100 for detecting if the lower attaching plate 64 is located at the reverse position. The turn module M3 is connected to the second selector valve 146. When the second selector valve 146 is set in the first switching mode, the pivot support shaft 110 is pivoted from the standby position where the lower attaching plate 114 vertically coincides with the upper attaching plate 112 to the turn position where the lower attaching plate is turned through the angle about the central axis CL. When the second selector valve 146 is set in the second switching mode, the pivot support shaft 110 is pivoted from the turn position to the standby position. The turn module M3 is provided with the fourth sensor 162 for detecting if the lower attaching plate 114 is located at the standby position, and the fifth sensor 164 for detecting if the lower attaching plate 114 is located at the turn position.

The cushion module M4 is provided with the sixth sensor 216 for detecting if the lower attaching plate 182 approaches the upper attaching plate 180 up to an allowable cushion amount. Furthermore, the compliance module M5 is connected to the first opening/closing valve 290. When the first opening/closing valve 290 is set in the connection mode, the lock mechanism 246 is set in a lock state; when it is set in the open mode, the lock mechanism 246 is set in an unlock state. The shift module M6 is connected to the third selector valve 350. When the third selector valve 350 is set in the first switching mode, the lower attaching plate 302 is driven to approach the upper attaching plate 300; when it is set in the second switching mode, the lower attaching plate 302 is driven to be separated from the upper attaching plate 300. The shift module M6 is provided with the seventh sensor 358 for detecting if the lower attaching plate 302 is located at its downward end position, and the eighth sensor 360 for detecting if the lower attaching plate 302 is located at its upward end position. Finally, the clamp module M7 is connected to the second opening/closing valve 410. When the second opening/closing valve 410 is set in the connection mode, the two jaws 412 and 414 are driven to approach each other so as to clamp a work (gear member G); when it is set in the open mode, the jaws 412 and 414 are driven to be separated from each other so as to unclamp the work (gear member G). The clamp module M7 is provided with the ninth and tenth sensors 424 and 426 for detecting if the two jaws 412 and 414 are set in a clamp state.

The pick-and-place operations of the part (gear G) by the hand mechanism 10 with the above arrangement will be described below with reference to the timing chart shown in FIG. 95.

In a state wherein the central axes of the modules M1 to M7 coincide with the extended axis of the z-axis arm 14, i.e., the vertical axis, as shown in FIG. 1, the z-axis arm 14 is moved in the horizontal plane portion (i.e., in the x-y plane) to a position where the extended axis of the z-axis arm 14 coincides with the central axis of the gear member G, as shown in FIG. 93. Thereafter, the z-axis arm 14 is moved downward to a height $h_0$ where the gear member G can be clamped by the clamp module M7 through the shift module M6. From this state, the operations of the modules M1 to M7 in the hand mechanism 10 are started.

It is checked through the sighting unit 440 attached to the clamp module M7 if the hand mechanism 10 has a relative positional relationship with the reference point on the horizontal surface portion S1. If it cannot be determined within a predetermined period of time that the hand mechanism 10 has the relative positional relationship, the sighting unit 440 outputs an NG signal to the controller, and the subsequent control sequence is stopped. If it is determined within the predetermined period of time that the hand mechanism 10 has the relative positional relationship, an OK signal is output, and the shift operation of the shift module M6 is started. More specifically, the third selector valve 350 in the shift module M5 is switched from the first switching mode to the second switching mode. As a result, the shift operation for moving the lower attaching plate 302 downward from the upper attaching plate 300 is started. Upon execution of this shift operation, the clamp module M7 is brought to a state wherein it can clamp the gear member G. More specifically, the two jaws 412 and 414 of the clamp module M7 are located at the two sides of the pair of opposing flat portions G4 formed on the first shaft portion G2 of the gear member G.

If the seventh sensor 358 does not output an ON signal within a predetermined period of time from when the third selector valve 350 is switched to the first switching mode, an abnormal state is determined, the subsequent control sequence is stopped, and an alarm is generated. On the other hand, when the seventh sensor 358 outputs an ON signal within the predetermined period of time, since it is detected that the lower attaching plate 302 is moved downward to its downward end position, the clamp module M7 starts the clamp operation in response to the ON signal. More specifically, the second opening/closing valve 410 in the clamp module M7 is switched from the open mode to the connection mode. As a result, the two jaws 412 and 414 grab the flat portions G4 of the gear member G from both sides.

When neither of the ninth and tenth sensors 424 and 426 of the clamp module M7 output ON signals within a predetermined period of time from when the connection mode is set, an abnormal state is determined, the subsequent control sequence is stopped, and an alarm is generated. On the other hand, when both the ninth and tenth sensors 424 and 426 output the ON signals within the predetermined period of time, it is determined that the gear member G is clamped by the two jaws 412 and 414. The shift module M6 then starts a pull-up operation.

More specifically, in the shift module M6, in response to the ON signals from the two sensors 424 and 426, the third selector valve 350 is switched from the second switching mode to the first switching mode. As a result, the pull-up operation for moving the lower attaching plate 302 toward the upper attaching plate 300 is started, and upon execution of this pull-up operation, the clamp module M7 is moved upward while clamping the gear member G, thus lifting up the gear member G to a position denoted by reference symbol Ga. In the shift module M6, when the eighth sensor 360 does not output an ON signal within a predetermined period of time from when the third selector valve 350 is switched to the first switching mode, an abnormal state is determined, the subsequent control sequence is stopped, and an alarm is generated. On the other hand, when the eighth sensor 360 outputs the ON signal within the predetermined period of time, it is determined that the predetermined shift operation is completed. Then, the turn module M3 starts the turn operation.

More specifically, in this turn module M3, the second selector valve 146 is switched from the second switching mode to the first switching mode in response to the ON signal output from the eighth sensor 360. As a result, the lower attaching plate 114 is turned about the central axis through the predetermined angle, i.e., 90° with respect to the upper attaching plate 112. In the turn module M3, when the fifth sensor 164 does not output an ON signal within a predetermined period of time from when the second selector valve 146 is set in the first switching mode, an abnormal state is determined, the subsequent control sequence is stopped, and an alarm is generated. On the other hand, when the fifth sensor 164 outputs the ON signal within the predetermined period of time, it is determined that the predetermined turn operation is completed. Then, the reverse module M2 starts the reverse operation.

More specifically, in the reverse module M2, the first selector valve 80 is switched from the second switching mode to the first switching mode in response to the ON signal output from the fifth sensor 164. As a result, the lower attaching plate 64 is reversed about the pivot shaft 60 through the predetermined angle, i.e., 45° with respect to the upper attaching plate 62. In the reverse module M2, when the third sensor 100 does not output an ON signal within a predetermined period of time from when the first selector valve 80 is set in the first switching mode, an abnormal state is determined, the subsequent control sequence is stopped, and an alarm is generated. On the other hand, when the third sensor 100 outputs the ON signal within the predetermined period of time, it is determined that the predetermined reverse operation is completed, and the following control sequence is executed.

In response to the ON signal output from the above-mentioned fifth sensor 164, parallel to the above-mentioned reverse operation, the robot 12 moves the z-axis arm by a predetermined distance $k_0$ along the y-axis to locate the gear member G immediately above the hole H2 with respect to the inclined surface S2 (i.e., the centers of the hole H2 and the gear member G are aligned with each other), as indicated by reference symbol Gc. The predetermined distance $k_0$ is calculated by the following equation:

$$k_0 = k_1 - (h_1 + h_0 - h_H)\tan$$

where $k_1$: the distance between the central point of the gear member G at the setup position and the central point of the hole H2 on the horizontal surface portion S1

$h_1$: the distance between the central axis of the pivot shaft 60 and the bottom surface of the gear main body G1 of the grabbed gear member G During movement of the z-axis arm 14 of the robot 12, the first opening/closing valve 290 in the compliance module M5 is switched from the open mode to the connection mode, and the lock mechanism 246 executes the lock operation. As a result, during movement of the z-axis arm 14, the alignment operation of the compliance module M5 is inhibited.

As described above, in a state wherein the gear member G and the hole H2 are aligned with each other, the movement of the z-axis arm 14 is stopped, and a stop signal is output. In response to the output stop signal, the first opening/closing valve 290 in the compliance module M5 is switched from the connection mode to the open mode to inhibit the lock operation of the lock mechanism 246, and to restart the alignment operation in the compliance module M5. In addition, the shift module M6 starts the shift operation. More specifically, the third selector valve 350 of the shift module M6 is switched from the first switching mode to the second switching mode again. As a result, the shift operation for moving the lower attaching plate 302 downward from the upper attaching plate 300 is started. Upon execution of this shift operation, the clamp module M7 inserts the clamped gear member G into the hole H2.

When the shift module M6 is enabled, the clamp module M7 is pushed downward along the central axis of the shift module M6 (in other words,. along the axis inclined by the inclination angle from the vertical axis), and the gear member G is inserted in the corresponding hole H2. In this insertion operation, as described above, the compliance module M5 passively executes the automatic alignment operation, and the cushion module M4 passively executes a shock absorbing operation upon interference.

In the shift module M6, when the seventh sensor 358 does not output an ON signal within a predetermined period of time from when the third selector valve 350 is switched to the first switching mode, an abnormal state is determined, the subsequent control sequence is stopped, and an alarm is generated. On the other hand, when the seventh sensor 358 outputs the ON signal within the predetermined period of time, since it is detected that the lower attaching plate 302 is moved downward to its downward end position, the clamp module M7 starts the unclamp operation in response to the output ON signal. More specifically, the second opening/closing valve 410 of the clamp module M7 is switched from the connection mode to the open mode. As a result, the two jaws 412 and 414 are separated from the flat portions G4 of the gear member G to both sides, and the gear member G is unclamped from the clamp module M7.

When the ninth and tenth sensors 424 and 426 of the clamp module M7 keep outputting ON signals even after an elapse of a predetermined period of time from when the open mode is set, an abnormal state is determined, the subsequent control sequence is stopped, and an alarm is generated. When both the ninth and tenth sensors 424 and 426 stop outputting of the ON signals within the predetermined period of time, it is determined that the gear member G is separated, i.e., unclamped from the two jaws 412 and 414. The shift module M6 then starts the pull-up operation again.

More specifically, in the shift module M6, when the ON signals from the two sensors 424 and 426 are stopped, the third selector valve 350 is switched from the second switching mode to the first switching mode. As a result, the pull-up operation for moving the lower attaching plate 302 upward to the upper attaching plate 300 is started. With this pull-up operation, the clamp module M7 is moved upward while unclamping the gear member G, and the gear member G is left in the hole H2. In the shift module M6, when the eighth sensor 360 does not output an ON signal within a predetermined period of time from when the third selector valve 350 is switched to the first switching mode, an abnormal state is determined, the subsequent control sequence is stopped, and an alarm is generated. On the other hand, when the eighth sensor 360 outputs the ON signal within the predetermined period of time, it is determined that the predetermined shift operation is completed, and a predetermined standby state is set.

The robot 12 then executes an operation for moving the z-axis arm 14 by the predetermined distance $k_0$ along the y-axis, and returning it to an original position. In this movement operation of the z-axis arm 14, the first opening/closing valve 290 in the compliance module M5 is switched from the open mode to the connection mode in the same manner as in the above-mentioned movement operation, and the lock mechanism 246 executes the lock operation. As a result, during movement of the z-axis arm 14, the alignment operation in the compliance module M5 is inhibited.

Upon completion of the return movement of the z-axis arm 14 by the robot 12, a return movement end signal is output. In response to the output return movement end signal, the reverse module M2 and the turn module M3 start the return operation to the standby position. More specifically, in the reverse module M2, the first selector valve 80 is switched from the first switching mode to the second switching mode in response to the output return movement end signal. As a result, the lower attaching plate 64 is pivoted about the pivot shaft 60 through the predetermined angle, i.e., 45° with respect to the upper attaching plate 62. In the reverse module M2, when the second sensor 98 does not output an ON signal within a predetermined period of time from when the first selector valve 80 is switched to the second switching mode, an abnormal state is determined, the subsequent control sequence is stopped, and an alarm is generated. On the other hand, when the second sensor 98 outputs the ON signal within the predetermined period of time, it is determined that the predetermined return operation is completed, thus setting a predetermined standby state.

On the other hand, in the turn module M3, the second selector valve 146 is switched from the first switching mode to the second switching mode in response to the output return movement end signal. As a result, the lower attaching plate 114 is pivoted about the central axis through the predetermined angle, i.e., 90° with respect to the upper attaching plate 112. In the turn module M3, when the fourth sensor 162 does not output an ON signal within a predetermined period of time from when the second selector valve 146 is switched to the second switching mode, an abnormal state is determined, the subsequent control sequence is stopped, and an alarm is generated. On the other hand, when the fourth sensor 162 outputs the ON signal within the predetermined period of time, it is determined that the predetermined turn operation is completed, and a predetermined standby state is set.

In the entire range of the above-mentioned control sequence, when the first sensor 54 of the holder module M1 outputs an ON signal, and it is determined that the attaching plate 30 drops, and the coupling state with the fixing member 28 is released, the control sequence is immediately stopped irrespective of which control step is currently executed, and an alarm operation is executed. During execution of the shift operation in the shift module M6, when the sixth sensor 216 of the cushion module M4 outputs an ON signal, and it is determined that the lower attaching plate 182 approaches the upper attaching plate 180 up to an allowable cushion amount, the control sequence of the shift operation is immediately stopped, and an alarm is generated.

In this embodiment, when the gear member G is to be inserted in the hole H2 formed in the inclined surface portion along the axis different from the setup state, the robot 12 need only perform independent movement operations in the x-, y-, and z-axis directions, and the downward movement operation for clamping the gear member G, and the insertion operation along the inclined axis are directly achieved by driving the shift module M6.

If no shift module M6 is equipped, the robot 12 must execute control for simultaneously moving the clamp module M7 in the y- and z-axis directions while accurately regulating the moving speeds in these directions in a state wherein the gear member G is held in an inclined posture, as described above, resulting in a complicated control content. However, in this embodiment, since the hand mechanism 10 comprises the shift module M6, the robot 12 need only perform independent movement operations in the x-, y-, and z-axis directions, and need not directly execute the insertion operation. For this reason, the control content of the robot 12 can be simplified.

In particular, in the hand mechanism 10 of this embodiment, the posture conversion operation of the clamp module M7 is realized as modules in units of elementary motions, and is independently executed in units of modules. As a result, when the product or design is to be changed, and the posture conversion operation of the clamp module M7 must be changed, the moving amount, design, and the like of a module corresponding to the posture conversion element to be changed need only be changed, and the design of the overall hand mechanism need not be changed. In this manner, the posture conversion operation can be changed within a short period of time, and modules which need not be changed can be utilized without modifications, thus providing the hand mechanism 10 having high economic advantages.

Description of Optimal Arrangement Order of Seven Types of Modules M1 to M7

The optimal arrangement order of the seven types of modules M1 to M7 upon execution of the above-mentioned operation in the hand mechanism 10 will be described below. More specifically, in order to attach one of the modules M2 to M7 to the z-axis arm 14, it is indispensable to arrange the holder module M1 at the uppermost position, and in order to clamp the gear member G, it is indispensable to arrange the clamp module M7 at the lowermost position.

For this reason, when the five types of modules M2 to M6 arranged between the modules M1 and M7 are considered as one group, the question is the arrangement order from the holder module M1 to the clamp module M7.

The first condition is to arrange the reverse module M2 at a position closest to the attaching plate 30 in this group. In other words, other modules M3, M4, M5, and M6 are located nearer the clamp module M7 than the module M2. The second condition is to arrange the shift module M6 and the turn module M3 nearer the holder module M1 than the cushion module M4 and the compliance module M5. The third condition is that the order of the shift module M6 and the turn module M3 is replaceable, and the order of the cushion module M4 and the compliance module M5 is replaceable.

As a result, in this embodiment, the modules are arranged from the holder module M1 toward the clamp module M7 in the order of:

(1) M1 M2 M3 M6 M5 M4 M7

However, the present invention is not limited to this. For example, the following three arrangement orders are suitable upon execution of the above-mentioned insertion operation:

(2) M1 M2 M3 M6 M4 M5 M7
(3) M1 M2 M6 M3 M5 M4 M7
(4) M1 M2 M6 M3 M4 M5 M7

More specifically, when the shift module M6 is arranged on the side of the holder module M1 while ignoring the first condition in that the shift module M6 must be located nearer the clamp module M7 than the reverse module M2, the shift direction (movement direction) achieved by this shift module M6 is limited to the vertical axis direction, and it is impossible for this shift module M6 to execute the operation for inverting a pin into a hole formed in the inclined surface portion S2. In this manner, it is indispensable to locate the shift module M6 nearer the clamp module M7 than the reverse module M2.

When the turn module M3 is arranged at the side of the holder module M1 while ignoring the first condition in that the turn module M3 must be located nearer the clamp module M7 than the reverse module M2, the pivot shaft 60 of the reverse module M2 is turned, and extends along the y-axis upon execution of the turn operation of the turn module M3. As a result, in the reverse operation executed after the turn operation, the gear member G grabbed by the clamp module M7 is pivoted about the y-axis, and can never oppose the hole H2. In this manner, it is indispensable to locate the turn module M3 nearer the clamp module M7 than the reverse module M2.

When the shift module M6 and the turn module M3 are located on the side of the clamp module M7 while ignoring the second condition in that the shift module M6 and the turn module M3 must be located nearer the holder module M1 than the cushion module M4, if a shift in position along a direction perpendicular to the inclined surface portion S2 occurs between a pin P and a hole H, a shock caused by interference based on this shift in position directly acts on the shift module M6 or the turn module M3 before it is absorbed by the cushion module M4. For this reason, in order to protect the shift module M6 and the turn module M3 from the shock caused by interference, it is indispensable to locate these modules nearer the holder module M1 than the cushion module M4.

When the shift module M6 and the turn module M3 are located on the side of the clamp module M7 while ignoring the second condition in that the shift module M6 and the turn module M3 must be located nearer the holder module M1 than the compliance module M5, if a shift in position along the inclined surface portion S2 occurs between the pin P and the hole H, a partial force $F_0$ based on this shift in position directly acts on the shift module M6 or the turn module M3 before it is compensated for by the compliance module M5. For this reason, in order to protect the shift module M6 and the turn module M3 from the partial force $F_0$ caused by the shift in position, it is indispensable to locate these modules nearer the holder module M1 than the compliance module M5.

As for the replaceability of the arrangement order of the shift module M6 and the turn module M3 as the third condition, the shift direction of the shift module M6 is regulated to a direction along its own central axis, and the turn axis of the turn module M3 is regulated to a direction along its own central axis. For this reason, even when the arrangement order of these modules is replaced, no problem is posed.

As for the replaceability of the arrangement order of the cushion module M4 and the compliance module M4 as the third condition, since these modules passively operate, no priority can be assigned to these modules, and even when the arrangement order of these modules is replaced, the same state can only be achieved.

The present invention is not limited to the arrangement of the above embodiment, and various modifications may be made without departing from the scope of the invention.

For example, in the above embodiment, the hand mechanism 10 comprises all seven types of modules M1 to M7. However, this arrangement is necessary for executing operations for temporarily grabbing the gear member G placed on the horizontal surface portion S1 by the clamp module M7 attached to the lower portion of the hand mechanism 10, and inserting it into the hole H2 formed on the inclined surface portion S2. Thus, the present invention is not limited to such an arrangement. For example, when another operation is to be executed, operation elements necessary for realizing the posture conversion operation of the clamp module M7 need only be achieved by arbitrarily combining these five types of modules M2 to M6.

In the above embodiment, when the seven types of modules M1 to M7 are considered as one group, the hand mechanism 10 is constituted by only the group of modules M1 to M7. However, the present invention is not limited to this arrangement. For example, another turn module M3 may be arranged nearer the holder module M1 than the group of modules. When another turn module M3 is arranged in this manner, the robot 12 need not adopt an arrangement for turning the z-axis arm 14 about its own central axis (i.e., the vertical axis), and the arrangement of the overall robot 12 can be simplified.

As described above, in this embodiment, the holder module M1 can be assembled with an arbitrary one of other modules M2 to M7 at its lower portion. The reverse module M2, the turn module M3, the cushion module M4, the compliance module M5, and the shift module M6 can be assembled with arbitrary modules at their upper and lower portions. The clamp module M7 can be assembled to the most distal end position in any combination of modules. In other words, the clamp module M7 can be assembled with any one of other modules M1 to M6 at its upper portion. In any combination, the positions between modules to be assembled with each other can be accurately defined through the pair of positioning pins, and the positioning groove and the position hole for receiving these pins.

For example, the holder module M1 comprises the pair of positioning pins 30b on its lower surface, and when these pins are inserted in the positioning groove and the position hole formed in the upper surface of another module, the two modules can be accurately positioned.

The reverse module M2 is formed with the positioning hole 62b and the positioning groove 62c on its upper surface, and the pair of positioning pins 64b on its lower surface. Therefore, when another module is attached to the upper portion of the reverse module M2, the pair of positioning pins formed on the lower surface of the other module are respectively inserted in the positioning hole 62b and the positioning groove 62c, and the two modules can be accurately positioned. When another module is attached to the lower portion of the reverse module M2, the pair of positioning pins 64b are respectively inserted in the positioning hole and the positioning groove formed in the upper surface of the other module, and the two modules can be accurately positioned.

Note that from the turn module M3 to the shift module M6, positioning with another module to be attached to their upper or lower portions is executed in the same manner as in the reverse module M2.

In the clamp module M7, the positioning hole 370b and the positioning groove 370c are formed in its upper surface. When the positioning pins attached to the lower surface of another module are inserted in the positioning hole and the positioning groove, the two modules can be accurately positioned.

In this manner, since the arbitrarily combined modules are accurately positioned with each other, the central axis of the z-axis arm 14 can be accurately aligned with the central axis of a work clamped by the clamp module M7. As a result, even when the turn module M3 is driven to turn the work about the central axis of the turn module M3, the work is turned about its own central axis, thus executing the assembling operation of the work. Even when the reverse module M2 is driven to rotate the work about the reverse axis of the reverse module M2, the work is rotated about the reverse axis while maintaining the parallel or orthogonal relationship between the clamp axis of the clamped work and the reverse axis, thus executing the assembling operation of the work.

Figure 96:
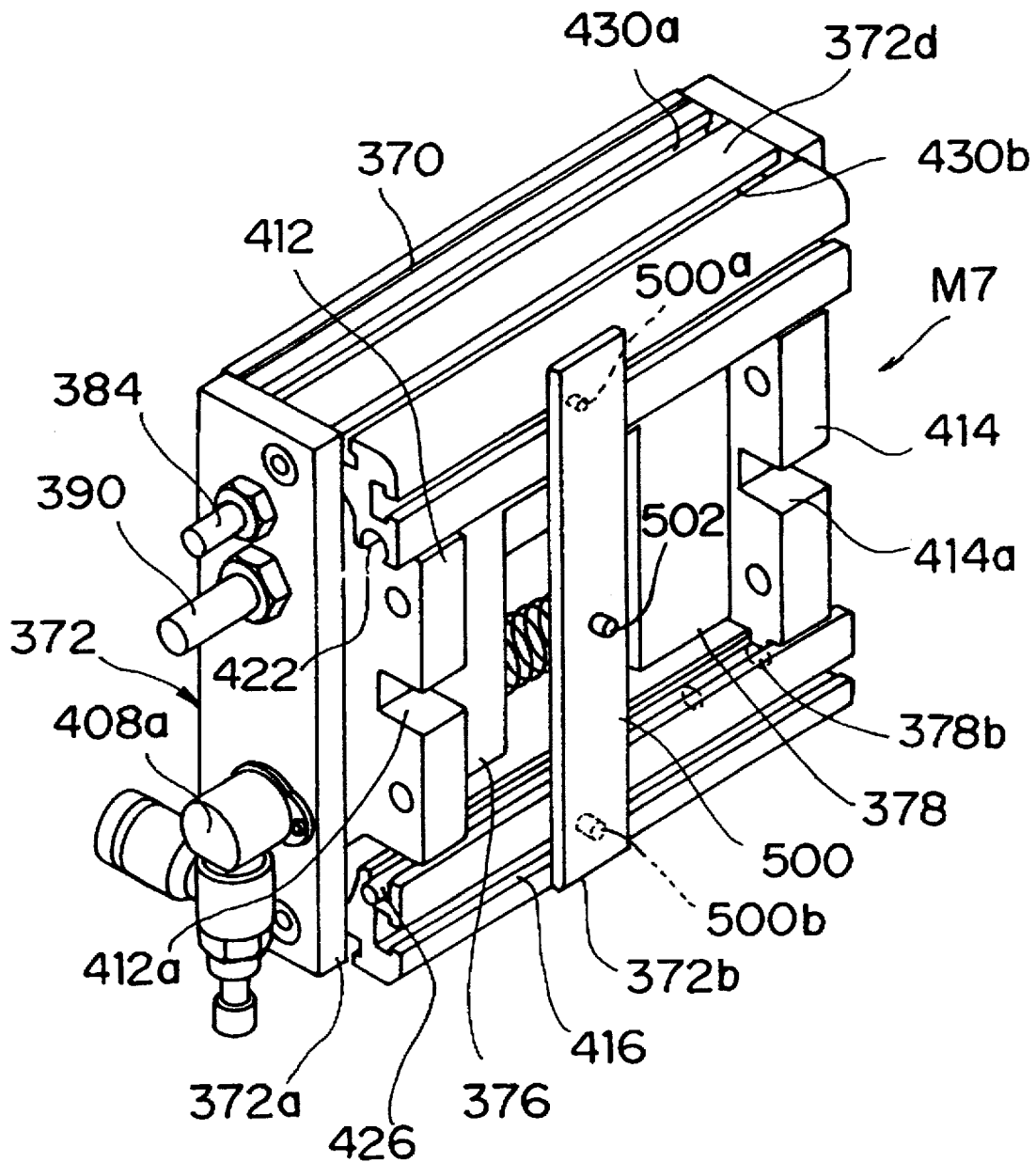
FIG. 96 is a bottom view showing a state wherein a positioning plate for positioning a work is attached to the lower surface of an attaching plate of the clamping module.

In order to guarantee alignment between the central axis of the clamp module M7 and the central axis of the work clamped by the clamp module M7, in this embodiment, the positioning hole 370b and the positioning groove 370c are formed to be open to the lower surface of the attaching plate 370, as shown in FIG. 74. As shown in FIG. 96, the module M7 comprises a positioning plate 500, having, on its upper surface, positioning pins 500a to be fitted in the positioning hole 370b and the positioning groove 370c from below, for defining a position relative to the clamp module M7 via fitting between these positioning pins 500a, and the positioning hole 370b and the positioning groove 370c. A work positioning pin 502 positioned to be aligned with the central axis of the clamp module M7 is attached to the lower surface of the positioning plate 500. In this manner, when this work positioning pin 502 is inserted in a positioning hole formed in the work, the central axis of the work to be clamped, and the central axis of the clamp module M7 can be accurately aligned with each other.

In order to guarantee alignment between the central axis of the clamp module M7 and the central axis of the work clamped by the clamp module M7, the present invention is not limited to the above arrangement. For example, the two jaws 412 and 414 for clamping a work may be positioned, so that the central axis of the work is aligned with the central axis of the clamp module M7 in a clamp state.

Examination of Combination of Robot 12 and Modules

A work assembling operation is to convert a state 1 ($x_1$, $y_1$, $z_1$; $A_1$, $B_1$) of a work to a state 2 ($x_2$, $y_2$, $z_2$; $A_2$, $B_2$), in other words, to pick up a work in the state 1, and to place it in the state 2. (x, y, z) represents the coordinate position of a work on the orthogonal coordinate system, A represents a work placement vector indicating a placement direction of a work, and B represents a work reference vector indicating a reference direction of a work, e.g., an extended direction of the central axis. More specifically, when (x, y, z; A, B) are defined, the position and posture of the work are uniquely determined. As a result, in order to convert the state 1 ($x_1$, $y_1$, $z_1$; $A_1$, $B_1$) of the work to the state 2 ($x_2$, $y_2$, $z_2$; $A_2$, $B_2$), movements along the x-, y-, and z-axis directions, and a posture conversion operation are required. The posture conversion operation requires a turn operation+reverse operation+turn operation. In other words, upon execution of a turn operation+reverse operation+turn operation, an arbitrary posture of a work can be converted to another arbitrary posture.

When the robot 12 is a so-called NC robot, the following four robots may be proposed:

| X-operation+Y-operation+Z-operation+turn operation+reverse operation+turn operation | R1 |
| X-operation+Y-operation+Z-operation+turn operation+reverse operation | R2 |
| X-operation+Y-operation+Z-operation+turn operation | R3 |
| X-operation+Y-operation+Z-operation | R4 |

The X-operation indicates that a movement operation along the x-axis direction is possible; the Y-operation indicates that a movement operation along the y-axis direction is possible; and the Z-operation indicates that a movement operation along the z-axis direction is possible.

When the robot 12 is an air-driven auto hand, the following one robot may be proposed:

| X-operation+Z-operation | R5 |

More specifically, when combinations of the reverse module M2 and the turn module M3 are examined under an assumption that the clamp module M7 for grabbing a work is indispensable for a total of five robots (R1 to R5), arbitrary state conversion operations can be realized.

Table 1 summarizes the examination results.

TABLE 1

| Module | Robot | | | | |
|---|---|---|---|---|---|
| | R1 | R2 | R3 | R4 | R5 |
| Turn M3 + Reverse M2 + Turn M3 | X | X | X | O | O |
| Turn M3 + Reverse M2 | X | X | X | O | O |
| Turn M3 +              Turn M3 | X | X | X | O | O |
|        Reverse M2 + Turn M3 | X | X | O | O | O |
| Turn M3 | X | O | O | O | O |
|        Reverse M2 | X | X | O | O | O |

Symbol O indicates that attachment of the modules (group) described in the left column is necessary for the corresponding robot or the auto hand, and symbol X indicates that attachment is unnecessary. For example, as for a robot 12, which can perform X-operation+Y-operation+Z-operation+turn operation, although combinations of turn M3+reverse M2+turn M3, turn M3 reverse M2, and turn M3+turn M3 are unnecessary, the posture conversion operation can be performed by assembling a combination of reverse M2+turn M3, or turn M3 or reverse M2 alone.

Effect of Positioning

The effect obtained by arranging the positioning mechanism comprising the positioning pins, the positioning groove, and the positioning hole to the combination of the reverse module M2 and/or turn module M3 will be described in detail below in units of combinations.

M1+M2+M7

A combination in which the reverse module M2 is attached to the lower portion of the holder module M1, and the clamp module M7 is attached to the lower portion of the reverse module M2 will be described below.

Since the positioning mechanism is interposed between the holder module M1 and the reverse module M2, the reverse axis RL of the reverse module M2 is positioned to be parallel to the x-axis while crossing the z-axis as the central axis of the holder module M1. As a result, after a work which is placed on a pickup surface perpendicular to the z-axis to have the longitudinal axis parallel to the y-axis is picked up by the clamp module M7, the work is reversed by the reverse module M2, and can be placed on a place surface perpendicular to the pickup surface to be parallel to the y-axis.

If no positioning mechanism is arranged between the holder module M1 and the reverse module M2, the parallel state between the reverse axis RL of the reverse module M2 and the x-axis, and the orthogonal state between the reverse axis RL and the z-axis cannot be guaranteed. As a result, when a work which is placed on the pickup surface perpendicular to the z-axis to have the longitudinal axis parallel to the y-axis is picked up by the clamp module M7, and is then reversed by the reverse module M2, the work is placed on the place surface perpendicular to the pickup surface in a non-parallel state to the y-axis.

In this case, when the robot 12 is arranged to have a degree of freedom in a θ direction, or is arranged to have an angle adjustment mechanism in the θ direction, the angle in the θ direction is adjusted to maintain the parallel state between the reverse axis RL of the reverse module M2 and the x-axis, and the orthogonal state between the reverse axis RL and the z-axis. For this reason, the positioning mechanism between the holder module M1 and the reverse module M2 can be omitted.

On the other hand, since the positioning mechanism is interposed between the reverse module M2 and the clamp module M7, the reverse axis RL of the reverse module M2 can be accurately positioned to be parallel to or perpendicular to the moving axis of the two jaws 412 and 414 of the clamp module M7. As a result, after a work placed on the pickup surface perpendicular to the z-axis to have the longitudinal axis perpendicular to the moving axis of the two jaws 412 and 414 is picked up by the clamp module M7, the work is reversed through 90° by the reverse module M2, and can be placed on a place surface parallel to the pickup surface in an upright state.

If no positioning mechanism is arranged between the reverse module M2 and the clamp module M7, the orthogonal or parallel state between the reverse axis RL of the reverse module M2 and the moving axis of the two jaws 412 and 414 of the clamp module M7 cannot be guaranteed. As a result, in order to pick up a work placed on the pickup surface perpendicular to the z-axis to have the longitudinal axis perpendicular to the moving axis of the two jaws 412 and 414 by the clamp module M7, the moving axis of the two jaws 412 and 414 of the clamp module M7 must be adjusted to be perpendicular to the longitudinal axis of the work.

In this case, the clamp module M7 is directly attached to the lower portion of the reverse module M2, and no turn module M3 is arranged. For this reason, it is impossible to adjust the reverse axis RL of the reverse module M2 and the moving axis of the two jaws 412 and 414 of the clamp module M7 to be perpendicular to or parallel to each other. Therefore, in this embodiment, the positioning mechanism is required between the reverse module M2 and the clamp module M7.

M1+M3+M7

A combination in which the turn module M3 is attached to the lower portion of the holder module M1, and the clamp module M7 is attached to the lower portion of the turn module M3 will be described below.

Since the positioning mechanism is interposed between the holder module M1 and the turn module M3, the z-axis as the central axis of the holder module M1 can be accurately aligned with the central axis as the turn axis of the turn module M3. Since the positioning mechanism is interposed between the turn module M3 and the clamp module M7, the central axis as the turn axis of the turn module M3 can be accurately aligned with the central axis of the clamp module M7. As a result, when a work which is placed (stands upright) on the pickup surface perpendicular to the z-axis to have the longitudinal axis parallel to the z-axis is picked up by the clamp module M7, and is then turned by the turn module M3, the work is rotated about the central axis of the z-axis arm 14, and the relative position between the work and the z-axis arm 14 is not shifted by the turn operation.

Even if no positioning mechanism is arranged between the holder module M1 and the turn module M3, the relative position between the work and the z-axis arm 14 is not shifted by the turn operation as long as the relative position between the turn module M3 and the clamp module M7 is accurately defined by the positioning mechanism. However, if no positioning mechanism is arranged between the turn module M3 and the clamp module M7, and the central axes of these modules are not accurately aligned with each other, a shift in position having the shift amount as a radius occurs on the x-y plane according to the turn operation of the turn module M3. As a result, the work deviates around the central axis of the z-axis arm 14 upon the turn operation, and the relative position between the work and the z-axis arm 14 is shifted.

In this case, when the robot 12 is arranged to have a degree of freedom in the x- or y-axis direction, the shift in position after the turn operation can be corrected by the robot, and no positioning mechanism is required between the turn module M3 and the clamp module M7.

Figure 97:
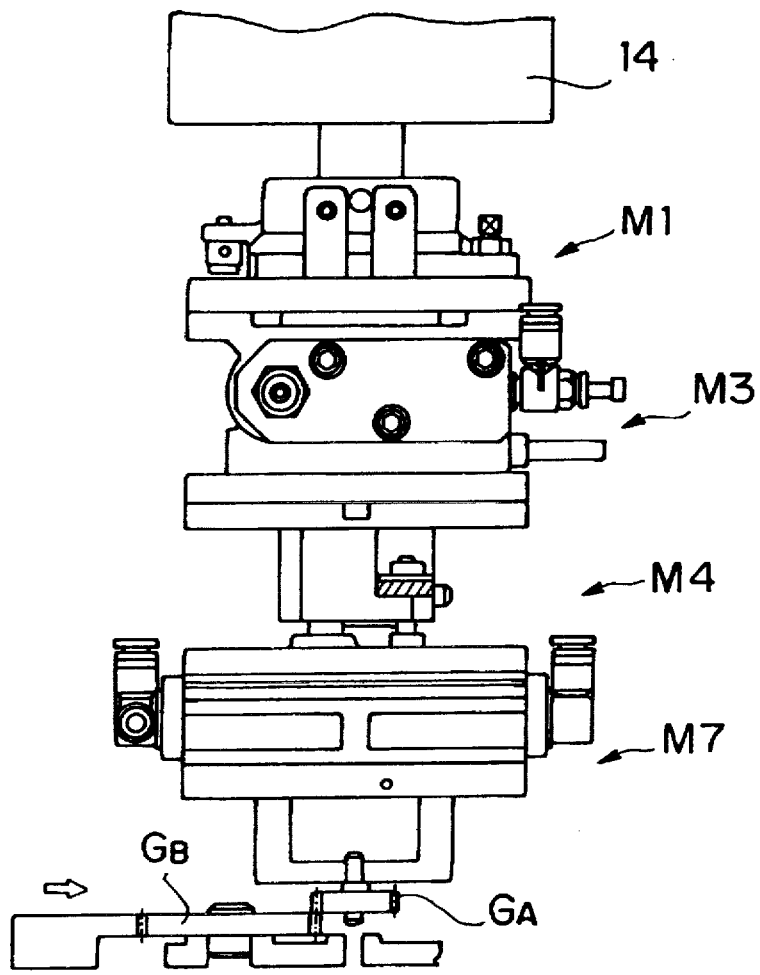
FIG. 97 is a front view showing a state wherein a first gear is clamped, and is moved to a position obliquely above a second gear by a combination of the holder module, the turn module, the cushion module, and the clamp module.
Figure 98:
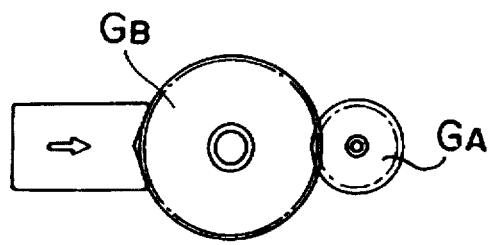
FIG. 98 is a plan view showing the positional relationship between the first and second gears in FIG. 97.
Figure 99:
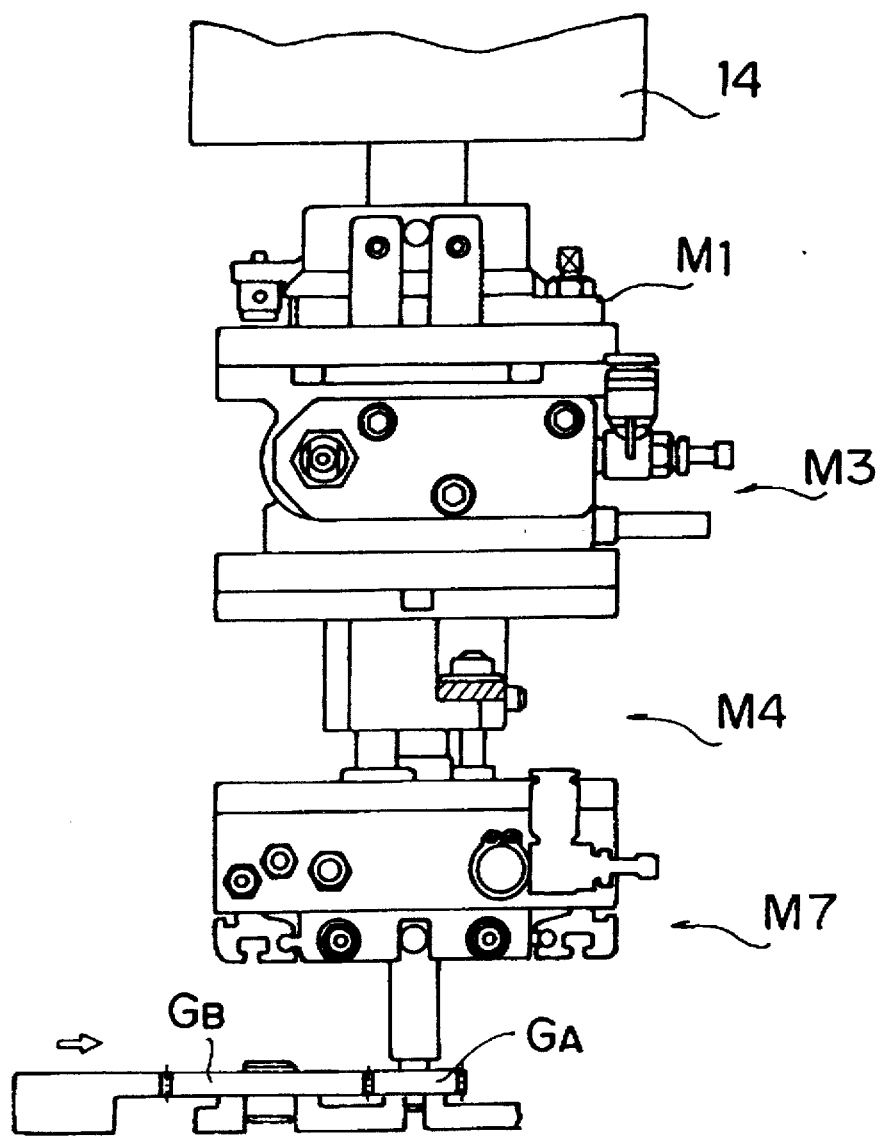
FIG. 99 is a front view showing a state wherein the first gear is turned by enabling the turn module from the state shown in FIG. 97 so as to be meshed with the second gear.

An assembling operation for clamping a small-diameter first gear GA as a work, and assembling it to a large-diameter second gear GB in a meshing state using the above-mentioned combination of modules will be described below with reference to FIGS. 97 to 99. In this case, in order to assure the reliable assembling operation, the cushion module M4 is interposed between the turn module M3 and the clamp module M7.

In this assembling operation, the robot 12 drives the z-axis arm 14, so that the central axis of the z-axis arm 14 is aligned with the central axis of the first gear GA to be clamped. When the central axes are aligned with each other, the robot 12 holds the z-axis arm 14 at that x-y coordinate position, and moves the z-axis arm 14 downward, so that the clamp module M7 is located at the position where it can sufficiently clamp the first gear GA. In this state, the clamp module M7 is driven to start the clamp operation of the first gear GA. Upon completion of the clamp operation of the first gear GA, the z-axis arm 14 is moved to a predetermined position above a position aside the second gear GB to be assembled with the first gear GA while maintaining the clamp state, as shown in FIGS. 97 and 98. In this state, when the meshing angular position of the first gear GA with respect to the second gear GB is defined in advance, the turn module M3 is driven to turn the first gear GA to the meshing angular position.

As described above, the z-axis arm 14, the holder module M1, the turn module M3, the cushion module M4, and the clamp module M7 are positioned through the positioning mechanism, so that their central axes are aligned with each other. As a result, in the turn operation of the turn module M3, the first gear GA is rotated about its own central axis, and is assembled to the second gear GB in a satisfactorily meshed state, as shown in FIG. 99.

In other words, if no positioning mechanisms are arranged among the turn module M3, the cushion module M4, and the clamp module M7, the central axis of the turn module M3 and the central axis of the first gear GA clamped by the clamp module M7 may not be aligned with each other, may be separated by a predetermined distance, and may be held in a parallel state. In this case, when the turn module M3 executes the turn operation, the central axis of the first gear GA is pivoted around the central axis of the turn module M3, and the first gear GA may ride on the second gear GB or may be separated away from the second gear GB. Consequently, the first gear GA cannot be meshed with the second gear GB.

Figure 100:
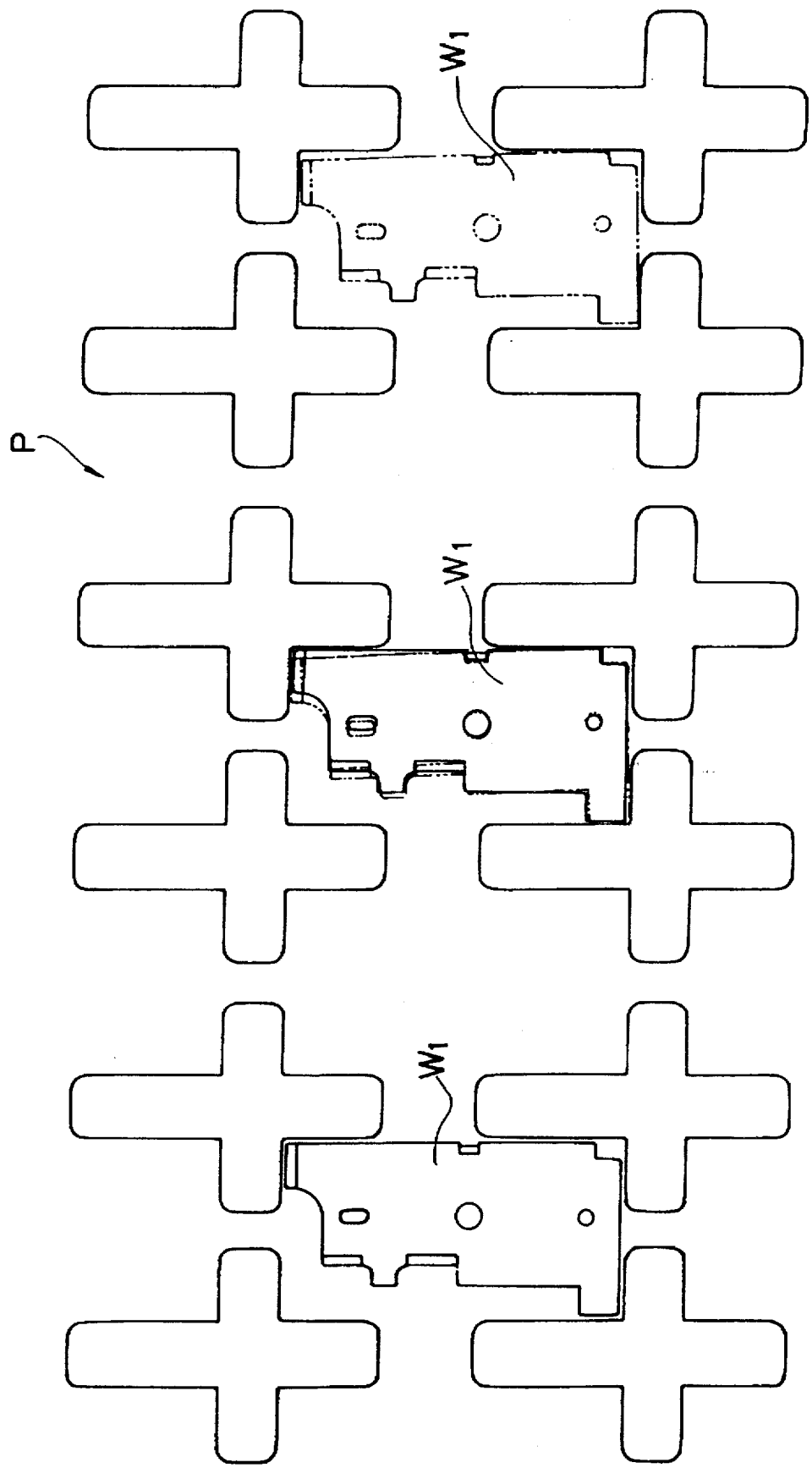
FIG. 100 is a plan view showing a storage state of a first work in a pallet in a combination of the holder module, the turn module, the compliance module, and the suction clamp module.

An assembling operation for picking up one of a plurality of first works W1 stored in a pallet P by a suction operation of the clamp module M7, turning the first work W1 through a predetermined angle by the turn operation of the turn module M3, and inserting the first work W1 in a second work W2 using the above-mentioned combination of modules will be described below with reference to FIGS. 100 to 101C. In order to assure the reliable assembling operation, the compliance module M5 is interposed between the turn module M3 and the clamp module M7. In this case, the compliance module M5 comprises the lock mechanism 246, as described above, and can be switched between a lock state for inhibiting the compliance function by locking the compliance operation, and an unlock (free) state for permitting the compliance operation.

Each first work W1 is stored in a storage space in the pallet P to be relatively close to partition walls for partitioning these storage spaces. For this reason, in the regular storage state illustrated at the left end in FIG. 100, the first work W1 is set to be separated from the surrounding partition walls by predetermined intervals. However, when a lateral force acts during the convey operation of the pallet P or during the storage operation of the works, the first work W1 may be shifted from the regular storage position, as illustrated at the right end in FIG. 100, and a portion thereof may contact the partition wall. When the first work W1 locally contacting the partition wall is to be picked up by the suction operation, if the compliance module M5 effects the compliance function, the first work W1 is maintained at the shifted storage position without correcting the storage position to the regular storage position, and is picked up from the shifted storage position. As a result, in the pickup operation, since the first work W1 is moved upward while locally contacting the partition wall, if the contact frictional force overcomes the suction force, the clamp state of the first work W1 is forcibly released, and the first work W1 drops onto the pallet P, resulting in an unsuccessful clamp operation.

In order to avoid such an unsuccessful clamp operation, the compliance module M5 sets the lock mechanism 246 in the lock state in this assembling operation to inhibit the compliance function. As a result, in the clamp operation, prior to the suction operation, the storage position of the first work W1 is corrected to the regular storage position. Thus, the first work W1 is separated from the surrounding partition walls, and is brought to a non-contact state, as illustrated at the center in FIG. 100. In this manner, when the first work W1 is moved up by vacuum suction, it can be reliably picked up from the pallet P.

When the first work W1 picked up in this manner is inserted in the second work W2 after it is rotated about the central axis through the predetermined angle on the basis of the turn operation of the turn module M3, as shown in FIG. 101, the lock mechanism 246 of the compliance module M5 is unlocked, i.e., the compliance function is enabled. As a result, even when the central axis of a shaft portion W1a projecting downward from the first work W1 is offset from the central axis of a through hole W2a formed in the upper surface of the second work W2, the shaft portion W1a can be reliably inserted in the through hole W2a by the compliance function of the compliance module M5. In this manner, the first work W1 is assembled to the second work W2.

In this combination, if no positioning mechanisms are arranged among the turn module M3, the compliance module M5, and the clamp module M7, and the central axis of the turn module M3 is not aligned with the central axis of the first work W1, the central axis of the first work W1 is largely shifted in the turn operation, and the first work W1 cannot be accurately positioned with the second work W2. Even if the compliance module M5 effects the compliance function, the first work W1 cannot be inserted in the second work W2. As a result, the assembling operation is disabled.

Figure 102A:
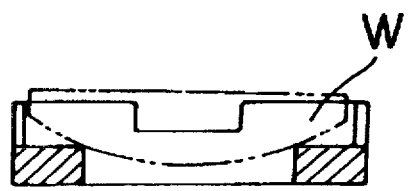
FIGS. 102A to 102C are front views sequentially showing clamp operations for clamping a cylindrical lens in a pallet in a combination of the holder module, the turn module, the compliance module, and the grabbing clamp module.
Figure 102B:
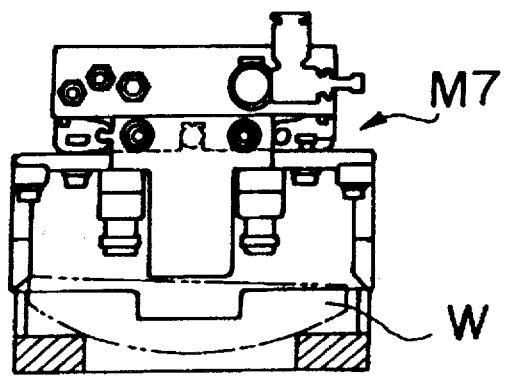

An assembling operation for operating the lock mechanism 246 contrary to the above-mentioned case in the combination assembled with the compliance module M5 will be described below with reference to FIGS. 102A to 103.

In this case, a work W to be clamped is a cylindrical lens. An assembling operation for inserting the cylindrical lens W in a lens holding member L in a precisely positioned state is executed. More specifically, when the cylindrical lens W is to be picked up, since its storage state is unknown, the lock mechanism 246 of the compliance module M5 is set in an unlock state, and the lens W is picked up while effecting the compliance function.

Figure 102C:
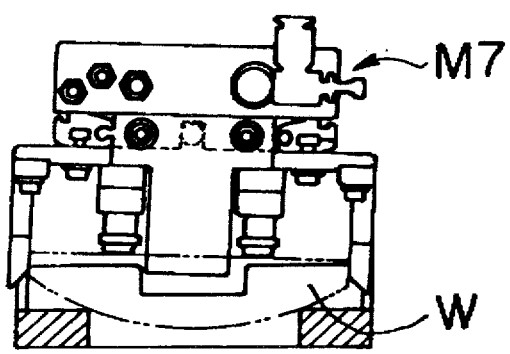

In this manner, the cylindrical lens W is reliably clamped between the two jaws 412 and 414, as shown in FIG. 102C. The z-axis arm 14 is moved while maintaining the clamp state, so that the clamped cylindrical lens W is located immediately above the lens holding member L. During the movement, the lock mechanism 246 is switched from the unlock state to the lock state. With this lock operation, the central axis of the clamp module M7 is accurately aligned with the central axis of the cylindrical lens W. During the movement, the turn module M3 is driven to turn the cylindrical lens W about the central axis of the lens, so that the lens W is set to have a posture capable of being placed on the lens holding member L.

When the clamped cylindrical lens W is accurately placed at the predetermined position on the lens holding member L, since the central axis of the clamp module M7 is accurately aligned with the central axis of the cylindrical lens W, as described above, the placing operation is executed, as shown in FIG. 103, on the basis of the movement precision upon movement of the z-axis arm 14. In this manner, the cylindrical lens W is placed and held on the lens holding member L in a precisely position state having a predetermined posture.

In this combination, if no positioning mechanisms are arranged among the turn module M3, the compliance module M5, and the clamp module M7, and the central axis of the turn module M3 is not aligned with the central axis of the cylindrical lens W, the central axis of the cylindrical lens W is shifted in the above-mentioned turn operation, and the cylindrical lens W cannot be placed on the lens holding member L in a precisely aligned state. As a result, the assembling operation is disabled.

M1+M2+M3+M7

A combination in which the reverse module M2 is attached to the lower portion of the holder module M1, the turn module M3 is attached to the lower portion of the reverse module M2, and the clamp module M7 is attached to the lower portion of the turn module M3 will be described below.

The relationship between the holder module M1 and the reverse module M2 therebelow is the same as the relationship between the holder module M1 and the reverse module M2 in the paragraphs of [M1+M2+M7], and a detailed description thereof will be omitted.

As for the relationship between the reverse module M2 and the turn module M3 attached to the lower portion of the module M2, since the positioning mechanism is interposed therebetween, these modules can be positioned without causing a position shift in the x-y plane, i.e., in a state wherein the reverse module RL of the reverse module M2 extends perpendicularly to the central axis, i.e., the turn axis of the turn module M3. When no positioning mechanism is arranged between the reverse module M2 and the turn module M3, a shift in position in the x-y plane occurs.

In this case, when the robot has a degree of freedom in the x-, y-, and z-axis directions, or when the holder module has a position adjustment function in the y-direction in an x-z air-driven auto hand, no positioning mechanism is necessary.

The relationship between the turn module M3 and the clamp module M7 therebelow is the same as the relationship between the turn module M3 and the clamp module M7 in the paragraphs of [M1+M3+M7], and a detailed description thereof will be omitted.

M1+M3+M2+M7

A combination in which the turn module M3 is attached to the lower portion of the holder module M1, the reverse module M2 is attached to the lower portion of the turn module M3, and the clamp module M7 is attached to the lower portion of the reverse module M2 will be described below.

The relationship between the holder module M1 and the turn module M3 therebelow is the same as the relationship between the holder module M1 and the turn module M3 in the paragraphs of [M1+M3+M7], and a detailed description thereof will be omitted.

As for the relationship between the turn module M3 and the reverse module M2 attached below the module M3, since the positioning mechanism is interposed therebetween, these modules can be accurately defined to have the positional relationship wherein the turn axis as the central axis of the turn module M3 is perpendicular to the reverse axis RL of the reverse module M2. As a result, after a work, which is placed on a pickup surface perpendicular to the z-axis to have the longitudinal axis parallel to the y-axis, is picked up by the clamp module M7, the work is turned and reversed by the turn and reverse modules M3 and M2, and is then placed on a place surface, which is not parallel to the x, y, z planes.

If no positioning mechanism is arranged between the turn module M3 and the reverse module M2, the orthogonal state between the central axis of the turn module M3 and the reverse axis RL of the reverse module M2 cannot be guaranteed. As a result, the position of the work after the turn and reverse operations is shifted in the x-, y-, or z-axis direction from that defined when the central axis of the turn module M3 is perpendicular to the reverse axis RL of the reverse module M2. At this time, when the robot has a degree of freedom in the x-, y-, and z-axis directions, no positioning mechanism is necessary.

The relationship between the reverse module M2 and the clamp module M7 attached therebelow is the same as the relationship between the reverse module M2 and the clamp module M7 in the paragraphs of [M1+M2+M7], and a detailed description thereof will be omitted.

M1+M3+M3+M7

A combination in which the first turn module M3 is attached to the lower portion of the holder module M1, the second turn module M3 is attached to the lower portion of the first turn module M3, so that their turn axes are perpendicular to each other, and the clamp module M7 is attached to the lower portion of the second turn module M3 will be described below.

The relationship between the holder module M1 and the first turn module M3 attached therebelow is the same as the relationship between the holder module M1 and the turn module M3 in the paragraphs of [M1+M3+M7], and a detailed description thereof will be omitted.

As for the relationship between the first turn module M3, and the second turn module M3 attached therebelow so that the turn axes of the two modules are perpendicular to each other, since the positioning mechanism is interposed therebetween, these modules can be positioned with each other while their turn axes precisely maintain a crossing state at a predetermined angle. As a result, when the first turn module M3 executes the turn operation, no shift in position in the x-y plane occurs. If no positioning mechanism is arranged between the two modules, the turn axes of the two modules assume a so-called twisted positional relationship upon the turn operation of the first turn module M3, and a shift in position occurs.

The relationship between the second turn module M3 and the clamp module M7 attached therebelow is the same as the relationship between the turn module M3 and the clamp module M7 in the paragraphs of [M1+M3+M7], and a detailed description thereof will be omitted.

M1+M3+M2+M3+M7

Finally, a combination in which the first turn module M3 is attached to the lower portion of the holder module M1, the reverse module M2 is attached to the lower portion of the first turn module M3, the second turn module M3 is attached to the lower portion of the reverse module M2, and the clamp module M7 is attached to the lower portion of the second turn module M3 will be described below. In this combination, the relationship between the holder module M1 and the first turn module M3 attached therebelow is the same as the relationship between the holder module M1 and the turn module M3 in the paragraphs of [M1+M3+M7]. The relationship between the first turn module M3 and the reverse module M2 attached therebelow is the same as that between the turn module M3 and the reverse module M2 in the paragraphs of [M1+M3+M2+M7]. The relationship between the reverse module M2 and the second turn module M3 attached therebelow is the same as that between the reverse module M2 and the turn module M3 in the paragraphs of [M1+M2+M3+M7]. The relationship between the turn module M3 and the clamp module M7 attached therebelow is the same as that between the turn module M3 and the clamp module M7 in the paragraphs of [M1+M3+M7]. Thus, a detailed description of these relationships will be omitted.

In the hand mechanism of this embodiment, when arbitrary modules are combined and used, since the positioning mechanism is arranged between adjacent modules, a work clamped by the clamp module M7 arranged at the distal end can be positioned very accurately.

The present invention is not limited to the above embodiments and various changes and modifications can be made within the spirit and scope of the present invention. Therefore, to apprise the public of the scope of the Present invention the following claims are made.

What is claimed is:

1. A hand mechanism for a robot, which is attachable to a distal end of an arm portion of the robot, having independent modules for executing predetermined elementary motions, which modules can be combined with each other in selected arbitrary combinations to attain desired elementary motions, said hand mechanism comprising:

a holder module having a fixing member fixable to the arm portion, an attaching plate to be attached to another module, and coupling means for coupling said fixing member and said attaching plate, said coupling means comprising angle adjustment means for adjusting an attaching angle of said attaching plate about said fixing member and thus the arm portion, and a release mechanism for releasing a coupling state between said fixing member and said attaching plate upon application of a shock to said hand mechanism.

2. The hand mechanism according to claim 1, wherein said coupling means further comprises a drop prevention pin, attached to said fixing member, for, when the coupling state between said fixing member and said attaching plate is released by said release mechanism, suspending said attaching plate and preventing said attaching plate from dropping.

3. The hand mechanism according to claim 1, wherein said coupling means further comprises a center ring for aligning a central axis of the arm portion with a central axis of said attaching plate.

4. The hand mechanism according to claim 3, wherein said center ring comprises a strain sensor, and when a shock acts on said hand mechanism said center ring detects a strength of the shock as its own deformation with said strain sensor.

5. A hand mechanism for a robot, which is attachable to a distal end of an arm portion of the robot, having independent modules for executing predetermined elementary motions, which modules can be combined with each other in selected arbitrary combinations to attain desired elementary motions, said hand mechanism comprising:

a turn module having an upper attaching plate, rotation driving means formed integrally with said upper attaching plate and having an output shaft rotated about a central axis of said upper attaching plate, and a lower attaching plate coupled to said output shaft and turned with respect to said upper attaching plate, wherein said rotation driving means comprises a main body block integrally attached to said upper attaching plate, and having a central through-hole for axially supporting said output shaft to be rotatable about the central axis of said upper attaching plate, a center gear formed integrally with said output shaft, a driving piston slidably arranged in a driving cylinder formed integrally with said main body block and having a driving rack meshing with said center gear, supply means for supplying a working fluid for reciprocally slidably driving said driving piston into said driving cylinder, a driven cylinder formed in a portion of said main body block which is located at a side opposite to a side where said driving cylinder is formed to sandwich said output shaft therebetween, and a driven piston slidably arranged in said driven cylinder and having a driven rack meshing with said center gear;

a pair of stopper pins, projecting toward said upper attaching plate and for regulating a turn angle of said lower attaching plate, attached at predetermined positions on a single circumference of said lower attaching plate, and a turn angle range of said lower attaching plate is defined by contact positions of said stopper pins to corresponding positioning members attached to said upper attaching plate; and shock absorbers for receiving corresponding end portions of said driven piston in a shock-absorbed state immediately before said stopper pins contact the corresponding positioning members arranged on ends of said driven cylinder.

6. The hand mechanism according to claim 5, wherein said driving piston is slidably stored in said driving cylinder in an air-tight state.

7. The hand mechanism according to claim 5, wherein said positioning members comprise stopper bolts, which are attached to said upper attaching plate to be movable forward/backward so that the contact positions to the corresponding stopper pins are adjustable.

8. A hand mechanism for a robot, which is attachable to a distal end of an arm portion of the robot, having independent modules for executing predetermined elementary motions, which modules can be combined with each other in selected arbitrary combinations to attain desired elementary motions, said hand mechanism comprising:

a turn module comprising an upper attaching plate, rotation driving means formed integrally with said upper attaching plate and having an output shaft rotated about a central axis of said upper attaching plate, and a lower attaching plate coupled to said output shaft and turned with respect to said upper attaching plate, wherein said rotation driving mechanism comprises a main body block integrally attached to said upper attaching plate, and having a central through-hole for axially supporting said output shaft to be rotatable about the central axis of said upper attaching plate, a center gear formed integrally with said output shaft, a driving piston slidably arranged in a driving cylinder formed integrally with said main body block, and having a driving rack meshing with said center gear, and supply means for supplying a working fluid for reciprocally slidably driving said driving piston into said driving cylinder, wherein said through-hole is closed by a lid member, and said main body block is provided with a vacuum port for evacuating the interior of said through-hole.

9. The hand mechanism according to claim 5, wherein one of said stopper pins, projecting toward said upper attaching plate, for regulating a turn angle of said lower attaching plate is attached at a predetermined position on a predetermined circumference of said lower attaching plate, and a turn angle range of said lower attaching plate is defined by a contact position of said one stopper pin to a corresponding positioning member attached to said upper attaching plate.

* * * * *

UNITED STATES PATENT AND TRADEMARK OFFICE
CERTIFICATE OF CORRECTION

PATENT NO. : 5,593,293
DATED : January 14, 1997
INVENTOR(S) : Machino et al.

It is certified that error appears in the above-indentified patent and that said Letters Patent is hereby corrected as shown below:

COLUMN 1:

Line 34, "in" should read --In--.

COLUMN 9:

Line 66, "MS," should read --M5,--.

COLUMN 10:

Line 27, "angle" should read --angle $\alpha$ --.

COLUMN 24:

Line 12, "194a and 194b" should read --through holes 194a and 194b are--.

COLUMN 41:

Line 52, "H7" should read --M7--.

UNITED STATES PATENT AND TRADEMARK OFFICE
CERTIFICATE OF CORRECTION

PATENT NO. : 5,593,293

DATED : January 14, 1997

INVENTOR(S) : Machino et al.

It is certified that error appears in the above-indentified patent and that said Letters Patent is hereby corrected as shown below:

<u>COLUMN 52</u>:

Line 2, "M3 reverse" should read --M3 + reverse--.

Signed and Sealed this

Tenth Day of February, 1998

*Attest:*

BRUCE LEHMAN

*Attesting Officer*  *Commissioner of Patents and Trademarks*